(12) United States Patent
Reusing

(10) Patent No.: US 11,299,863 B2
(45) Date of Patent: Apr. 12, 2022

(54) SUPPORT ASSEMBLY FOR A BUILDING STRUCTURE

(71) Applicant: GOLIATHTECH INC., Magog (CA)

(72) Inventor: Julian Reusing, Magog (CA)

(73) Assignee: Goliathtech, Inc., Magog (CA)

( * ) Notice: Subject to any disclaimer, the term of this patent is extended or adjusted under 35 U.S.C. 154(b) by 0 days.

(21) Appl. No.: 17/090,582

(22) Filed: Nov. 5, 2020

(65) Prior Publication Data

US 2021/0054587 A1 Feb. 25, 2021

Related U.S. Application Data

(63) Continuation-in-part of application No. 16/676,612, filed on Nov. 7, 2019, now Pat. No. 10,870,963, which is a continuation of application No. 15/814,907, filed on Nov. 16, 2017, now Pat. No. 10,487,469.

(60) Provisional application No. 62/422,631, filed on Nov. 16, 2016.

(51) Int. Cl.
| | |
|---|---|
| *E02D 5/22* | (2006.01) |
| *E04B 1/343* | (2006.01) |
| *B62D 21/20* | (2006.01) |

(52) U.S. Cl.
CPC .......... *E02D 5/223* (2013.01); *E04B 1/34347* (2013.01); *E04B 1/34352* (2013.01); *B62D 21/20* (2013.01)

(58) Field of Classification Search
CPC ................ E02D 5/223; E04B 1/34347; E04B 1/34352; B62D 21/20
See application file for complete search history.

(56) References Cited

U.S. PATENT DOCUMENTS

| | | | | |
|---|---|---|---|---|
| 1,460,283 | A | * | 6/1923 | Shutsa ..................... B60M 1/20 191/40 |
| 3,655,161 | A | * | 4/1972 | Schueler ................. E04G 25/06 254/100 |
| 3,713,259 | A | * | 1/1973 | Tkach ................. E04B 1/34342 52/111 |
| 3,802,138 | A | * | 4/1974 | McCarter ............ E04B 1/34347 52/148 |

(Continued)

FOREIGN PATENT DOCUMENTS

| | | |
|---|---|---|
| AU | 2014308507 B2 | 6/1998 |
| AU | 2011226918 B2 | 12/2011 |

(Continued)

*Primary Examiner* — James M Ference
(74) *Attorney, Agent, or Firm* — Harness, Dickey and Pierce PLC

(57) ABSTRACT

A support assembly for supporting a building structure, the support assembly comprising: a pile adapted to be buried into a ground surface, the pile having a longitudinal axis; a pile head adapted to be secured to a top end of a pile, the pile head including a mounting member engaging the pile and an extendable member movably mounted to the mounting member, the extendable member being movable relative to the mounting member, along the longitudinal axis, the extendable member including: a support platform adapted to receive the support beam of the manufactured home's support frame thereon; and at least one holding member adapted to engage the building structure and to prevent movement of the support beam relative to the support platform.

19 Claims, 42 Drawing Sheets

(56) References Cited

U.S. PATENT DOCUMENTS

| | | | | |
|---|---|---|---|---|
| 3,828,491 A * | 8/1974 | Koon | E04B 1/34347 52/23 |
| 3,830,024 A * | 8/1974 | Warnke | E04B 1/34347 52/23 |
| 4,261,149 A * | 4/1981 | Gustafson | E04B 1/34352 52/292 |
| 4,417,426 A * | 11/1983 | Meng | E04B 1/34352 52/126.7 |
| 4,546,581 A * | 10/1985 | Gustafson | E02D 27/34 52/126.6 |
| 4,738,061 A * | 4/1988 | Herndon | E02D 27/02 52/126.6 |
| 4,761,924 A * | 8/1988 | Gustafson | E04B 1/34352 52/126.6 |
| 4,812,080 A * | 3/1989 | Urquhart | E02B 17/027 405/204 |
| 4,866,797 A * | 9/1989 | Vollan | E04B 1/34352 52/126.6 |
| 4,870,789 A * | 10/1989 | Clark | E02D 35/00 52/126.6 |
| 4,882,887 A * | 11/1989 | Giles | E04B 1/34352 52/126.6 |
| 4,914,875 A * | 4/1990 | Gustafson | E04B 1/34352 52/126.6 |
| 5,213,448 A * | 5/1993 | Seider | E02D 27/48 405/229 |
| 5,359,821 A * | 11/1994 | Merriman | E04H 9/0237 52/169.9 |
| 5,402,614 A * | 4/1995 | Jewell | E02D 27/32 248/505 |
| 5,409,192 A * | 4/1995 | Oliver | E04B 1/34352 248/357 |
| 5,482,407 A * | 1/1996 | Raaf | E02D 5/00 405/229 |
| 5,515,655 A * | 5/1996 | Hoffmann | E02D 27/01 248/354.5 |
| 5,595,366 A * | 1/1997 | Cusimano | E02D 27/34 248/354.3 |
| 5,669,735 A * | 9/1997 | Blandford | E02B 17/027 405/195.1 |
| 5,707,180 A * | 1/1998 | Vickars | E02D 5/36 405/233 |
| 5,775,846 A * | 7/1998 | Blandford | E02B 17/0004 405/227 |
| 5,800,094 A * | 9/1998 | Jones | E02D 35/00 254/133 R |
| 5,851,446 A * | 12/1998 | Bardo | E04H 5/12 261/111 |
| 5,862,635 A * | 1/1999 | Linse | E04H 9/14 52/126.6 |
| 5,873,679 A * | 2/1999 | Cusimano | E02D 27/48 405/231 |
| 5,980,160 A * | 11/1999 | Vanderklaauw | B66F 1/00 405/230 |
| 6,074,133 A * | 6/2000 | Kelsey | E02D 27/12 405/244 |
| 6,094,873 A * | 8/2000 | Hoffman | E02D 27/01 52/126.6 |
| 6,176,056 B1 * | 1/2001 | MacKarvich | E02D 5/801 248/499 |
| 6,183,167 B1 * | 2/2001 | Ruiz | E02D 5/285 403/379.3 |
| 6,243,998 B1 * | 6/2001 | MacKarvich | E02D 27/02 52/167.3 |
| 6,318,032 B2 * | 11/2001 | MacKarvich | E02D 27/02 52/167.3 |
| 6,347,489 B1 * | 2/2002 | Marshall, Jr. | E02D 27/00 248/354.5 |
| 6,349,512 B1 * | 2/2002 | Berkey | E04G 25/06 52/126.6 |
| 6,352,390 B1 * | 3/2002 | Jones | E02D 27/48 405/230 |
| 6,381,907 B1 * | 5/2002 | MacKarvich | E04B 1/34352 52/105 |
| 6,468,002 B1 * | 10/2002 | Gregory | E02D 27/48 254/29 R |
| 6,546,686 B2 * | 4/2003 | MacKarvich | E02D 27/02 248/188.1 |
| 6,634,150 B1 * | 10/2003 | Oliver | E02D 27/01 248/354.1 |
| 6,659,692 B1 * | 12/2003 | May | E02D 35/00 405/230 |
| 6,682,267 B1 * | 1/2004 | Jones | E02D 5/523 405/230 |
| 6,817,810 B2 * | 11/2004 | Jones | E02D 5/523 405/230 |
| 6,848,864 B1 | 2/2005 | Davie, Jr. et al. | |
| 7,191,569 B2 * | 3/2007 | Brown | E02D 5/801 52/111 |
| 7,220,081 B1 * | 5/2007 | Gantt, Jr. | E02D 27/12 405/230 |
| 7,744,316 B2 * | 6/2010 | Kaufman | E02D 35/005 405/230 |
| 7,922,145 B2 * | 4/2011 | Martin | B28B 7/0032 249/120 |
| 8,156,695 B2 * | 4/2012 | Smith | E04H 12/347 52/154 |
| 8,402,837 B1 * | 3/2013 | Jones | E02D 33/00 73/788 |
| 8,734,058 B1 * | 5/2014 | Schmidt | E02D 5/64 405/255 |
| 9,027,898 B1 * | 5/2015 | Holmboe | E21D 15/24 248/354.4 |
| 9,458,593 B2 | 10/2016 | Hale | |
| 9,631,335 B2 | 4/2017 | Reusing et al. | |
| D803,342 S * | 11/2017 | Goff | D22/108 |
| 10,024,020 B2 * | 7/2018 | Fuller | E02D 7/00 |
| 2003/0041535 A1 * | 3/2003 | Rupiper | E02D 5/801 52/165 |
| 2003/0159839 A1 * | 8/2003 | Perko | E02D 5/56 172/100 |
| 2005/0074298 A1 * | 4/2005 | Jones | E02D 5/523 405/252.1 |
| 2006/0067794 A1 * | 3/2006 | Mitchell | E02D 27/48 405/230 |
| 2006/0269364 A1 * | 11/2006 | May | E02D 7/22 405/232 |
| 2007/0028557 A1 * | 2/2007 | Kelly | E04G 23/06 52/741.15 |
| 2007/0212172 A1 * | 9/2007 | Brown | E02D 27/01 405/230 |
| 2008/0063479 A1 * | 3/2008 | Stroyer | E02D 5/52 405/244 |
| 2010/0143048 A1 * | 6/2010 | Lin | E02D 5/801 405/244 |
| 2010/0166504 A1 * | 7/2010 | Patton | E02D 5/00 405/230 |
| 2011/0252722 A1 * | 10/2011 | Laurin | E02D 27/32 52/126.6 |
| 2012/0155968 A1 * | 6/2012 | Byun | E02D 35/00 405/230 |
| 2012/0255242 A1 * | 10/2012 | Patton | B66F 3/24 52/126.6 |
| 2013/0309024 A1 * | 11/2013 | Jones | E02D 5/56 405/252.1 |
| 2014/0356075 A1 * | 12/2014 | Hale | E02D 7/02 405/230 |
| 2014/0356076 A1 * | 12/2014 | Hale | E02D 5/54 405/255 |
| 2014/0363238 A1 * | 12/2014 | Subitoni | E02D 7/22 405/252.1 |
| 2016/0186402 A1 * | 6/2016 | Tomchesson | E02D 5/56 405/232 |
| 2016/0215470 A1 * | 7/2016 | Reusing | E02D 5/56 |

(56) References Cited

U.S. PATENT DOCUMENTS

2018/0135269 A1\* 5/2018 Reusing .............. E04B 1/34347
2021/0054587 A1\* 2/2021 Reusing .................. E02D 5/223

FOREIGN PATENT DOCUMENTS

| AU | 2013/200834 A1 | 9/2013 |
| CA | 2882893 A1 | 2/2015 |
| CN | 102787596 A | 11/2012 |
| EP | 2006452 A1 | 12/2008 |
| JP | 2002-348861 A | 12/2002 |
| JP | 2009-035937 A | 2/2009 |
| KR | 101081566 B1 | 11/2011 |
| NZ | 716857 A | 2/2017 |
| WO | WO-2015/024108 A1 | 2/2015 |

\* cited by examiner

SUPPORT ASSEMBLY FOR A BUILDING STRUCTURE

CROSS REFERENCE TO RELATED APPLICATIONS

This application is a continuation-in-part of U.S. patent application Ser. No. 16/676,612, filed on Nov. 7, 2019, which is a continuation of U.S. patent application Ser. No. 15/814,907, filed on Nov. 16, 2017, now U.S. Pat. No. 10,487,469, issued on Nov. 26, 2019, and which claims the benefit of U.S. Provisional Application No. 62/422,631, filed on Nov. 16, 2016, all of which are incorporated by reference herein.

TECHNICAL FIELD

The present invention relates to a support assembly for building structures, and more specifically to support assemblies for building structures such as manufactured homes.

BACKGROUND

Some building structures such as manufactured homes, also known as mobile homes, are prefabricated (i.e. constructed offsite) and then moved to a desired location. To be able to move the structure while preserving its structural integrity, the structures are usually built over a horizontally-extending metal frame which includes one or more I-beams.

Different types of foundations can be provided for manufactured homes. Some manufactured homes are mounted on piles, and specifically screw piles, which are driven and buried in a ground surface. In this configuration, a pile head is provided on top of the pile, and the manufactured home is secured to the pile head. Various devices and techniques have been proposed to secure the metal frame of manufactured home to the pile head, but unfortunately, these devices and techniques may be complex, time consuming, difficult to implement or may involve damaging the metal frame. Furthermore, these devices and techniques may not allow any adjustment during installation at the desired location.

There is therefore a need for a device which would overcome at least one of the above-identified drawbacks.

BRIEF SUMMARY

According to a broad aspect, there is provided a support assembly for supporting a building structure, the support assembly comprising:
 a pile adapted to be buried into a ground surface, the pile having a top end and a longitudinal axis with at least one pile mounting hole along the longitudinal axis;
 a mounting member movably mounted to the top end of the pile and coaxial with the longitudinal axis of the pile, the mounting member having a beam portion engaging the top end of the pile and a head portion, the beam portion including at least two mounting holes along the longitudinal axis, the at least two mounting holes of the beam portion being selectively alignable with the at least one pile mounting hole for receiving therein a fastener for securably fastening the mounting member to the pile, the at least two mounting holes allowing adjustment of a position of the mounting member relative to the pile, along the longitudinal axis and;
 an extendable member movably mounted to the mounting member, the extendable member comprising:

a shaft extending along the longitudinal axis, the shaft having a top end, a bottom end and an elongated portion extending therebetween, the elongated portion of the shaft movably engaging the head portion of the mounting member for mounting the extendable member to the mounting member;
 a support platform configured to receive a portion of the building structure thereon, the support platform being mounted to the top end of the shaft and extending orthogonally to the longitudinal axis; and
 at least one holding member attached to the support platform and configured to engage the building structure and prevent movement thereof relative to the support platform.

In one feature, the building structure comprises a support frame including at least one beam, the at least one holding member being configured to engage the at least one beam.

In another feature, the head portion of the mounting member comprises a threaded hole extending along the longitudinal axis, and the elongated portion of the shaft of the extendable member comprises threads, the threads of the shaft being configured to threadably engage the threaded hole of the head portion of the mounting member.

In still another feature, the at least one holding member is movably attached to the support platform.

In a further, feature, the support platform comprises a first side, a second side opposed to the first side and at least one elongated slot extending between the first side and the second side, the at least one holding member being movably received in the at least one elongated slot.

In still a further feature, the at least one holding member comprises a plate member for engaging the building structure and at least one holding fastener, the at least one holding fastener engaging the plate member and the at least one elongated slot to movably attach the at least one holding member to the support platform.

In another feature, the support assembly further comprises at least one brace bracket mounted to at least one of the support platform of the extendable member, the beam portion of the mounting member and the pile, the at least one brace bracket configured for attaching a brace member to the support assembly.

According to another broad aspect, there is provided a support system for supporting a building structure, the support system comprising:
 a first support assembly and a second support assembly, each of the first support assembly and second support assembly including:
 a pile adapted to be buried into a ground surface, the pile having a top end and a longitudinal axis with at least one pile mounting hole along the longitudinal axis;
 a mounting member movably mounted to the top end of the pile and coaxial with the longitudinal axis of the pile, the mounting member having a beam portion engaging the top end of the pile and a head portion, the beam portion including at least two mounting holes along the longitudinal axis, the at least two mounting holes of the beam portion being selectively alignable with the at least one pile mounting hole for receiving therein a fastener for securably fastening the mounting member to the pile, the at least two mounting holes allowing adjustment of a position of the mounting member relative to the pile, along the longitudinal axis and;
 an extendable member movably mounted to the mounting member, the extendable member comprising:

a shaft extending along the longitudinal axis, the shaft having a top end, a bottom end and an elongated portion extending therebetween, the elongated portion of the shaft movably engaging the head portion of the mounting member for mounting the extendable member to the mounting member;

a support platform configured to receive a portion of the building structure thereon, the support platform being mounted to the top end of the shaft and extending orthogonally to the longitudinal axis;

at least one holding member attached to the support platform and configured to engage the building structure and prevent movement thereof relative to the support platform;

at least one brace bracket mounted to at least one of the support platform of the extendable member, the beam portion of the mounting member and the pile, the at least one brace bracket configured for attaching a brace member to the support assembly.

at least one brace member attached to the at least one brace bracket of the first support assembly and to the at least one brace bracket of the second support assembly.

In one feature, the building structure comprises a support frame including at least one beam, the at least one holding member of each of the first support assembly and second support assembly being configured to engage the at least one beam.

In another feature, the head portion of the mounting member of each of the first support assembly and second support assembly comprises a threaded hole extending along the longitudinal axis, and the elongated portion of the shaft of the extendable member comprises threads, the threads of the shaft being configured to threadably engage the threaded hole of the head portion of the mounting member.

In still another feature, the at least one holding member of each of the first support assembly and second support assembly is movably attached to the corresponding support platform of the first support assembly and second support assembly.

In yet another feature, the support platform of each of the first support assembly and second support assembly comprises a first side, a second side opposed to the first side and at least one elongated slot extending between the first side and the second side, the at least one holding member being movably received in the at least one elongated slot.

In a further feature, the at least one holding member comprises a plate member for engaging the building structure and at least one holding fastener, the at least one holding fastener engaging the plate member and the at least one elongated slot to movably attach the at least one holding member to the support platform.

In a yet a further feature, the at least one brace member comprises a telescopic brace member.

In one additional feature, the at least one brace member comprises a first portion secured to the at least one brace bracket of the first support assembly, a second portion secured to the at least one brace bracket of the second support assembly, and an extension mechanism coupling the first and second portions of the at least one brace member, the extension mechanism allowing adjustment of the position of the first portion of the brace member relative to the second portion to adjust a length of the brace member.

In another feature, the first and second portions of the at least one brace member extend along a brace longitudinal axis, the extension mechanism comprising a first projection attached to the first portion of the least one brace member and extending orthogonal to the brace longitudinal axis, a second projection attached to the second portion of the at least one brace member and extending orthogonal to the brace longitudinal axis, a brace shaft operatively connecting the first and second projections, and at least one engaging element collaborating with the shaft and at least one of the first and second projections to allow adjustment of a distance between the first and second projections.

In a further feature, the first and second projections are plates.

In yet a further feature, the brace shaft comprises a threaded portion and wherein the at least one engaging element comprises a nut threadably engaging the brace shaft.

In an additional feature, the extension mechanism comprises a threaded shaft extending from the first portion of the brace member and a threaded hole defined in the second portion of the brace member, the threaded shaft of the first portion threadably engaging the threaded hole of the second portion.

Figure 11:
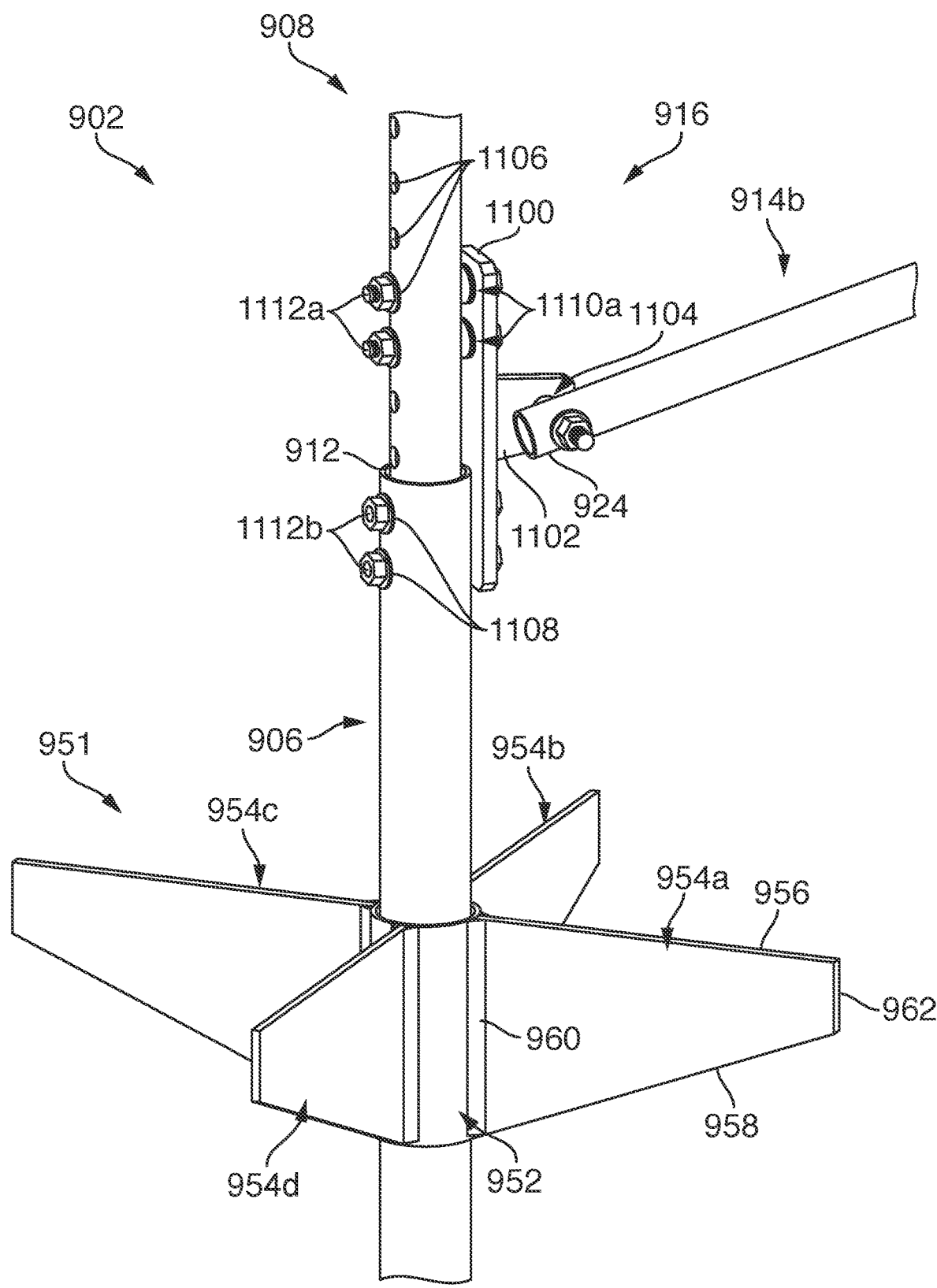
FIG. 11 is an enlarged top left perspective view of a portion of one of the support assemblies illustrated in FIG. 9, for better showing a lower brace bracket and a lateral reinforcement assembly.
Figure 14:
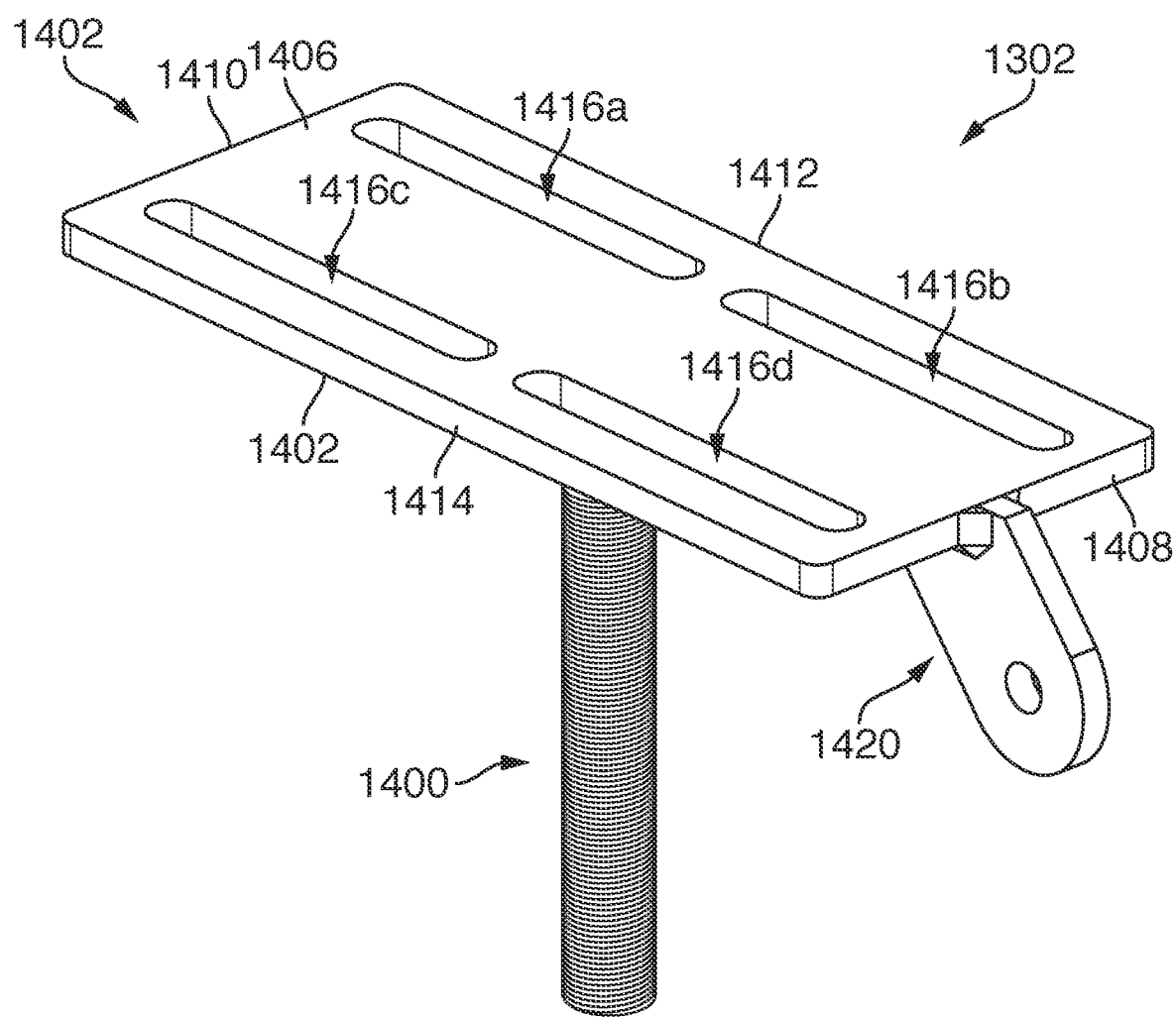
Figure 15:
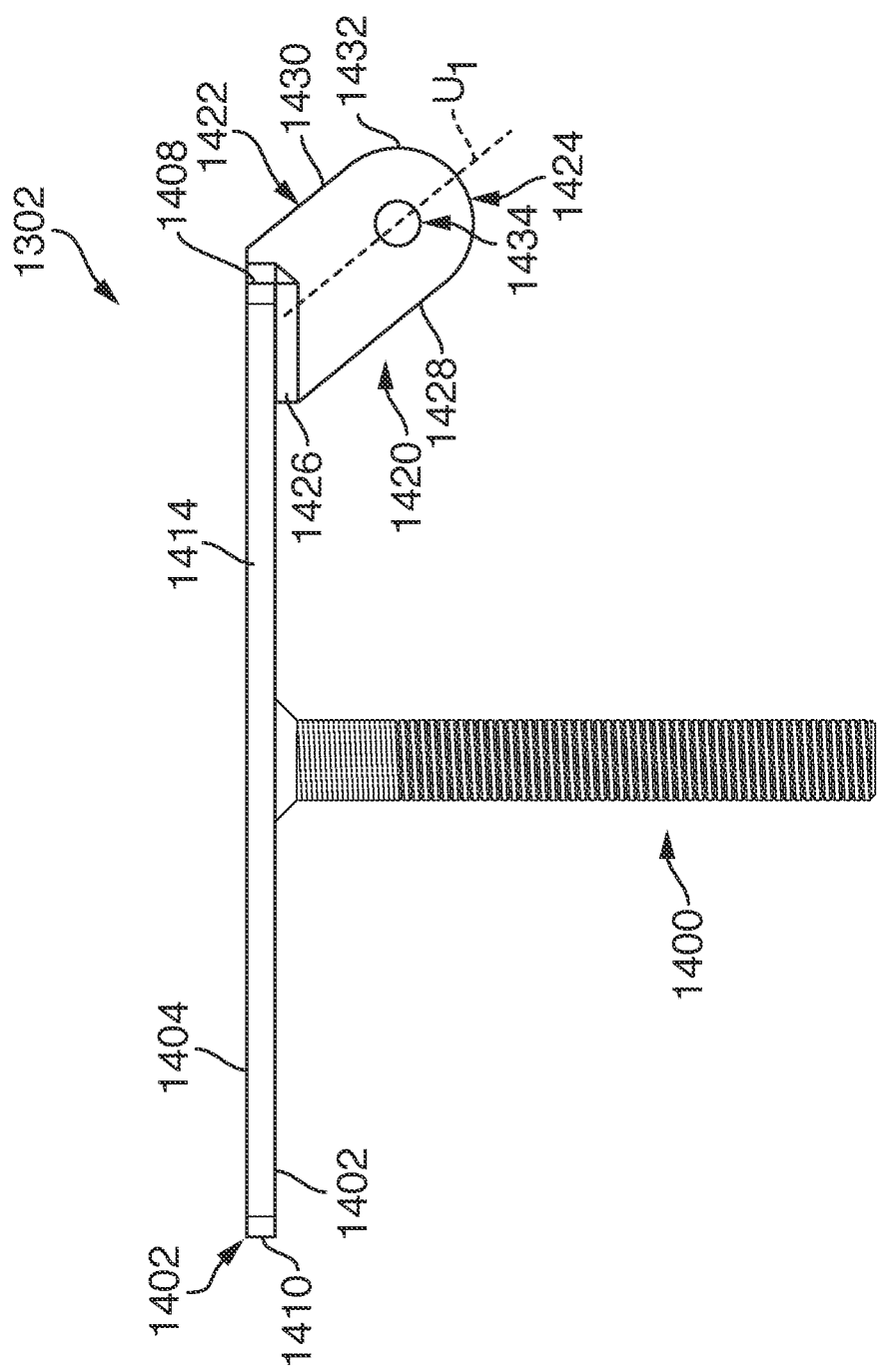
Figure 16:
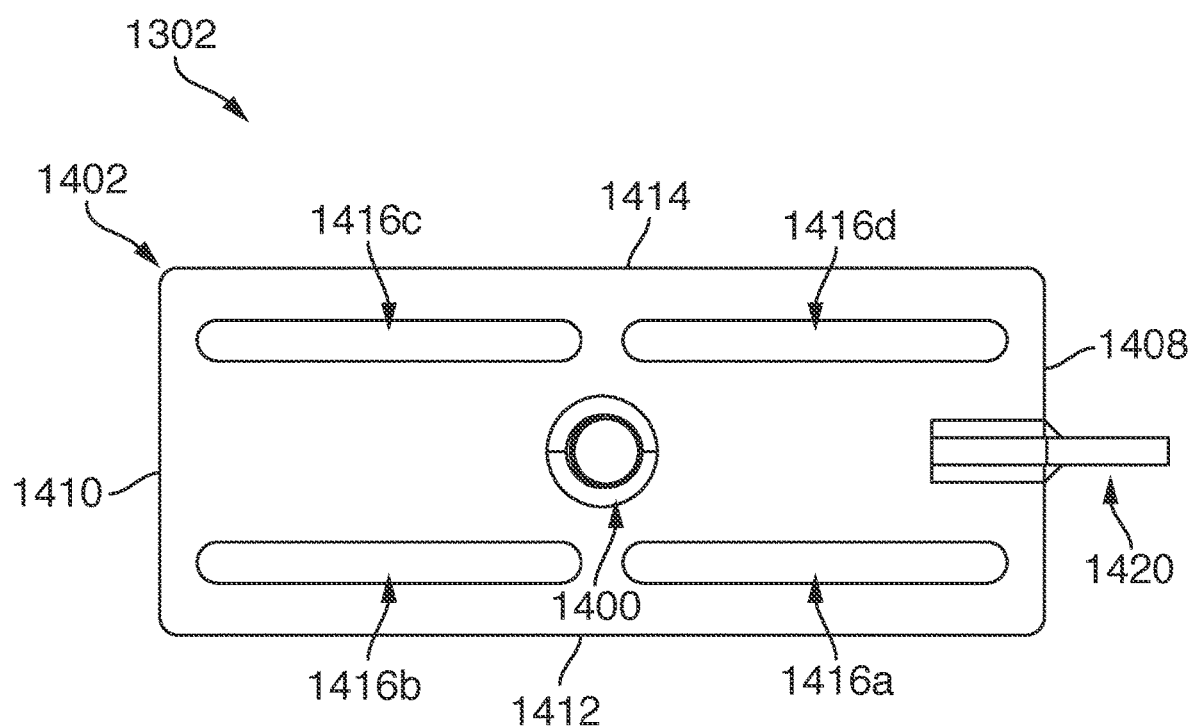
Figure 17:
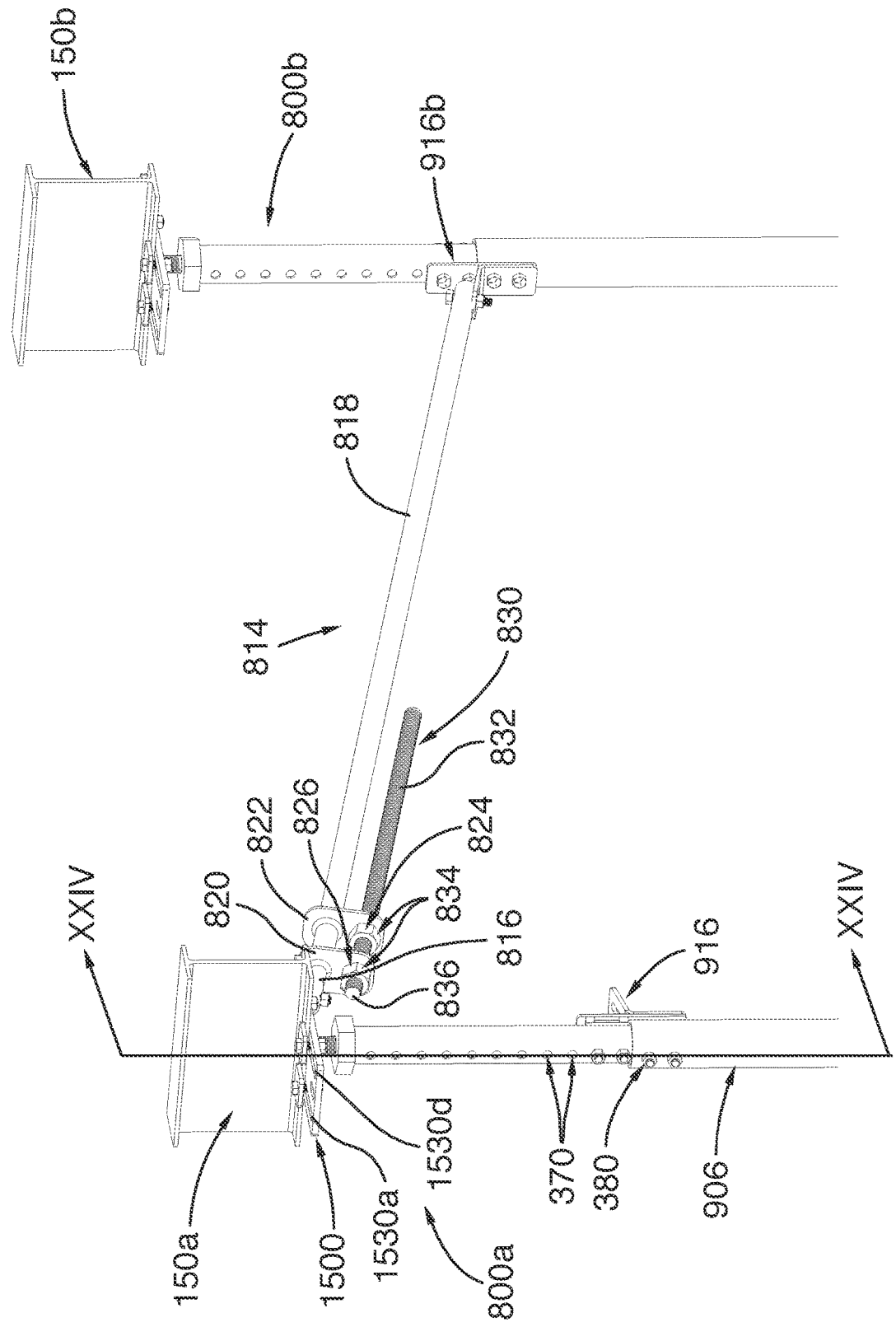
Figure 18:
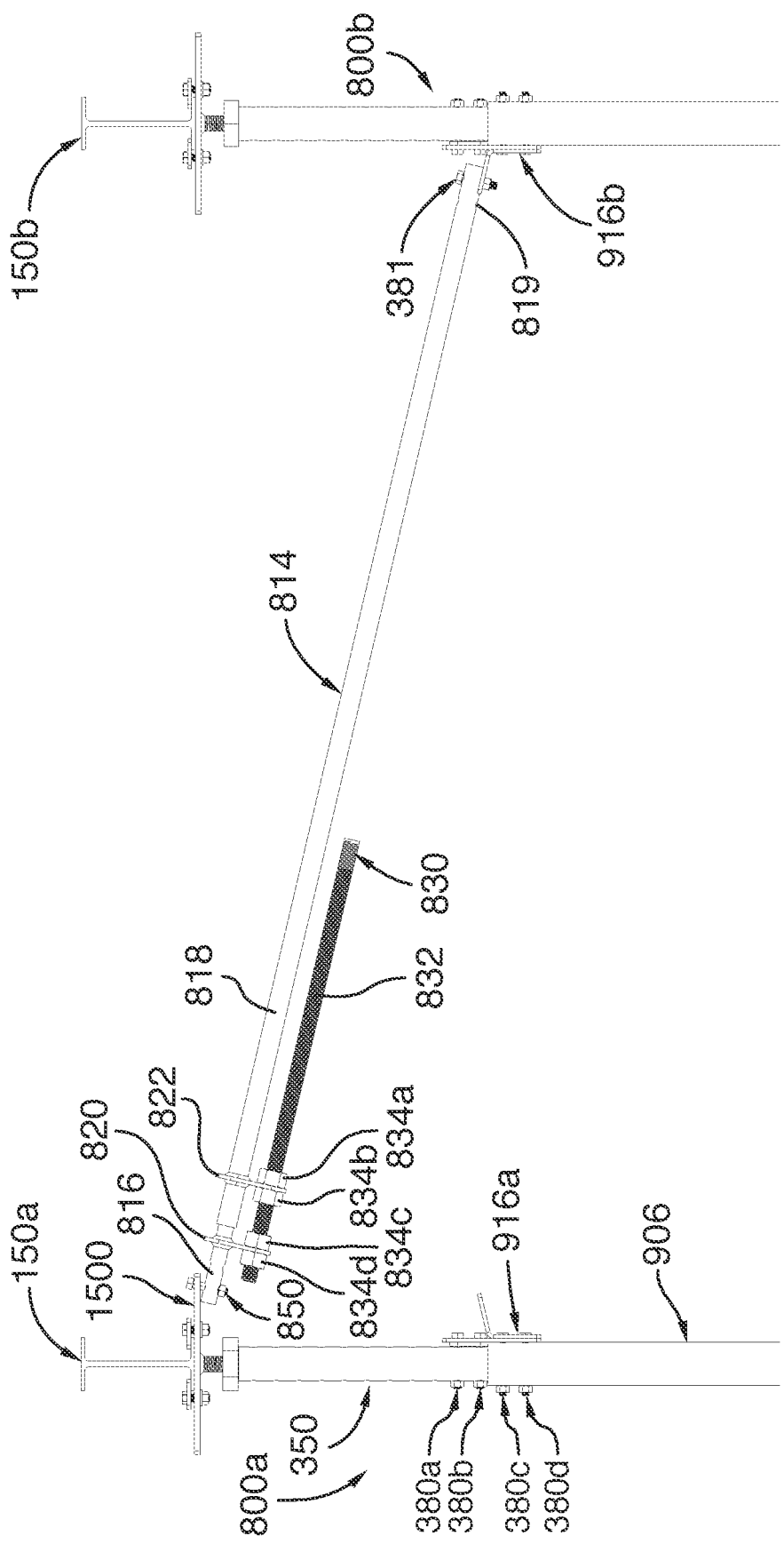
Figure 19:
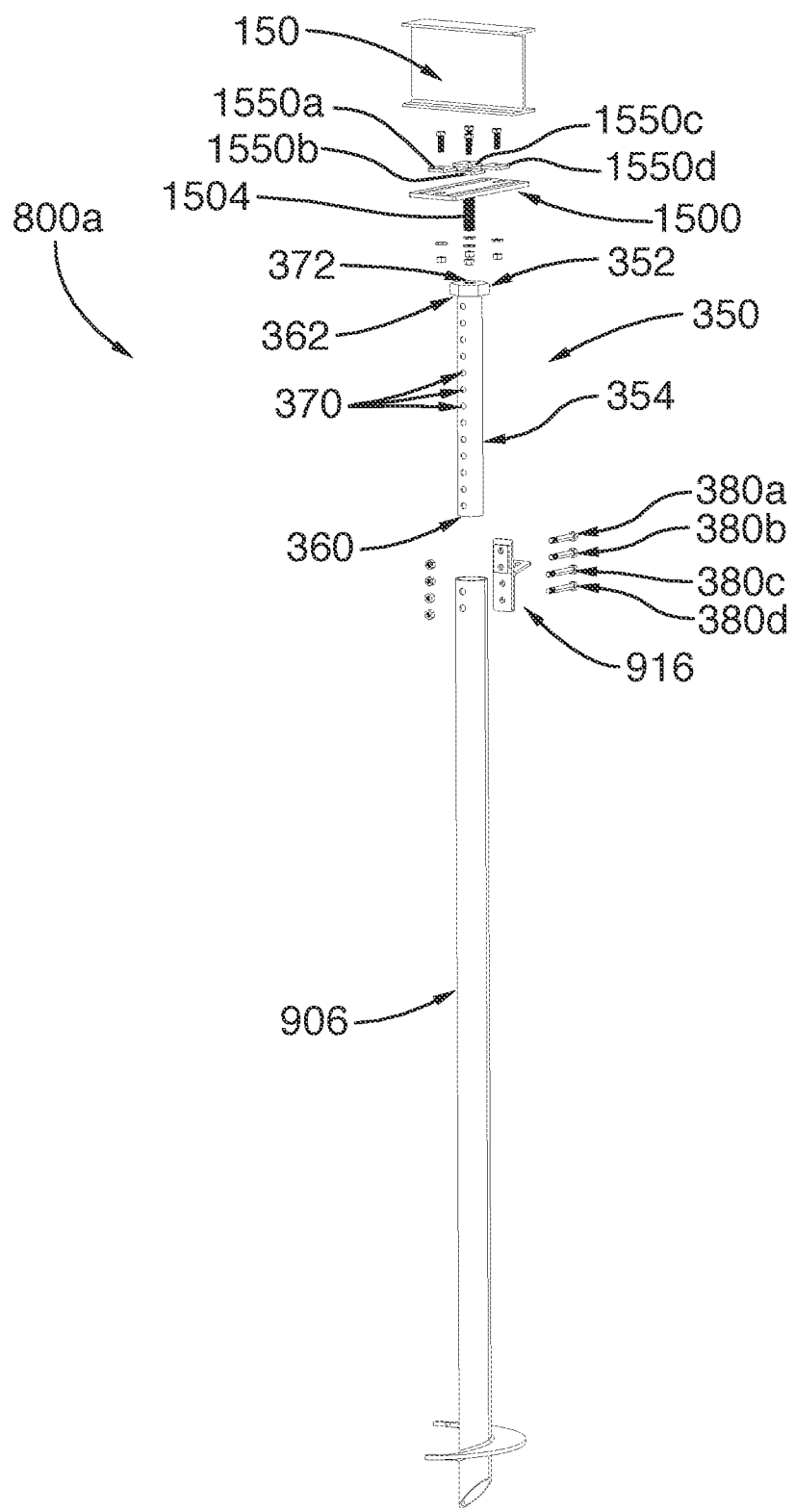
Figure 20:
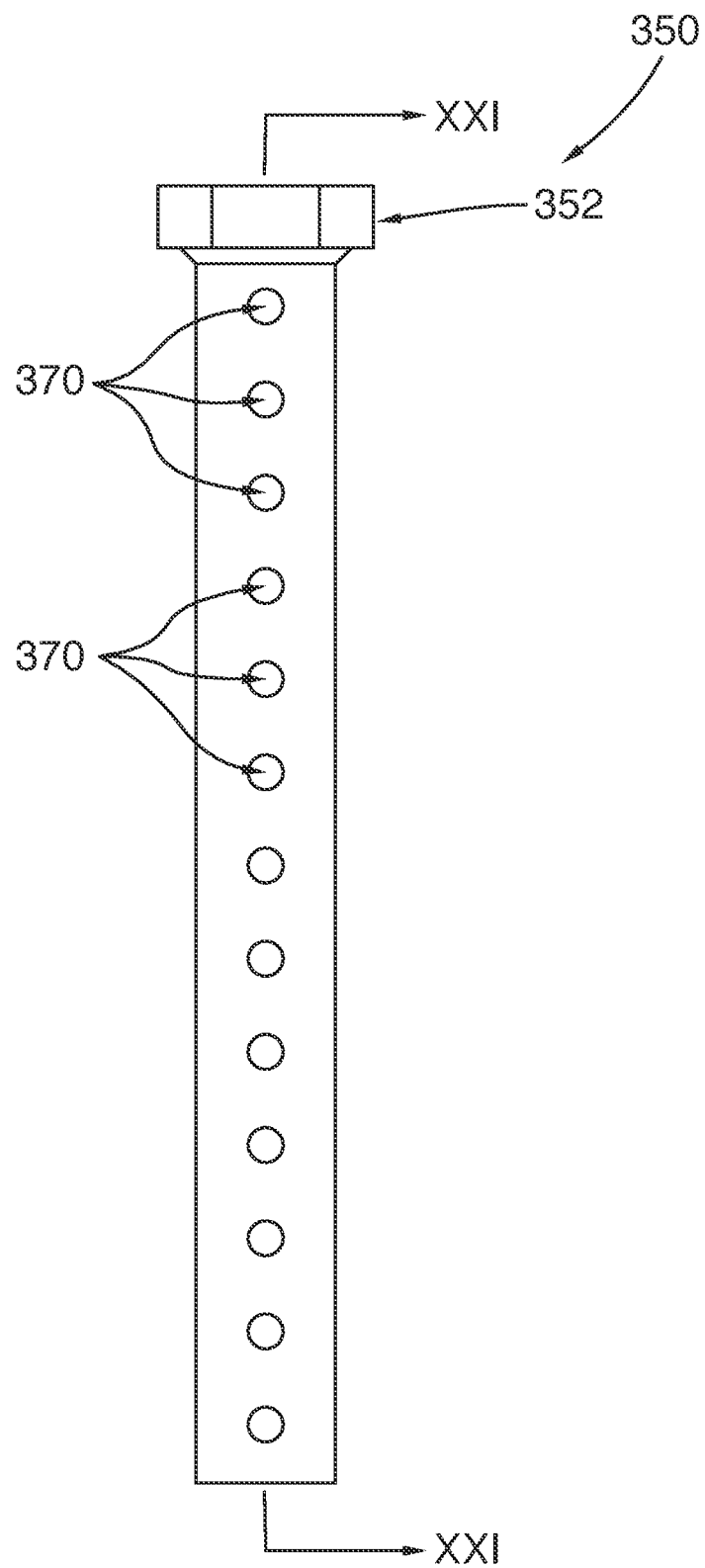
Figure 21:
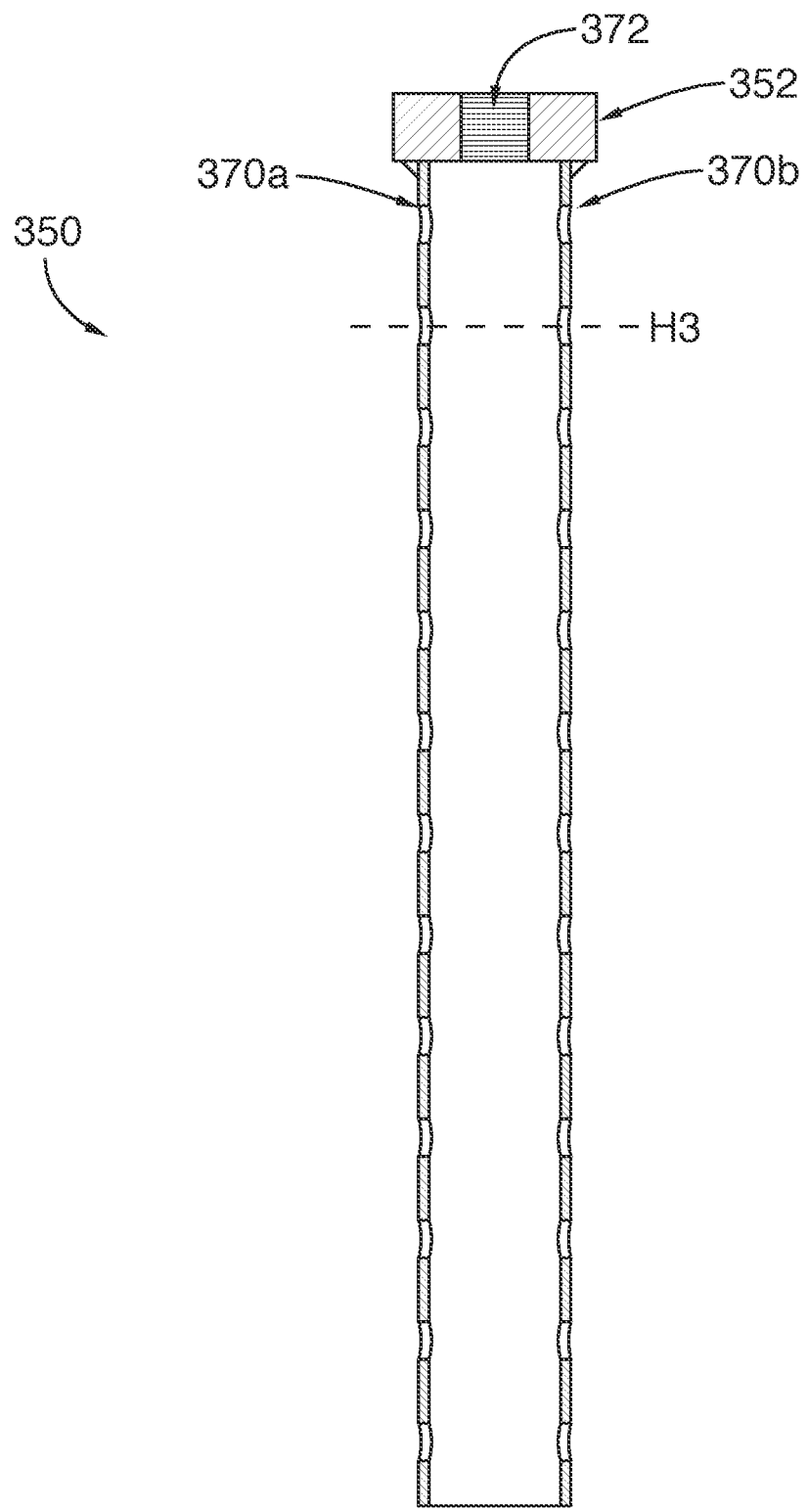
Figure 22:
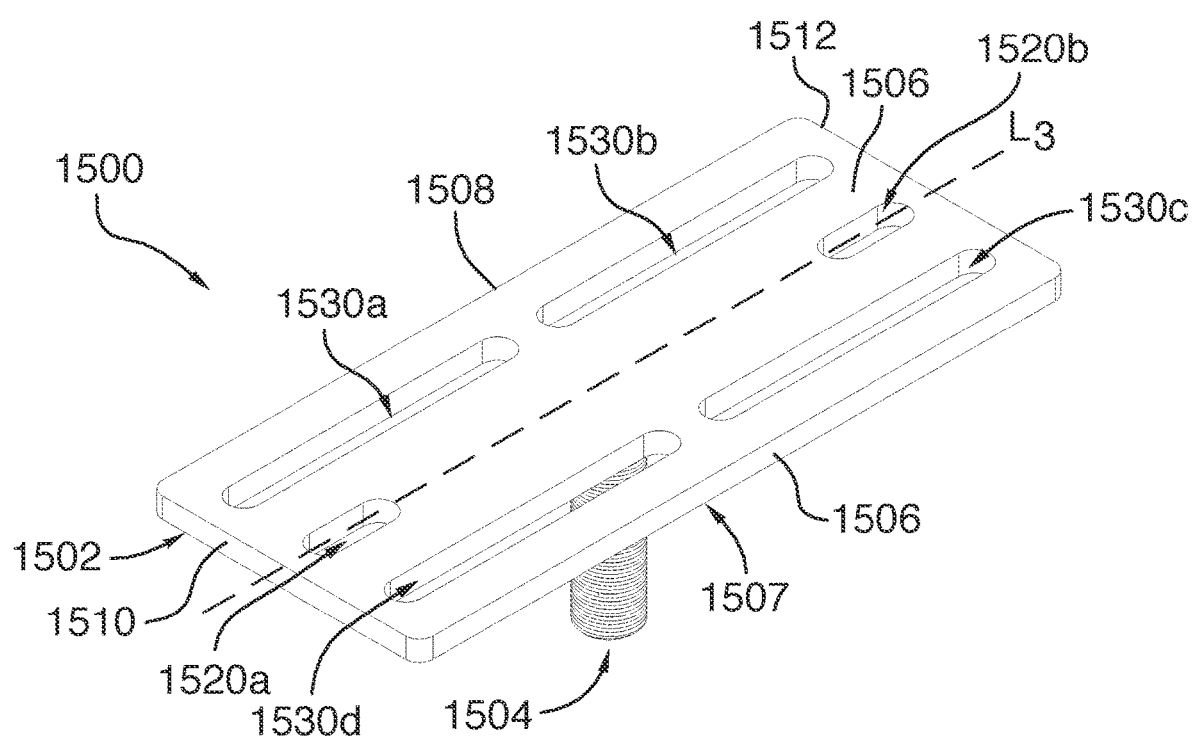
Figure 23A:
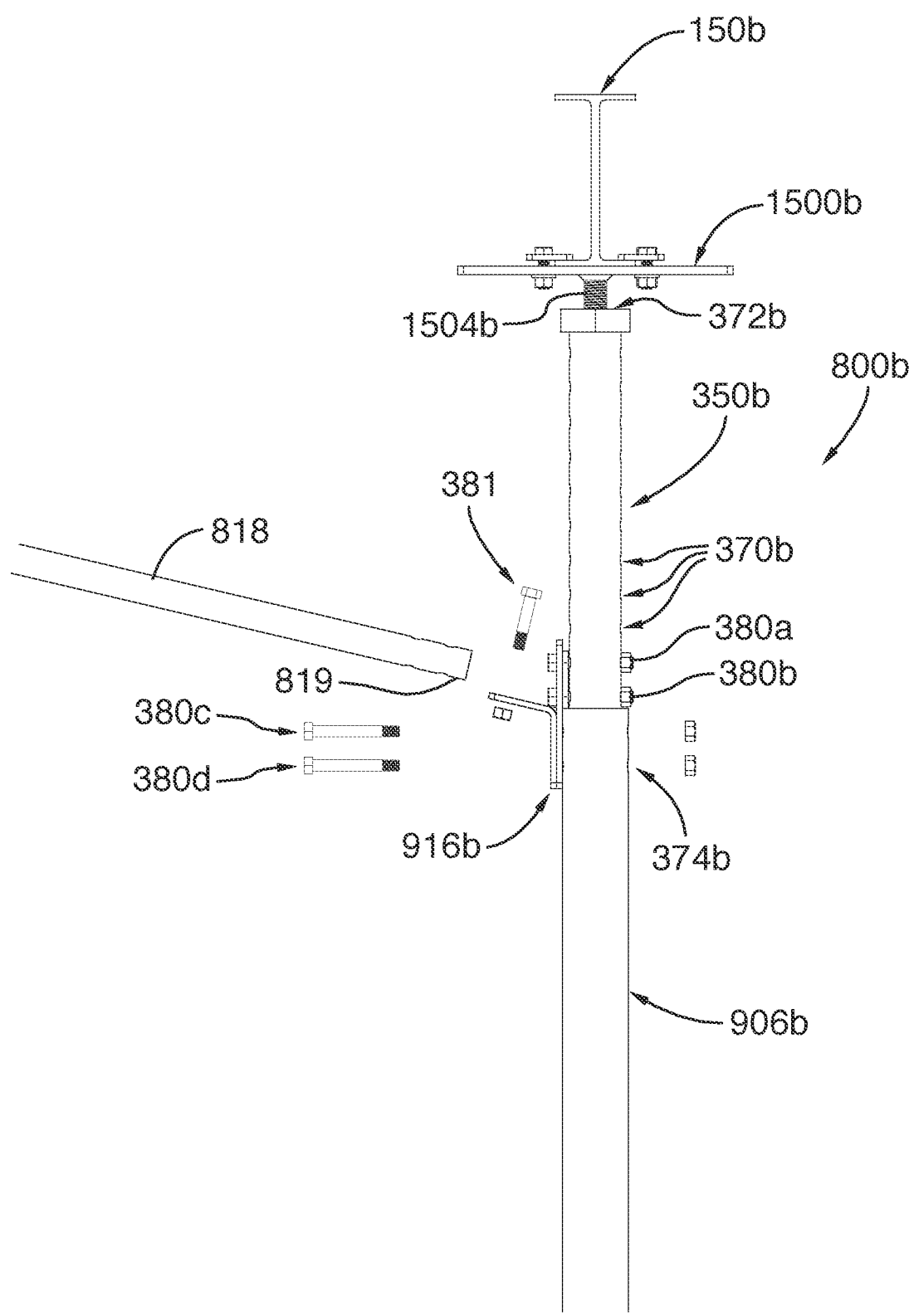
Figure 23B:
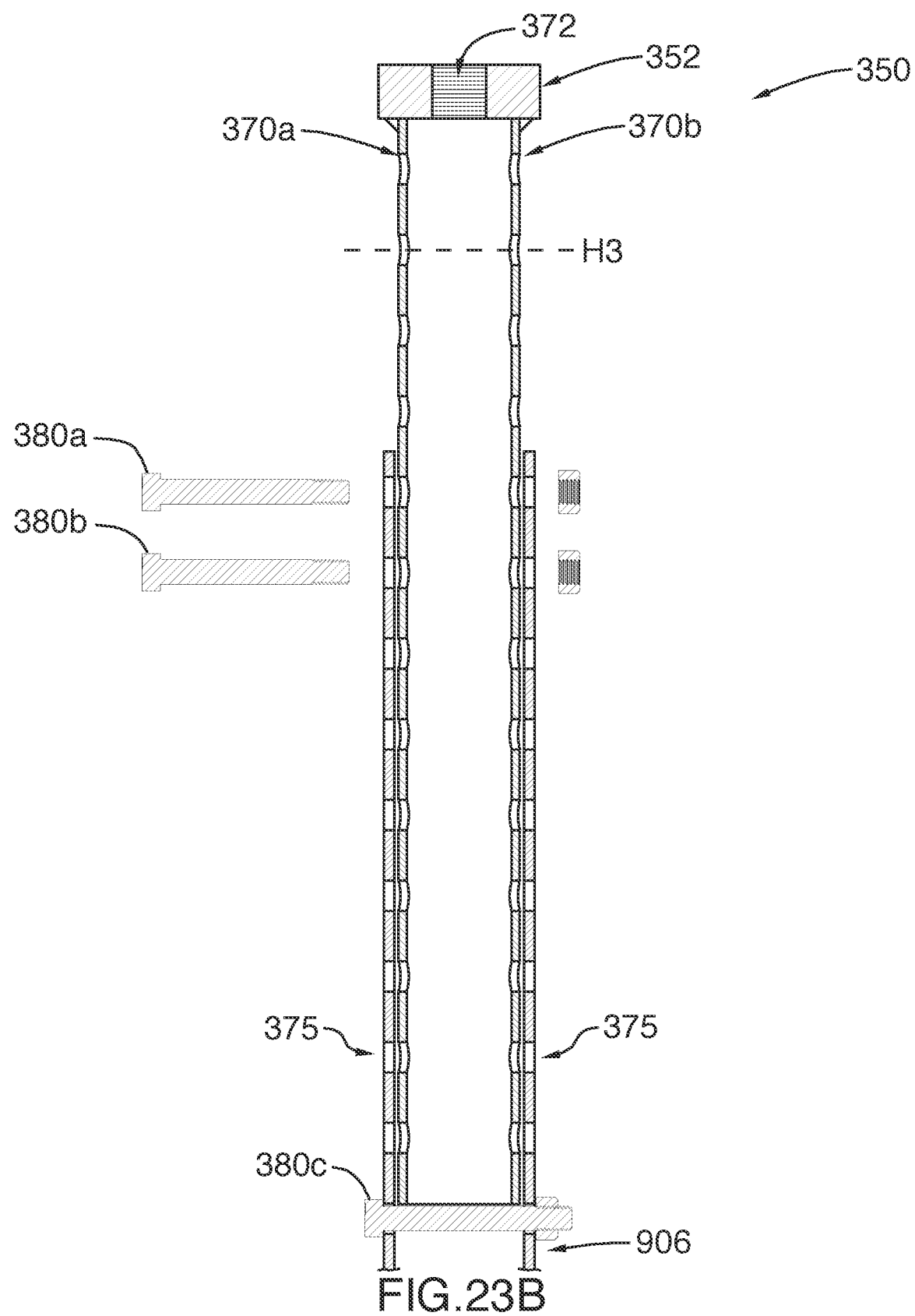
Figure 24:
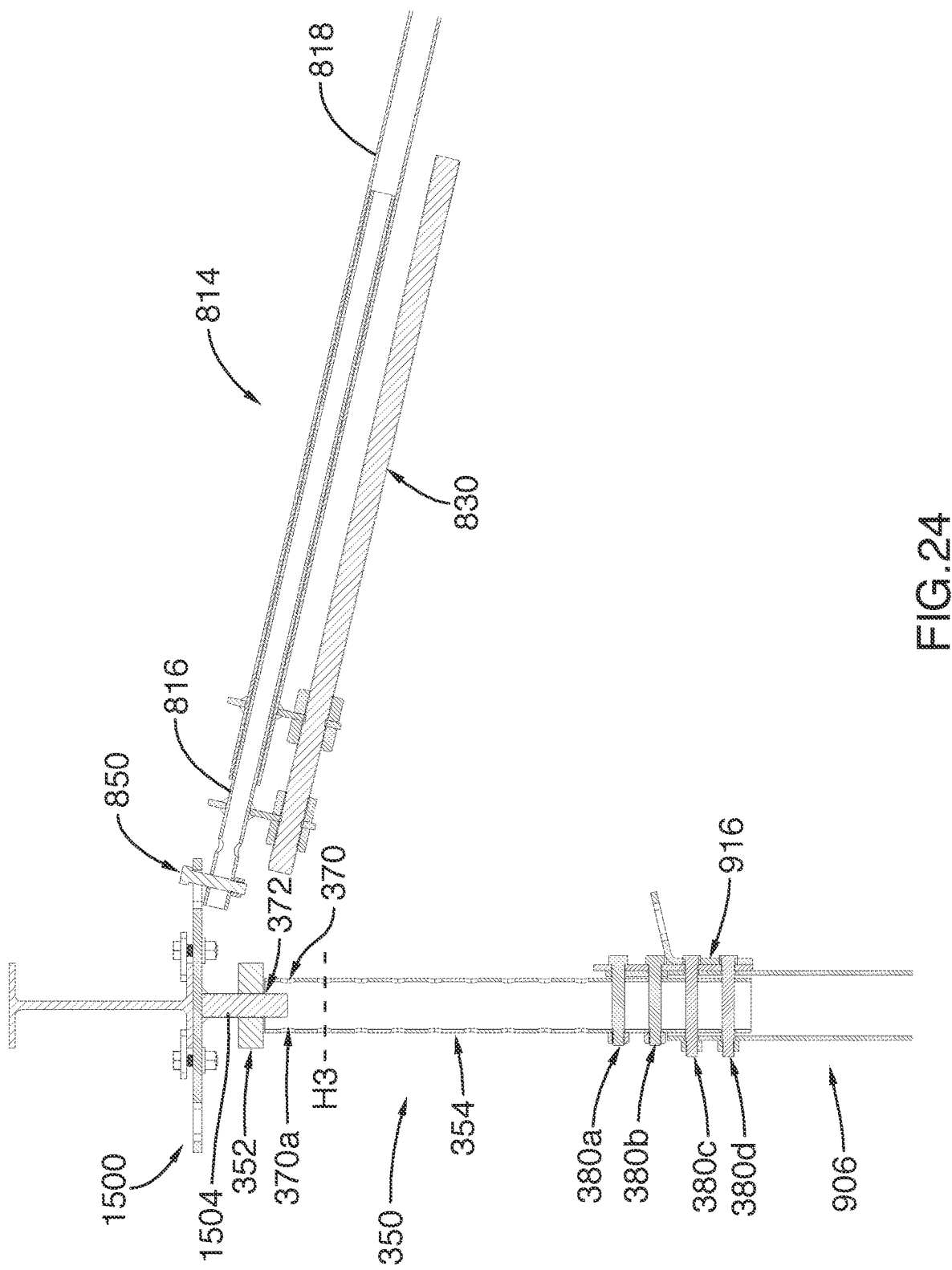
Figure 25:
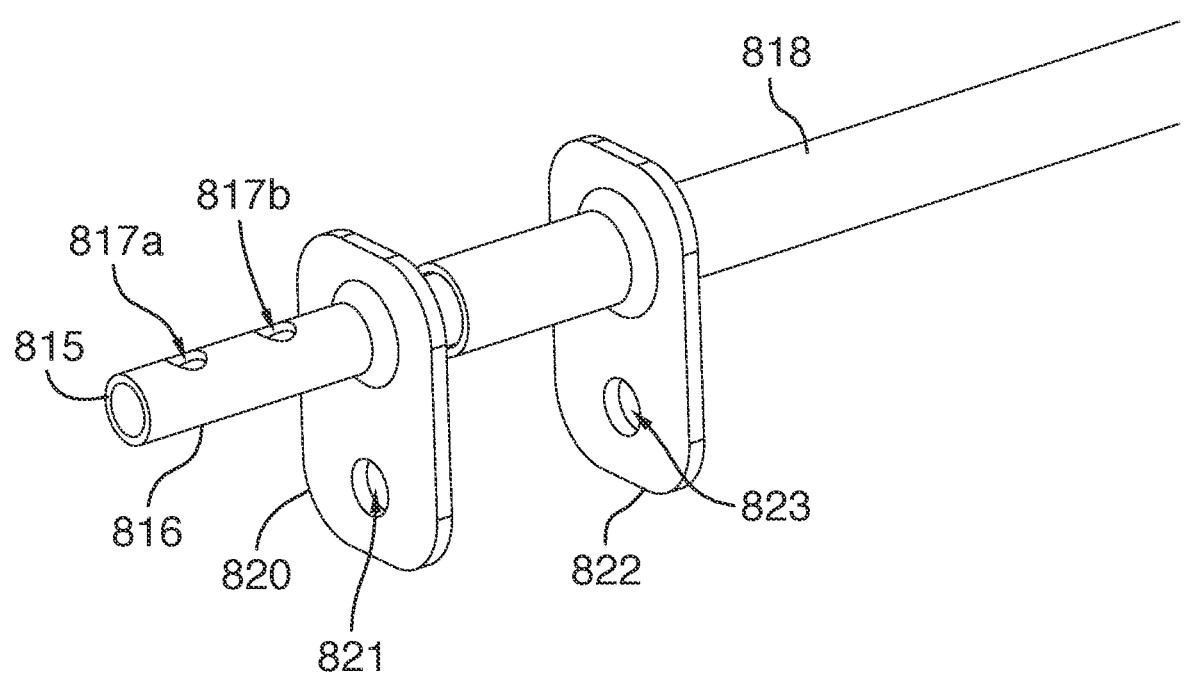
Figure 26:
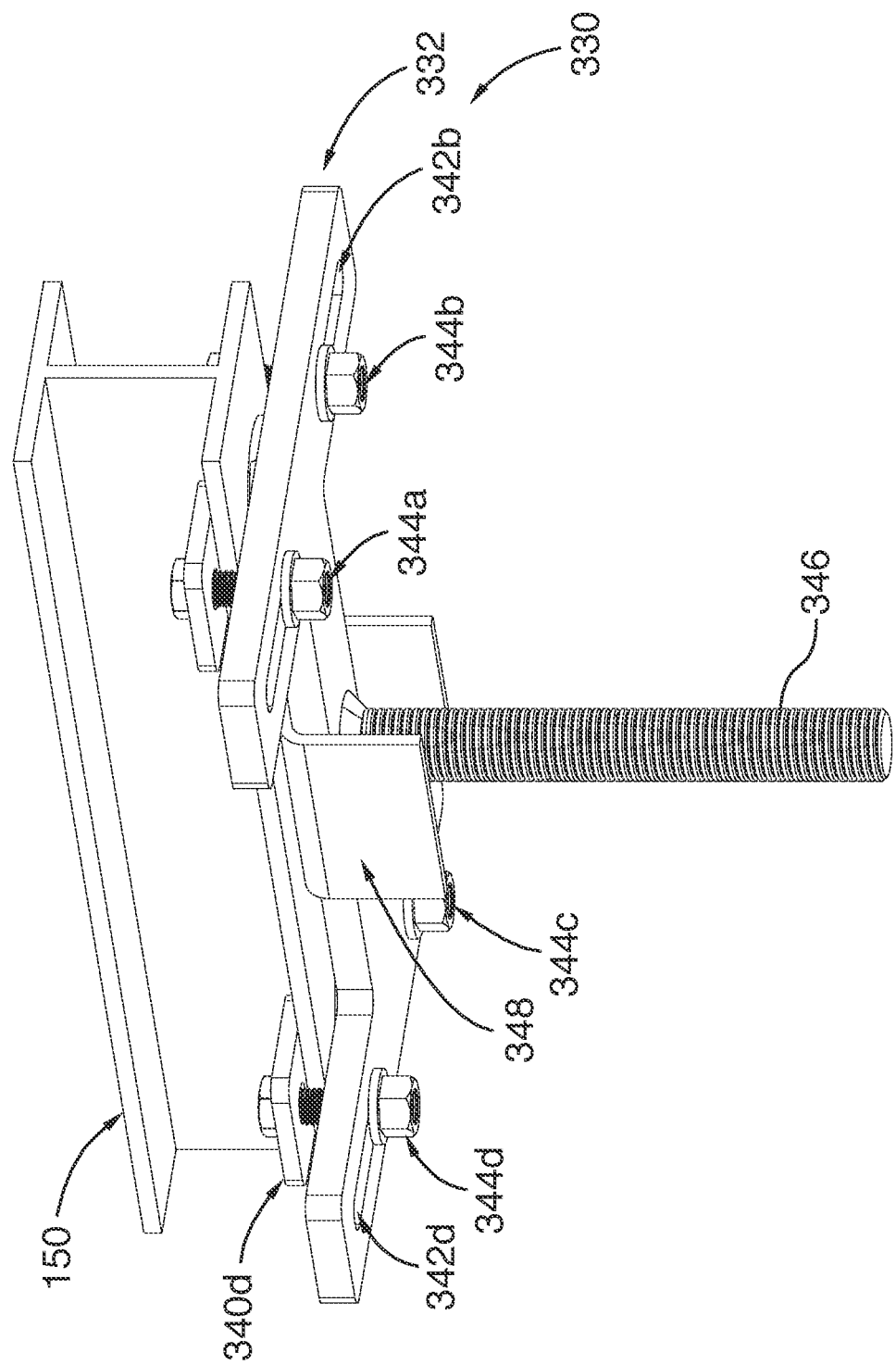
Figure 27:
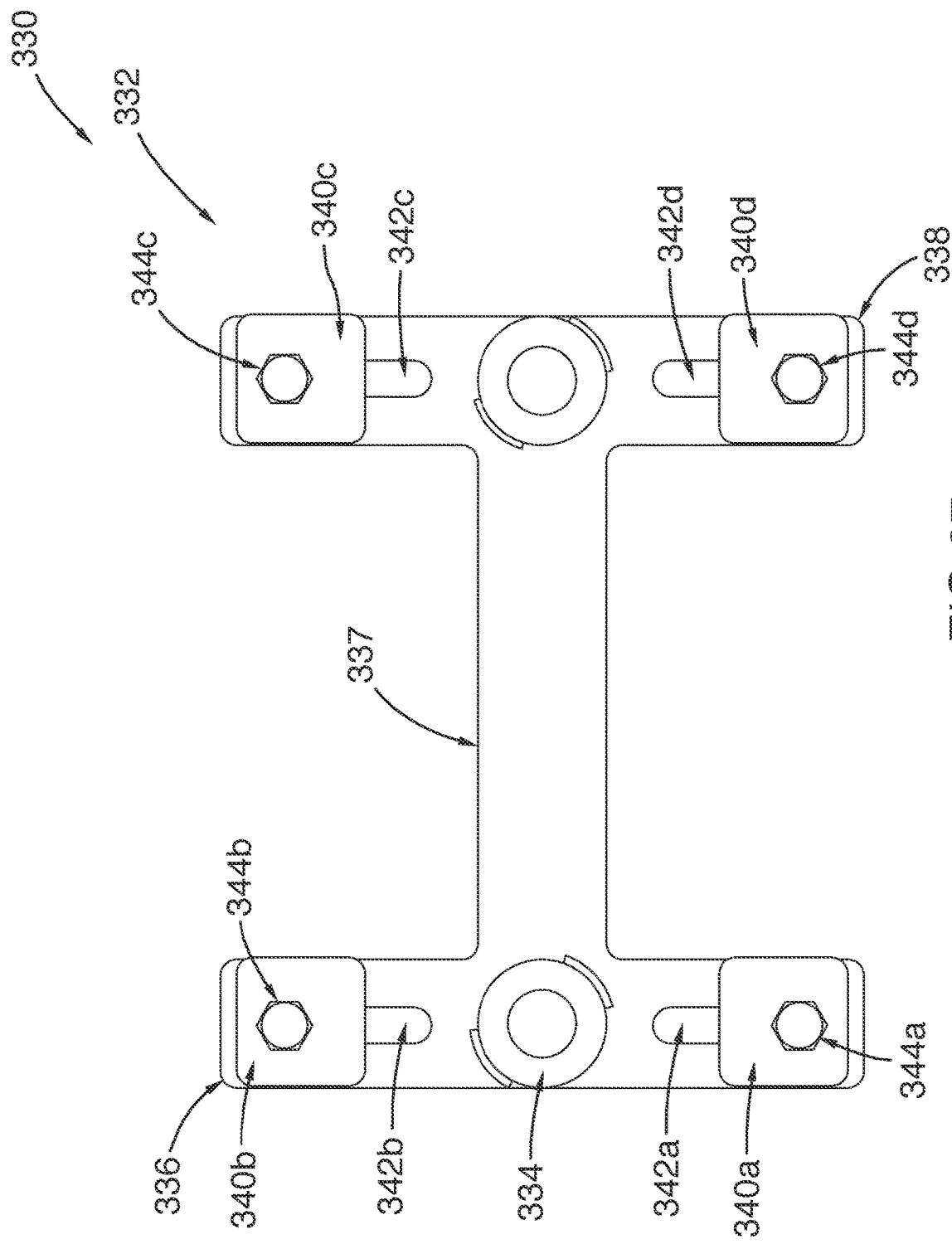
Figure 28:
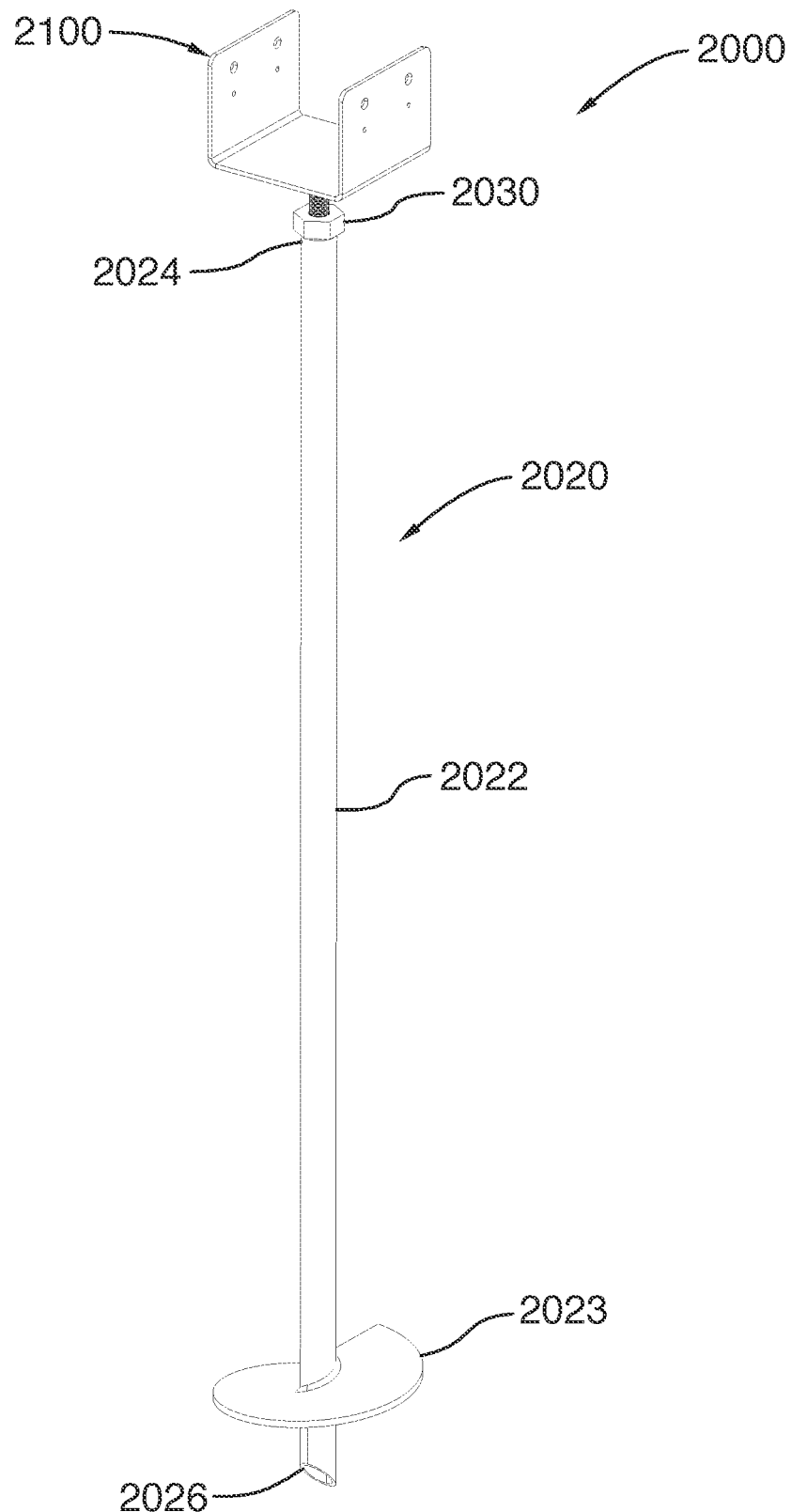
Figure 29:
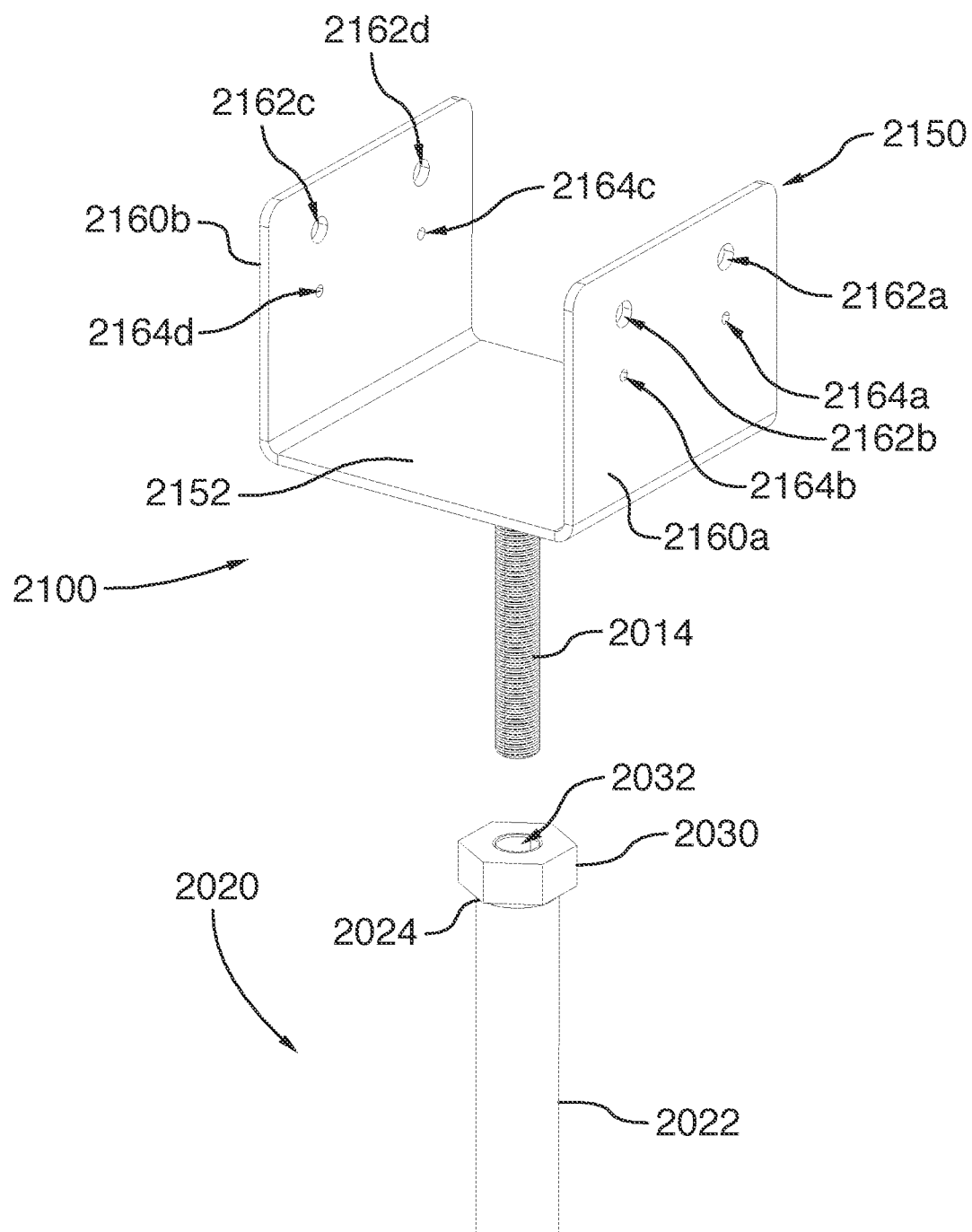
Figure 30:
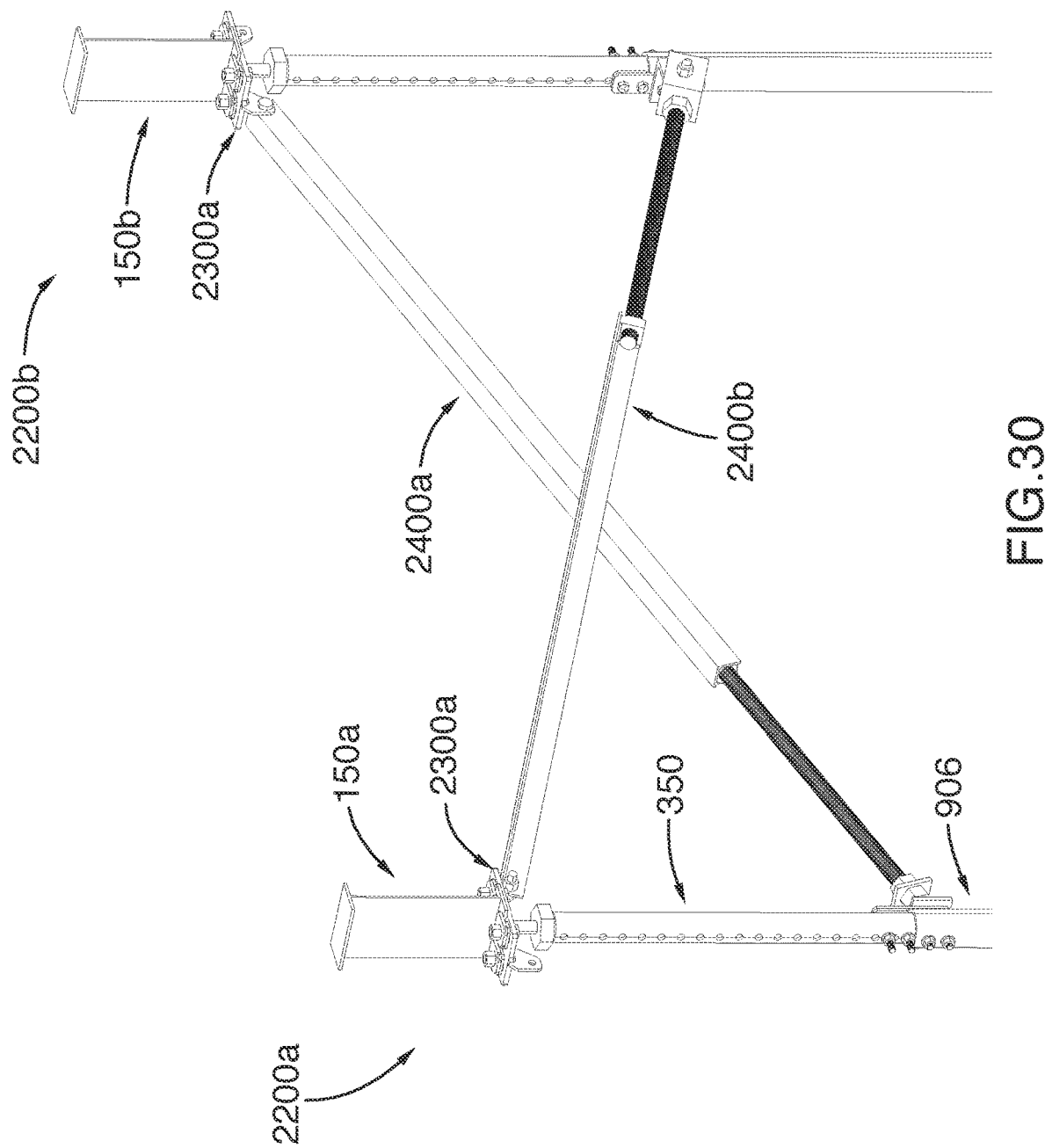
Figure 31:
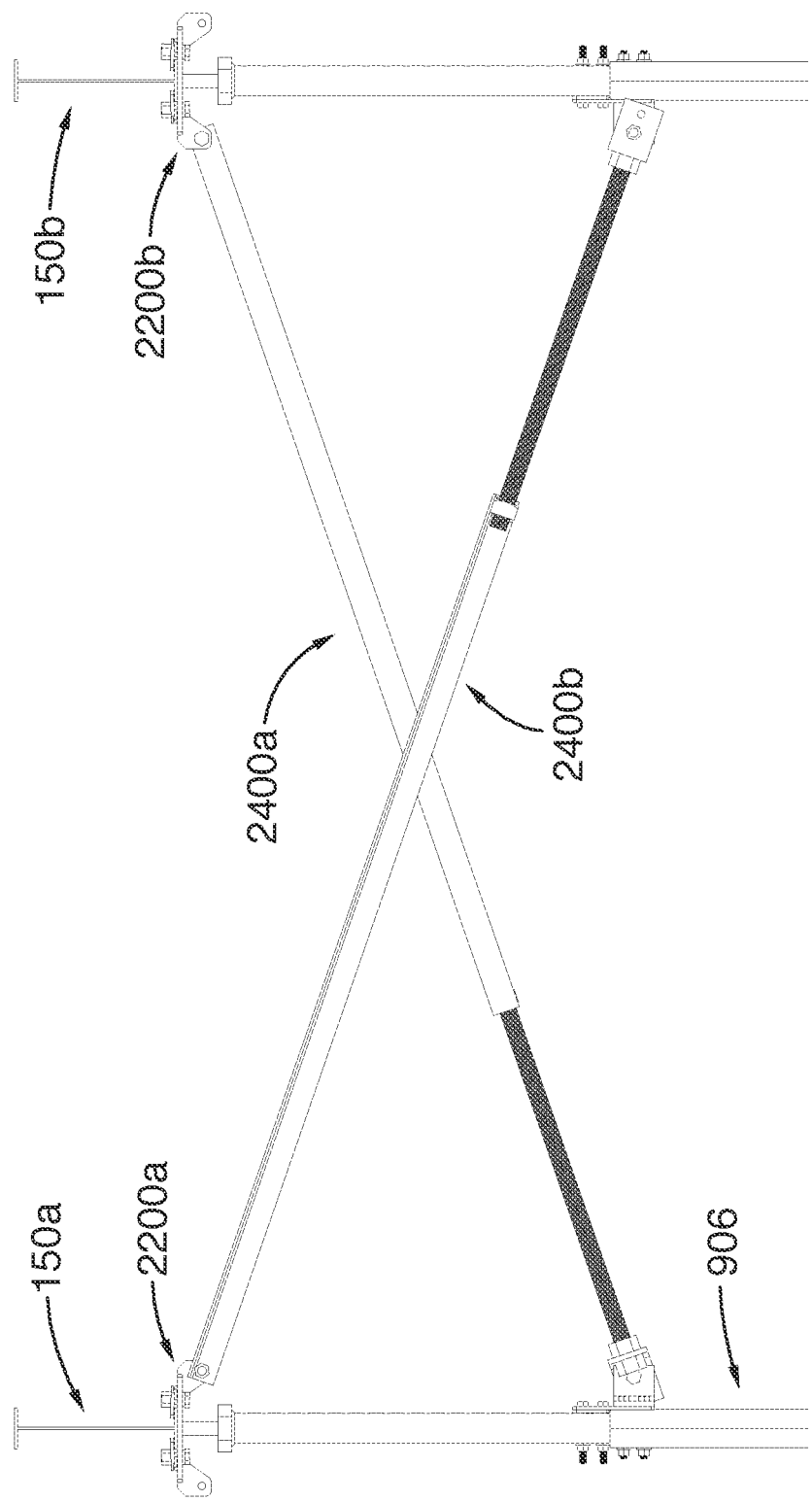
Figure 32:
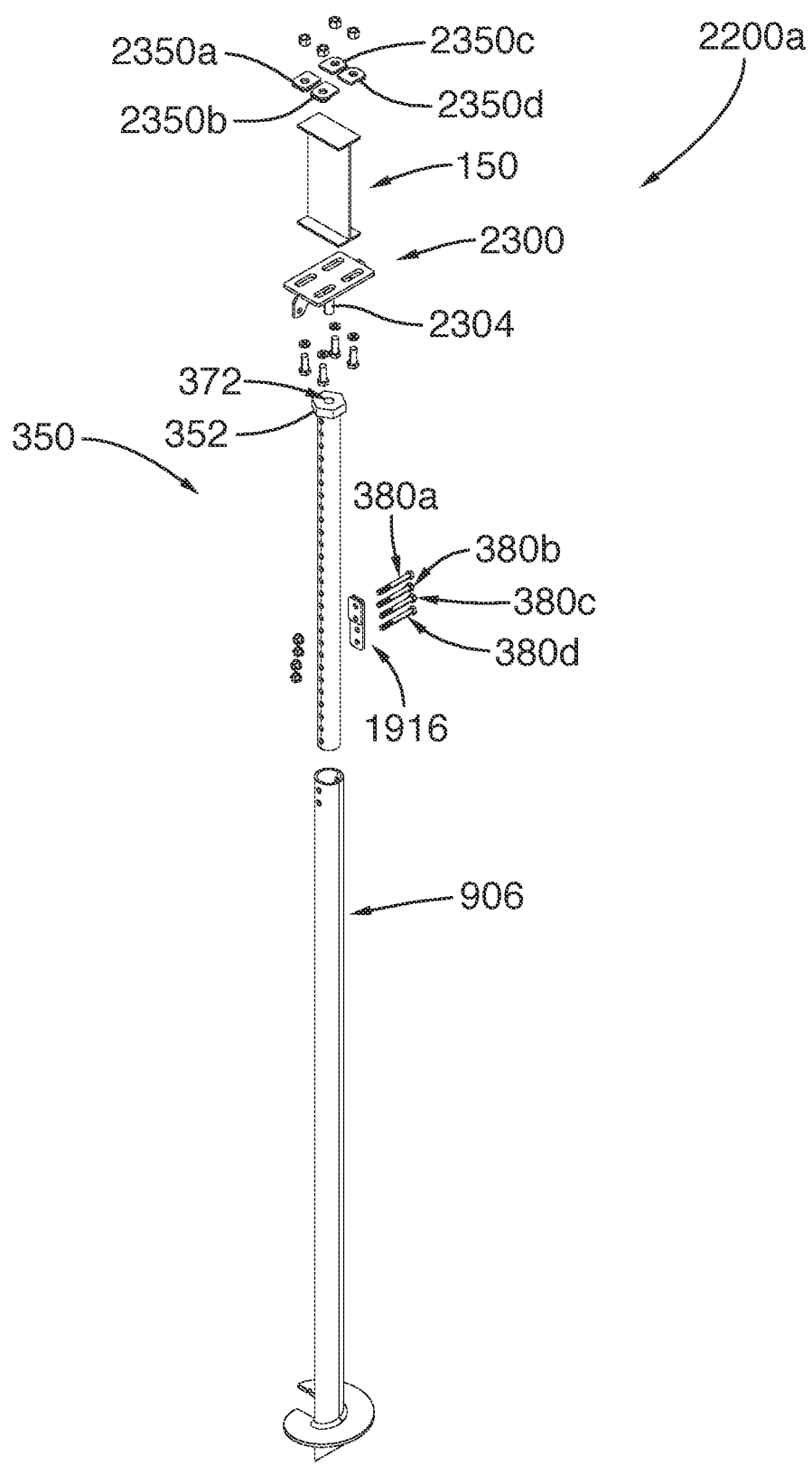
Figure 33:
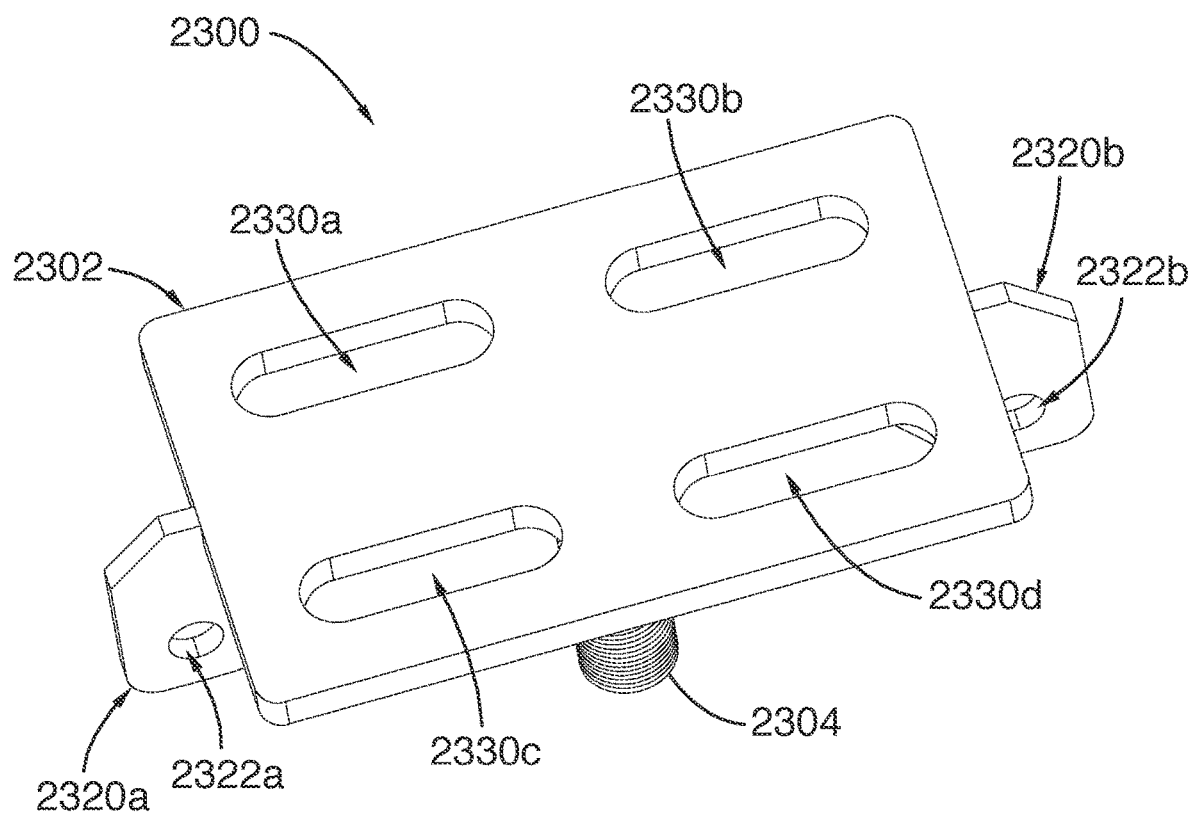
Figure 34:
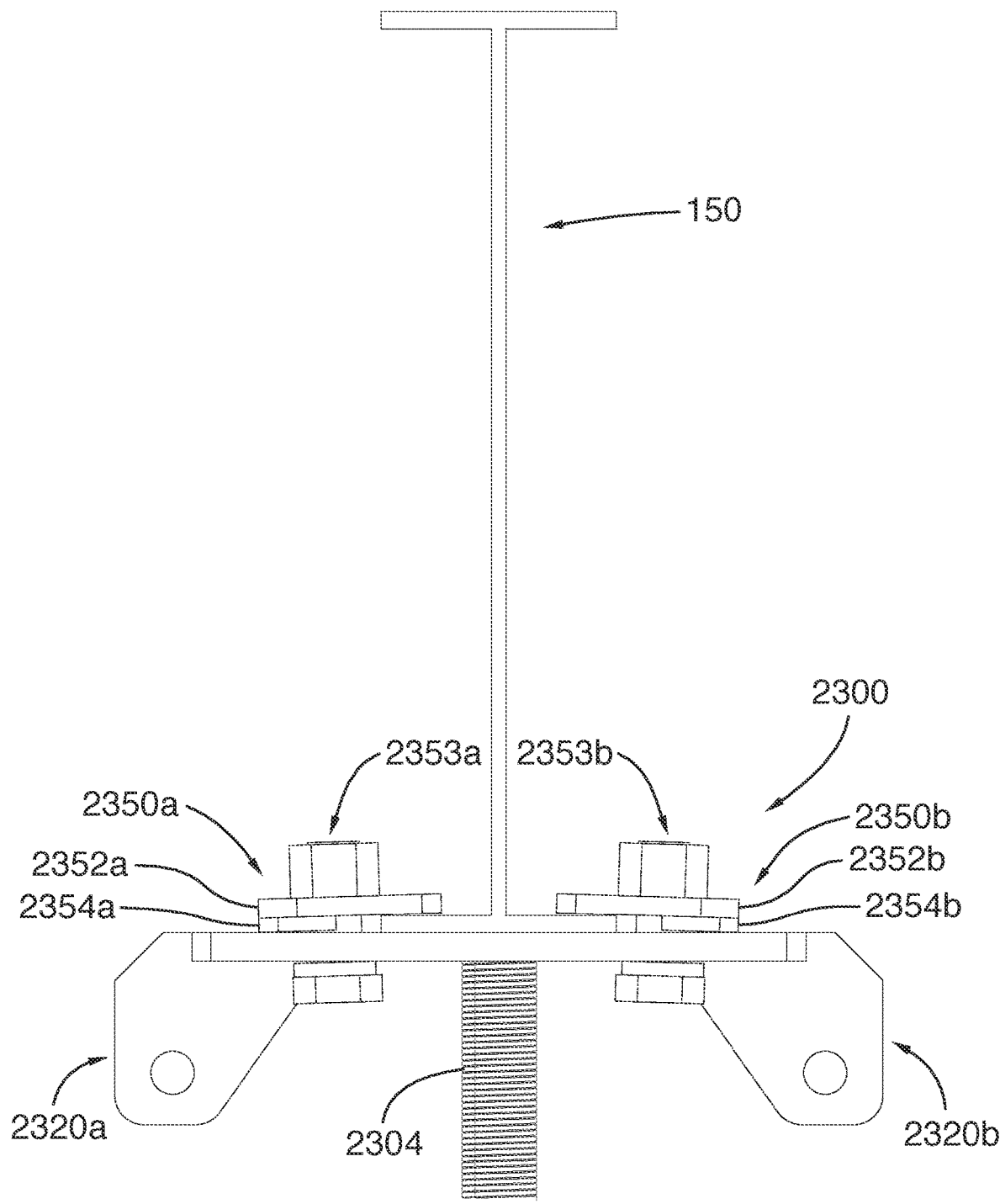
Figure 35:
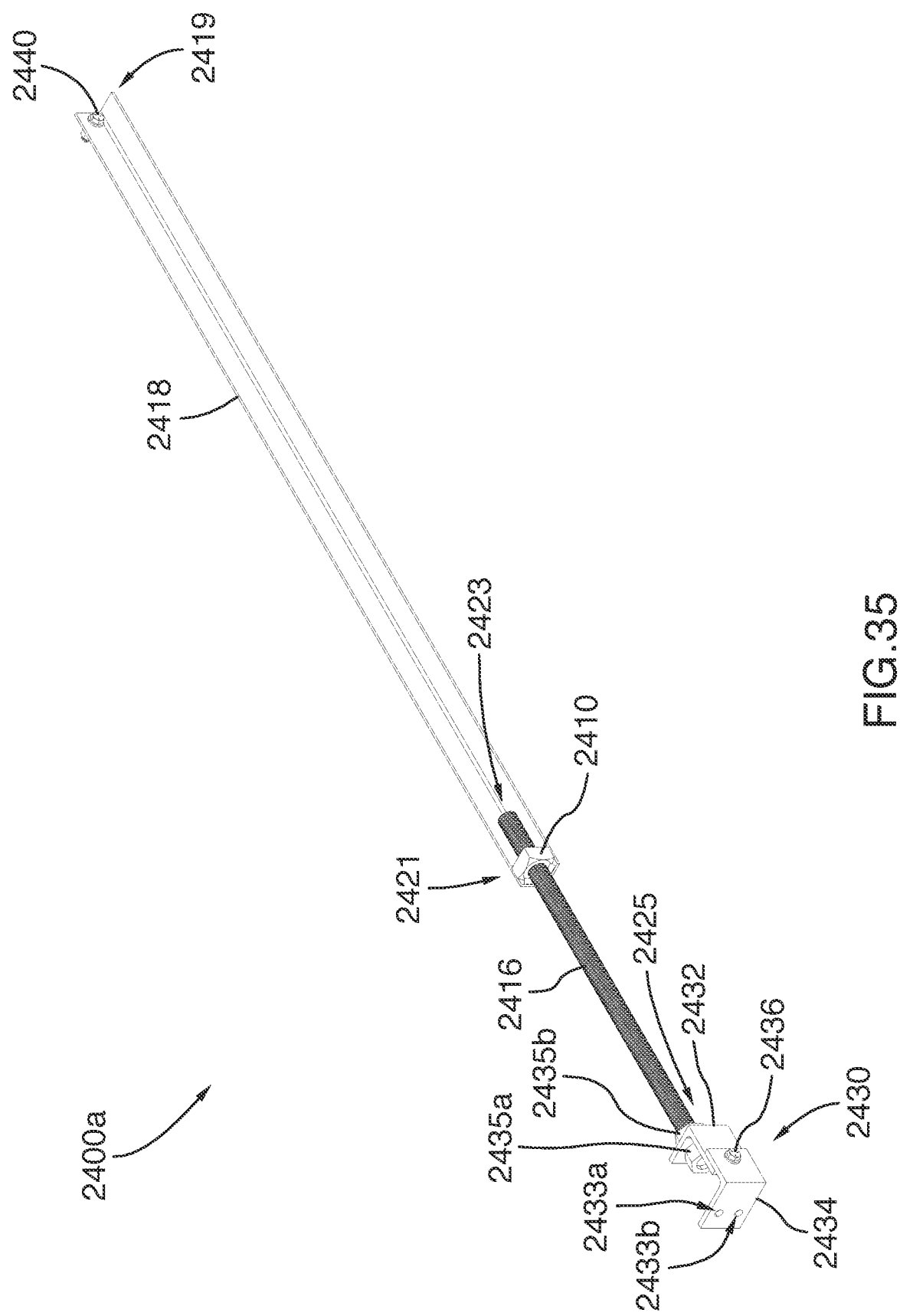
Figure 36:
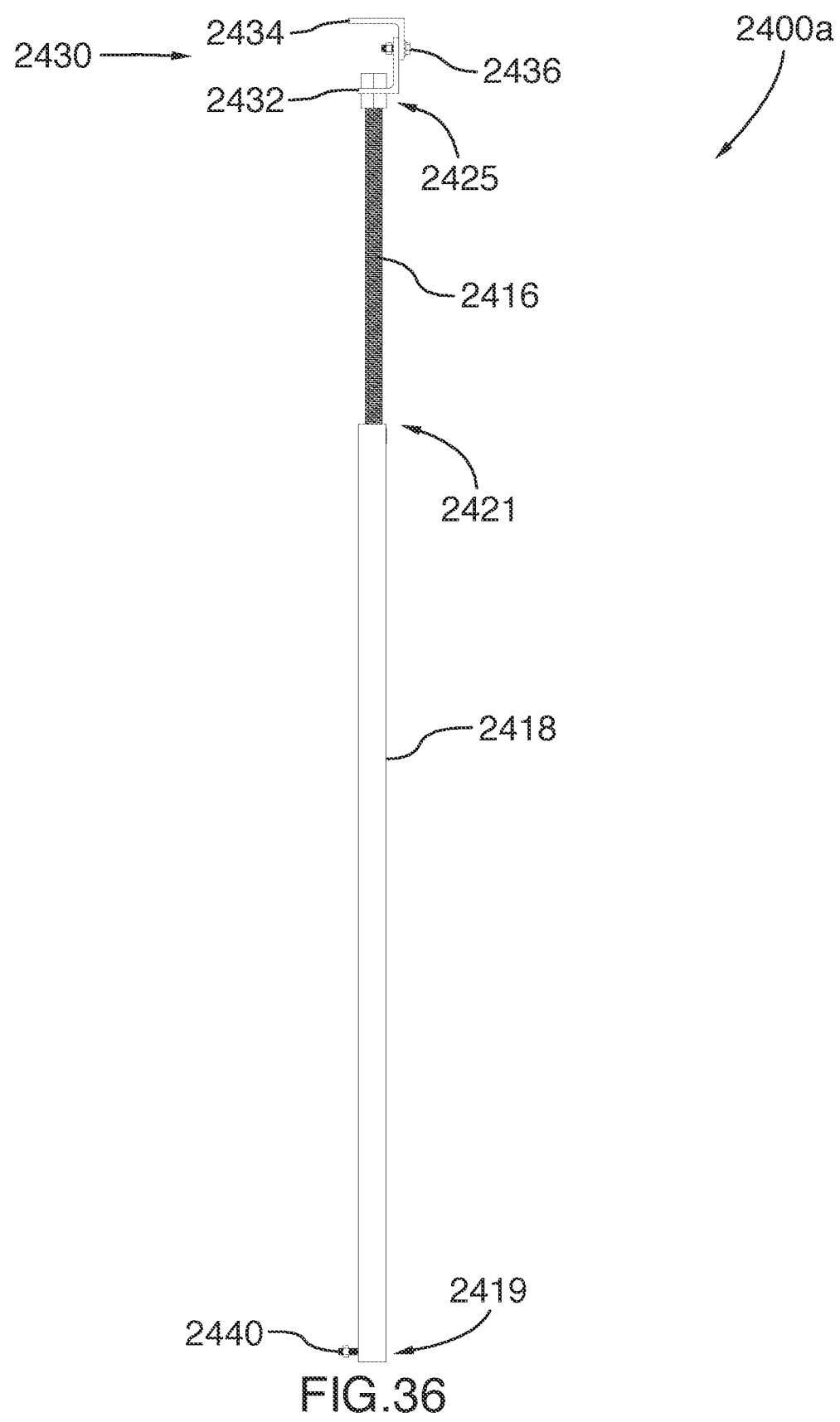
Figure 37:
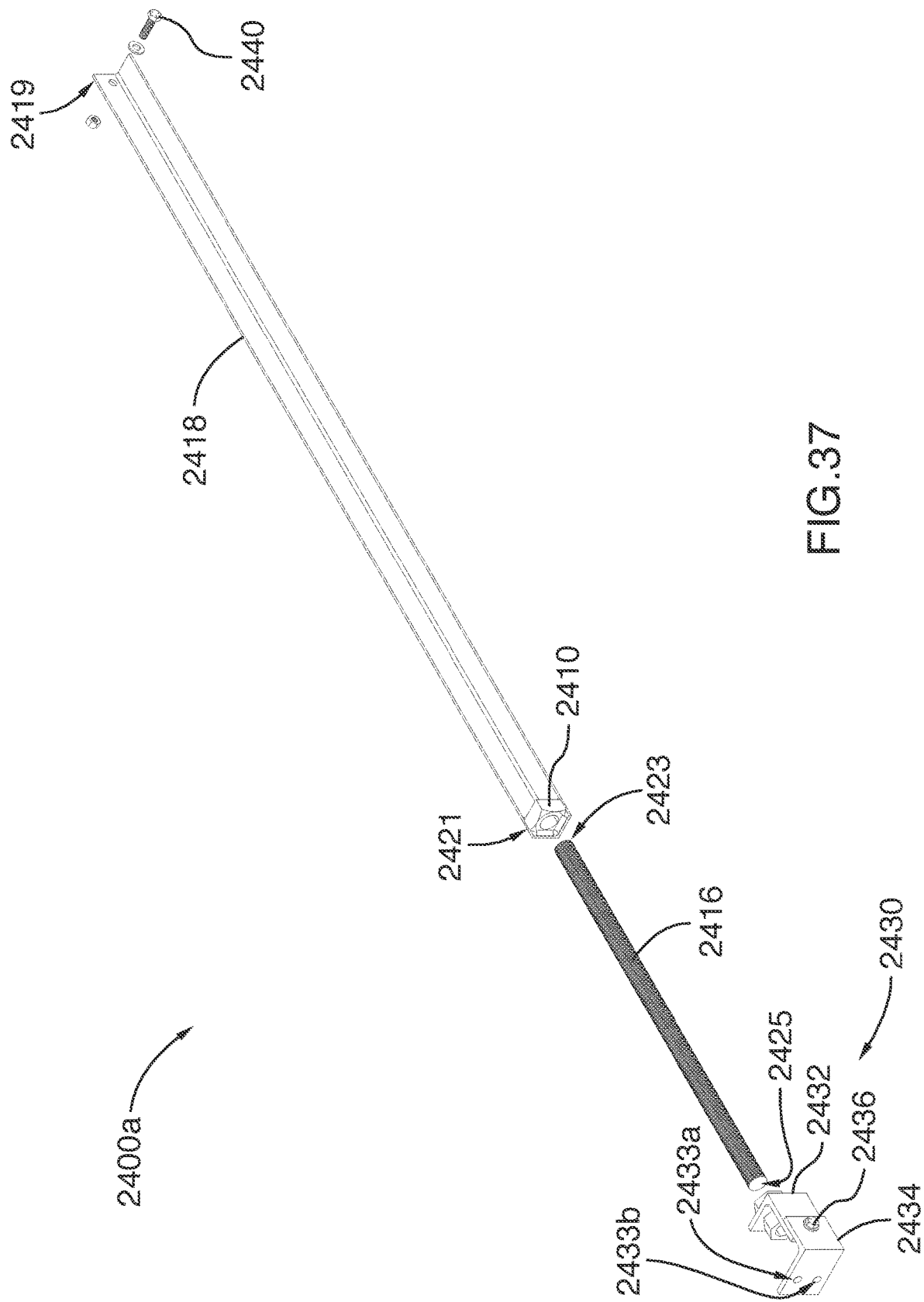
Figure 38:
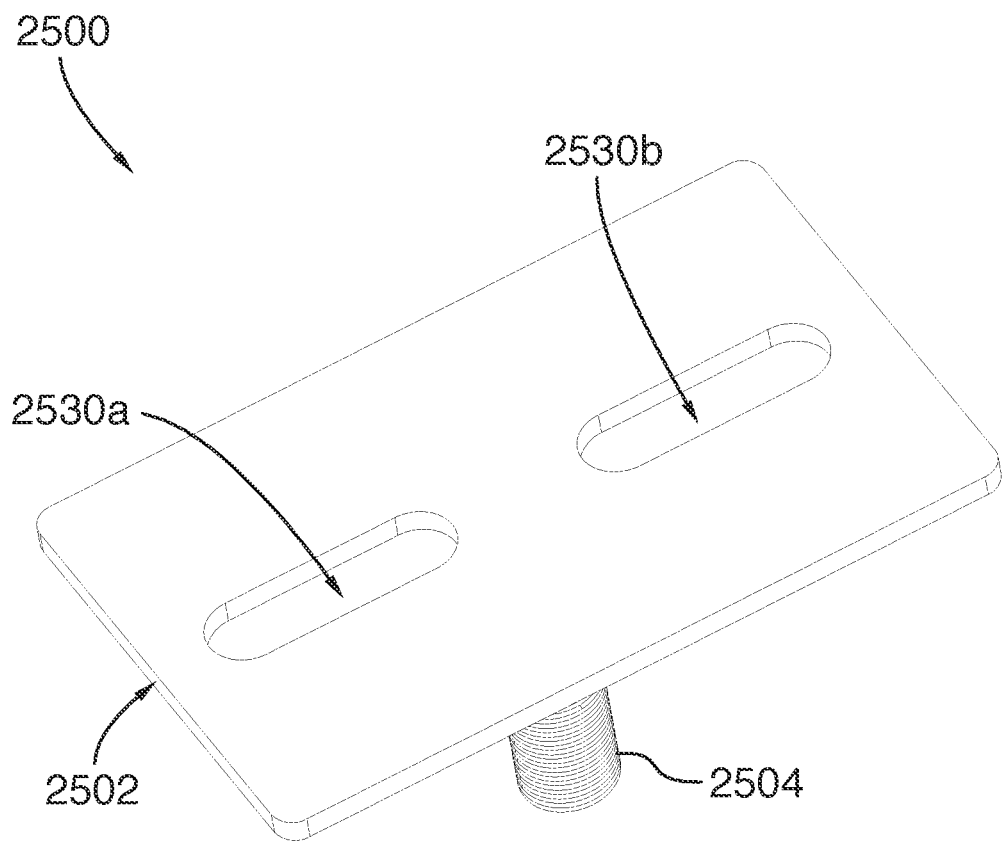

9, for better showing the pile head and the extendable member including the upper brace bracket;

FIG. 14 is a top perspective view of an extendable member for the support assembly illustrated in FIG. 11;

FIG. 15 is a front elevation view of the extendable member for the support assembly illustrated in FIG. 14;

FIG. 16 is a bottom plan view of the extendable member illustrated in FIG. 14;

FIG. 17 is a top left perspective view of a pair of support assemblies for supporting a pair of support beams of manufactured home, in accordance with yet an alternative embodiment;

FIG. 18 is a front elevation view of the pair of support assemblies illustrated in FIG. 17;

FIG. 19 is an exploded top left perspective view of one of the support assemblies illustrated in FIG. 17;

FIG. 20 is a front elevation view of a mounting member of the support assembly shown in FIG. 19;

FIG. 21 is a cross-section view of the mounting member illustrated in FIG. 20, taken along cross-section line XXI-XXI;

FIG. 22 is a top left perspective view of an extendable member for a support assembly, in accordance with an alternate embodiment;

FIG. 23A is a partially exploded, front elevation view of one of the support assembly shown in FIG. 17;

FIG. 23B is a cross-section view of a bottom pile segment, with a mounting member positioned thereon, in accordance with an alternate embodiment;

FIG. 24 is a cross-section view of a portion of one of the support assemblies and brace assembly illustrated in FIG. 17, taken along cross-section line XXIV-XXIV;

FIG. 25 is an enlarged perspective view of a portion of a telescopic brace member of the brace assembly illustrated in FIG. 17;

FIG. 26 is a bottom left perspective view of an extendable member with a support beam mounted thereto, in accordance with an alternate embodiment;

FIG. 27 is a top plan view of a support platform of the support assembly illustrated in FIG. 26;

FIG. 28 is a top right perspective view of a support assembly, in accordance with yet another alternative embodiment;

FIG. 29 is an enlarged exploded view of a portion of the support assembly shown in FIG. 28, for better showing yet another embodiment of an extendable member;

FIG. 30 is a top left perspective view of a pair of support assemblies for supporting a pair of support beams of a manufactured home, in accordance with an alternative embodiment;

FIG. 31 is a front elevation view of the pair of support assemblies illustrated in FIG. 30;

FIG. 32 is a partially exploded, top left perspective view of one of the support assemblies illustrated in FIG. 30;

FIG. 33 is a top left perspective view of the extendable member of the support assembly illustrated in FIG. 32;

FIG. 34 is a front elevation view of the extendable member illustrated in FIG. 33 supporting a support beam of a manufactured home using holding members;

FIG. 35 is a top left perspective view of one of the brace members illustrated in FIG. 30;

FIG. 36 is side elevation view of the brace member illustrated in FIG. 35;

FIG. 37 is a partially exploded, top left perspective view of the brace member illustrated in FIG. 35; and FIG. 38 is a top left perspective view of an extendable member for a support assembly, in accordance with an alternative embodiment.

DETAILED DESCRIPTION

Figure 1:
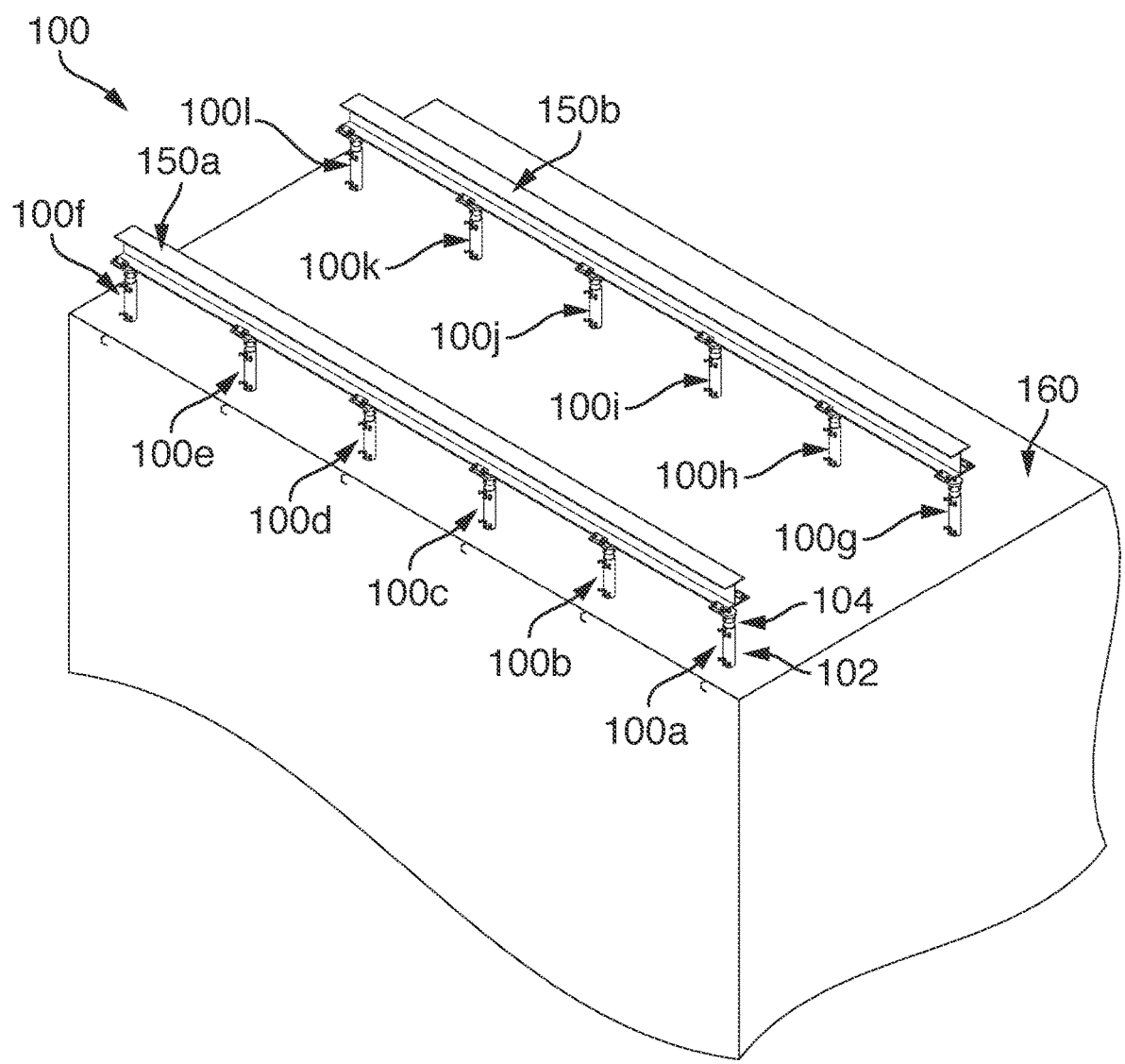
FIG. 1 is a top left perspective view of a plurality of support assemblies for supporting a pair of support beams of a manufactured home, in accordance with one embodiment.

Referring first to FIG. 1, there is shown a plurality of support assemblies 100a-100l for a structure such as a manufactured home (not shown), in accordance with one embodiment. More specifically, FIG. 1 shows two support beams 150a, 150b of a support frame of a manufactured home such as a mobile home (not shown) each support beam 150a, 150b being supported by first, second, third, fourth, fifth and sixth support assemblies 100a-100f and 100g-100l, respectively, which are partially buried in a ground surface 160. It will be understood that each support beam 150a, 150b could instead be supported by more or less than six support assemblies 100a-100l depending of various factors such as the size of the beams, the weight of the manufactured home or any other factor that a skilled addressee may deem appropriate to consider. Further, while the support assemblies 100a-100l are described in connection with the support beams 150a, 150b a manufactured home, it will be understood that support assemblies 100a-100l could be used in connection with other type structures, such as building modules of modular building, decks, patios and the like.

In the illustrated embodiment, the support beams 150a, 150b include I-beams which have I-shaped cross-sections. Alternatively, the support beams 150a, 150b may have different cross-sectional shapes.

Figure 5A:
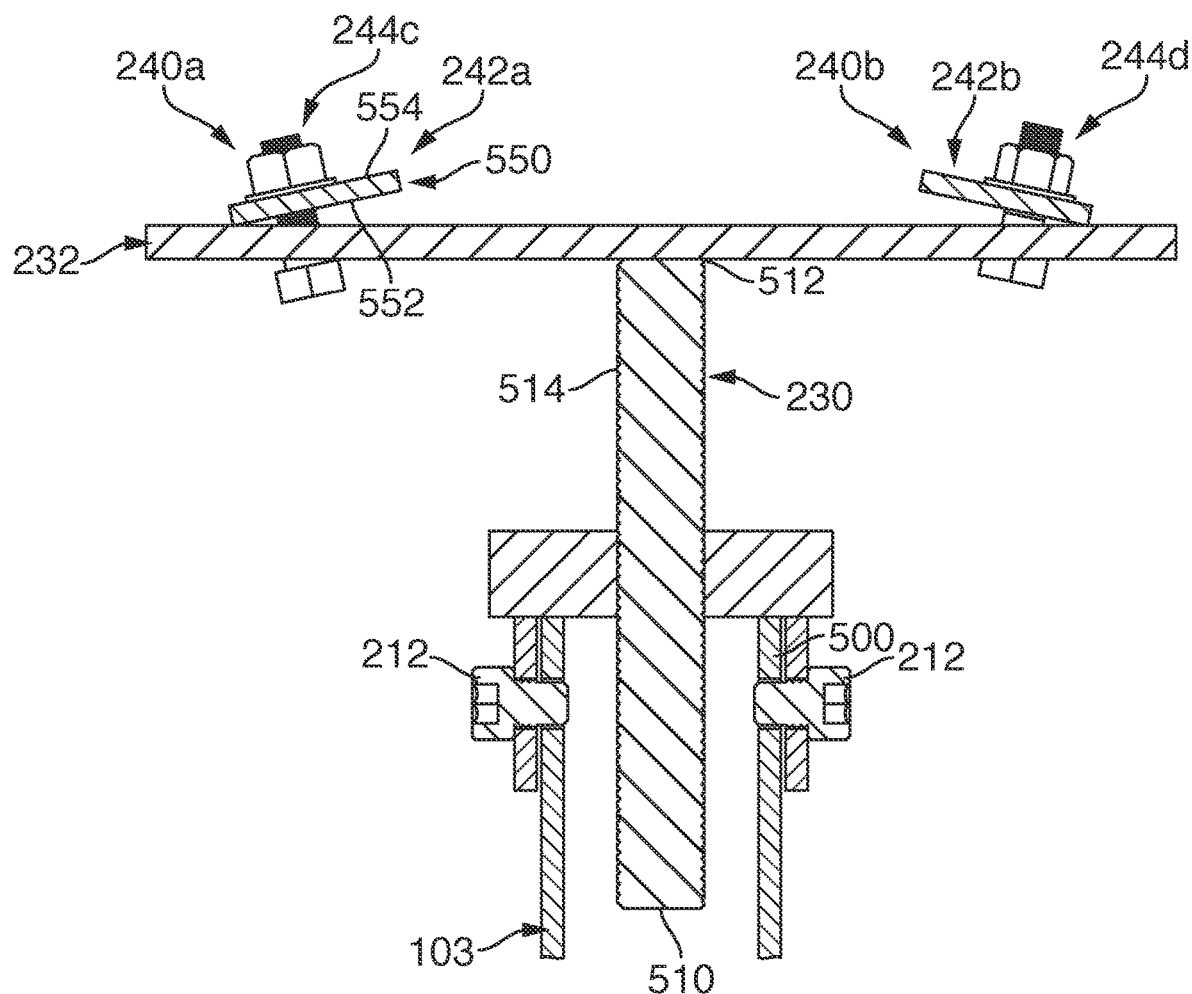
FIG. 5A is a front cross-section view of the support assembly illustrated in FIG. 2, taken along cross-section line VA-VA, with the support beam removed.
Figure 5B:
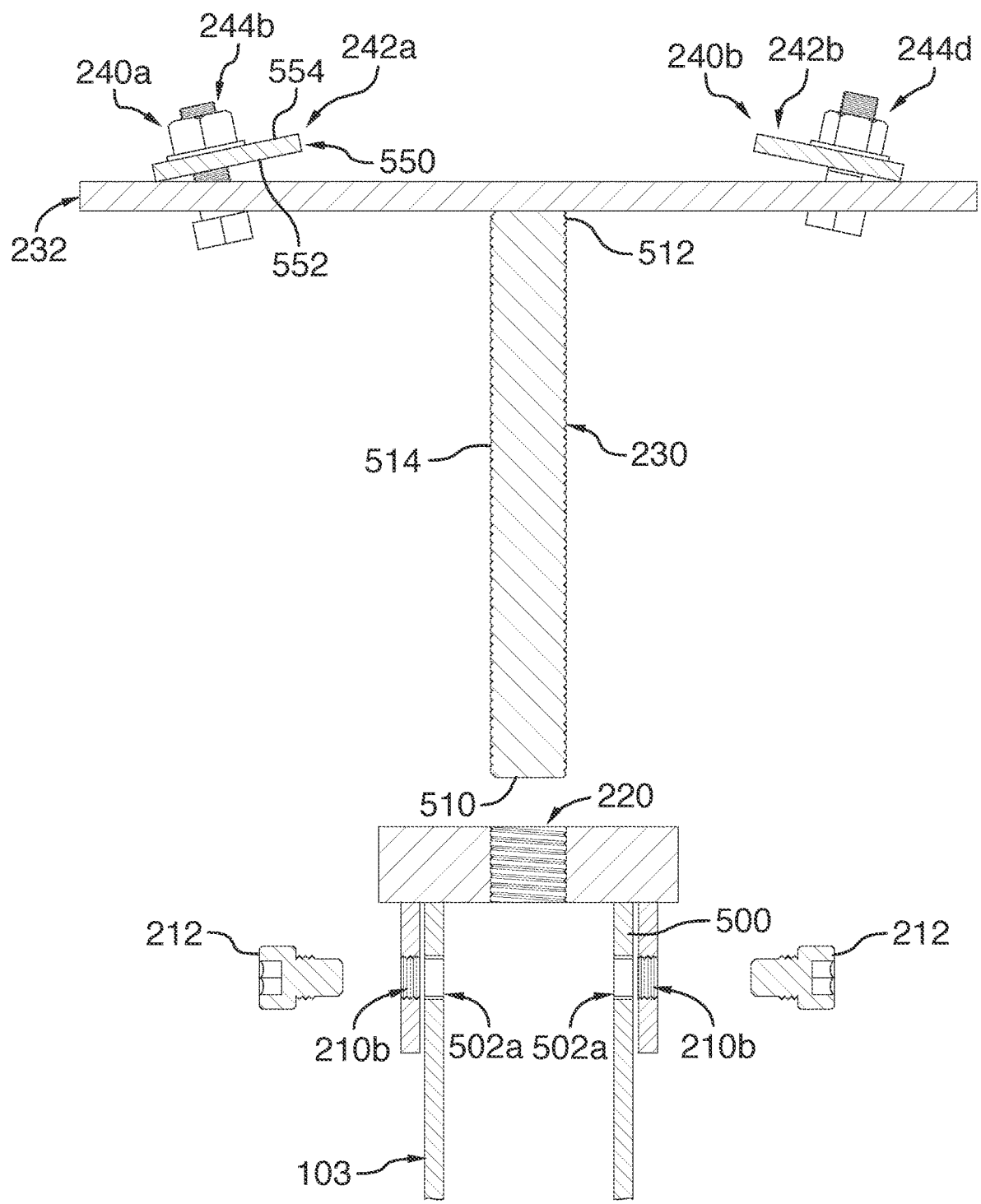
FIG. 5B is a partially exploded view of the support assembly illustrated in FIG. 5A.

Still referring to FIG. 1, each support assembly 100a-100l (e.g. support assembly 100a) includes a pile 102 and a pile head 104 mounted to a top end 500 of the pile 102, shown in FIGS. 5A and 5B. In one embodiment, the pile 102 is a standard screw pile which includes a helical member, not shown, located at a bottom end of the screw pile to allow insertion of the screw pile into the ground surface 160 when the screw pile is rotated. The screw pile may be made of a single, unitary piece (much like pile 2020 shown in FIG. 28), or may include a plurality of pile sections connected together by connecting sleeves and corresponding fasteners. For instance, pile 902 shown in FIG. 9-12 may be used instead of the pile 102, wherein the pile 902 includes a bottom pile segment 906 and a top pile segment 908 connecting the bottom pile segment 906 to the pile head 104. As it will be appreciated, one of the advantages of the pile 902 as compared to the pile 102 is that the top pile segment 908 of pile 902 extends higher than pile extension 103 of pile 102, and thus the pile 902 may be adjustable in length by additionally adjusting the position of the bottom and top pile segments 906, 908 relative to one another. The height of the piles 102 or 902 can therefore be roughly set by an installer of the support assembly 100. In one embodiment, the helical member could further be detachable from the piles 102, 902 or, alternatively, be integrally formed with the piles 102, 902.

Now referring to FIGS. 2 to 5B, the first support assembly 100a will be further described. It will be understood that all support assemblies 100a-100l are similar and therefore that a similar description also applies to other support assemblies 100b-100l illustrated in FIG. 1.

In the illustrated embodiment, the pile head 104 includes a mounting member 200 for mounting the pile head 104 to the pile 102 via pile extension 103 and an extendable member 202 movably mounted to the mounting member 200. The extendable member 202 is also adapted for receiving the support beam 150a and to move vertically relative to the mounting member 200 to thereby raise or lower the support beam 150a and/or to level the support beam 150a.

In the illustrated embodiment, pile extension 103 is used to secure the pile head 104 to the pile 102. More specifically, pile extension 103 is partially received in pile 102 and projects outwardly therefrom, to engage mounting member 200 of pile head 104. The pile extension 103 is secured to the mounting member 200 via head fasteners 212 proximal to a top end 500 of the pile extension 103 and secured to the pile 102 proximal to a lower end (not shown) of the pile extension 103 via fasteners 107a-107d. The pile extension 103 has four fastener apertures therein (not shown) which correspond to four fastener apertures (not shown) on the pile 102. Fasteners 107a-107d are received in said apertures, securing the pile extension 103 to the pile 102.

In the illustrated embodiment, the mounting member 200 includes a sleeve portion 204 adapted to engage the top end 500 of the pile extension 103 and a plate portion 206 disposed above the sleeve portion 204. Alternatively, the sleeve portion 204 could engage the top end of the top pile segment 908 of the pile 902 shown in FIGS. 9 to 12. Specifically, the sleeve portion 204 is hollow and has a top end 300, a bottom end 302 and a sidewall 304 extending between the top and bottom ends 300, 302. The plate portion 206 extends generally orthogonally to a longitudinal axis $A_1$ of the sleeve portion 204 (best shown in FIG. 3) and is fixedly secured to the top end 300 of the sleeve portion 204.

Still referring to FIGS. 2 to 5B, the sidewall 304 of the sleeve portion 204 is sized and shaped to allow the sleeve portion 204 to be placed over the top end 500 of pile extension 103 of the pile 102 (or the top pile segment 908 of the pile 902). In this configuration, the top end 500 of the pile extension 103 is therefore received in the sleeve portion 204 and can be inserted in the sleeve portion 204 through the sleeve portion's bottom end 302. In one embodiment, the top end 500 of the pile extension 103 could further abut the plate portion 206 when fully inserted in the sleeve portion 204.

In the illustrated embodiment, the pile 102 is cylindrical and the pile extension 103 and the sleeve portion 204 are similarly cylindrical. Alternatively, the pile 102, the pile extension 103 and the sleeve portion 204 could have a rectangular cross-section, or have any other matching cross-section shapes that a skilled person would consider to be appropriate.

Figure 4A:
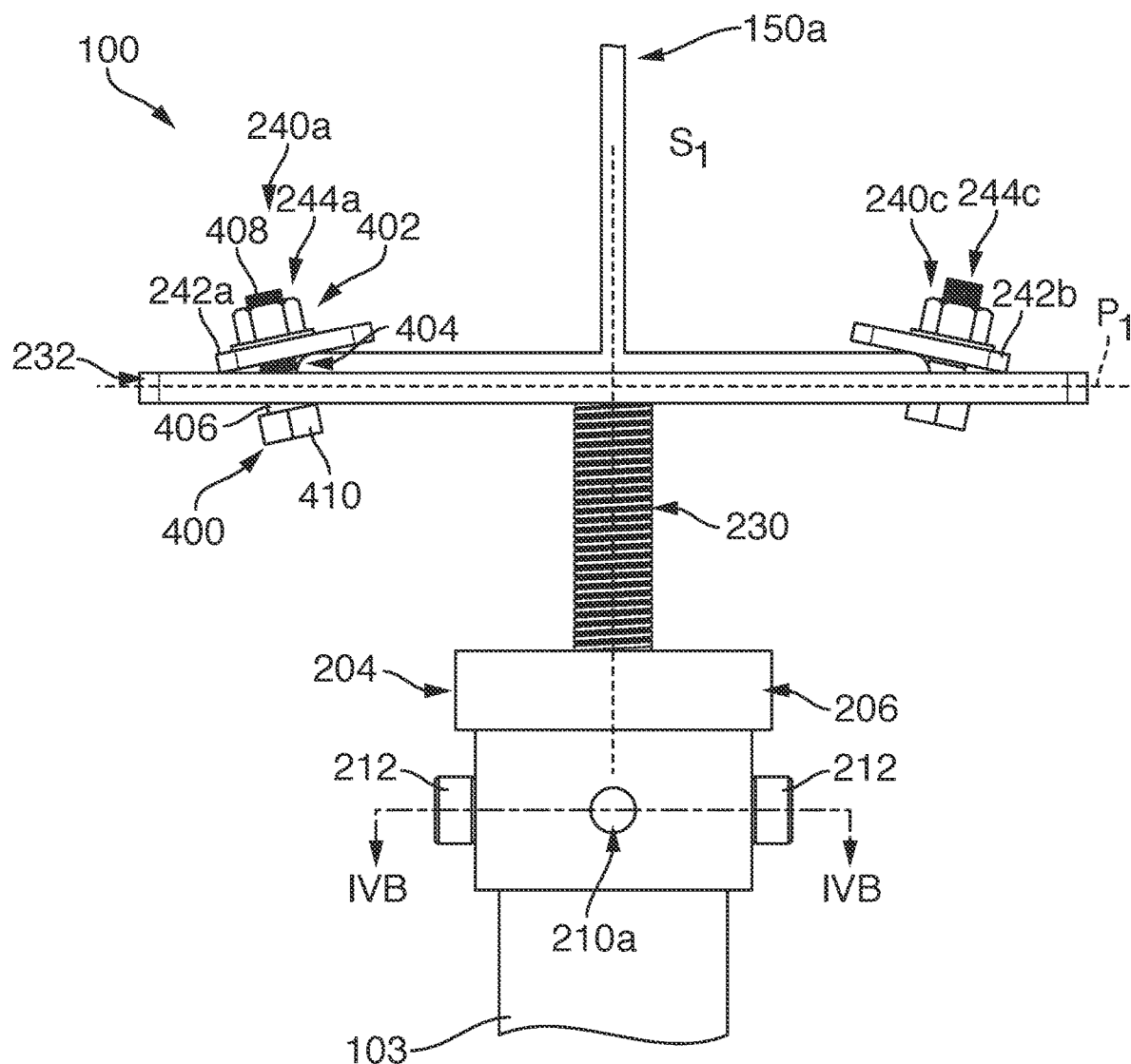
FIG. 4A is a front elevation view of the support assembly illustrated in FIG. 2.
Figure 4B:
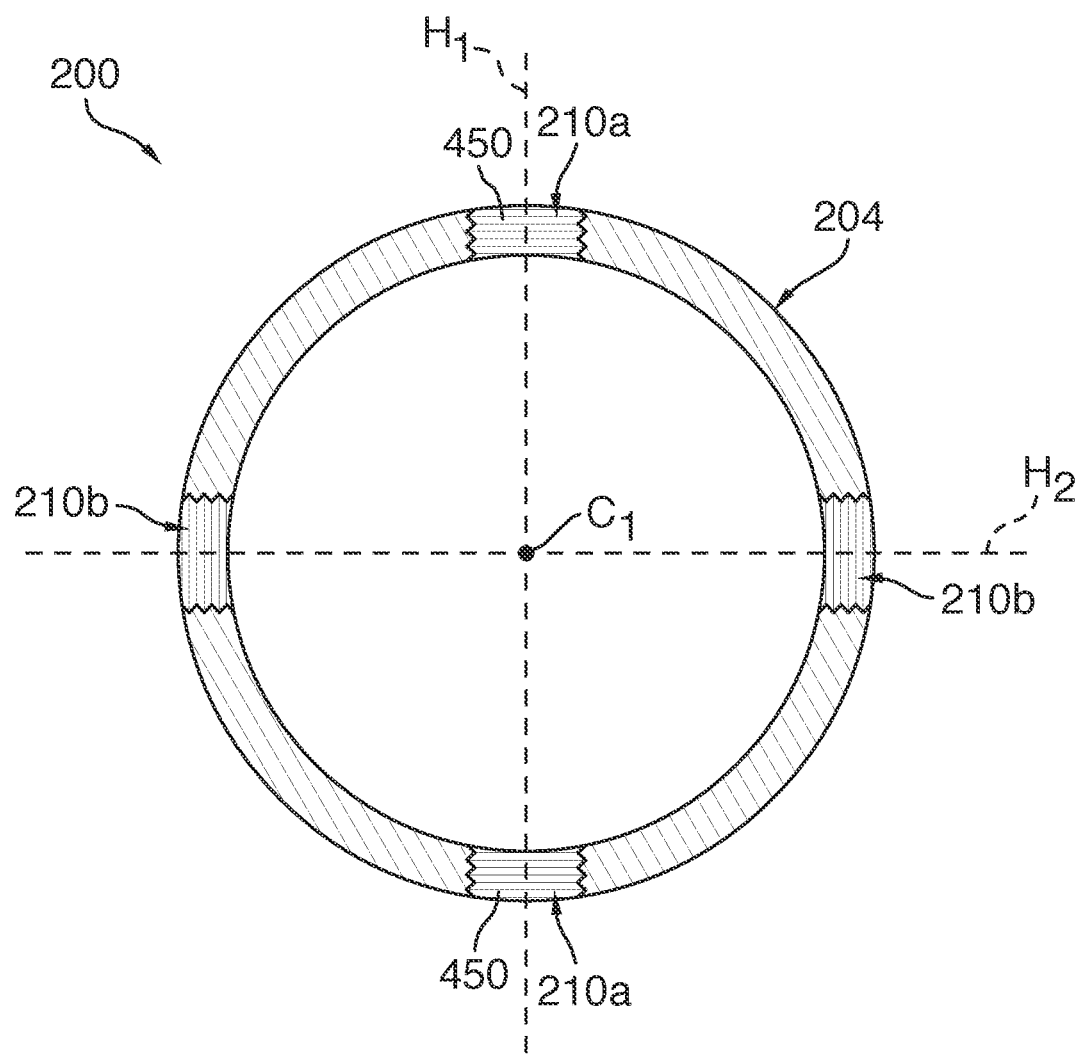
FIG. 4B is a cross-section view of a pile head for the support assembly illustrated in FIG. 4A, taken along cross-section line IVB-IVB, showing a portion of the pile head in isolation to better appreciate the position of mounting openings in the pile head.

In the illustrated embodiment, the sleeve portion 204 further includes a first pair of radially opposed mounting openings 210a and a second pair of radially opposed mounting openings 210b (best shown in FIGS. 4B and 5B). Still in the illustrated embodiment, the mounting openings 210a, 210b are generally aligned with radii of the sleeve portion 204, as best shown in FIG. 4B. Specifically, the first pair of mounting openings 210a are disposed along a generally horizontal first axis $H_1$ which passes through a center $C_1$ of the sleeve portion's cross-section and the second pair of mounting openings 210b are disposed along a generally horizontal second axis $H_2$ which also passes through the center $C_1$ of the sleeve portion's cross-section. Moreover, the first axis $H_1$ of the first pair of mounting openings 210a extends generally perpendicularly to the second axis $H_2$ of the second pair of mounting openings 210b. Alternatively, the first axis $H_1$ could be angled relative to the second axis $H_2$ at an angle which is more or less than 90 degrees. In yet another embodiment, the first and second pairs of mounting openings 210a, 210b could be off-centered on the sleeve portion 204 such that the first and second axes $H_1$, $H_2$ do not passes through the center $C_1$ of the sleeve portion's cross-section.

As best shown in FIGS. 5A and 5B, each mounting opening 210a, 210b is sized and shaped to receive a head fastener 212 which is configured to extend through the sidewall 304 of the sleeve portion 204 and through corresponding bores 502 defined in the pile 102 near the top end 500 of the pile extension 103 of the pile 102 (or the top pile segment 908 of the pile 902). As it will be appreciated, the use of the head fasteners 212 helps preventing unwanted movement of the pile head 104 relative to the pile 102 along the longitudinal axis of the pile 102, both downwardly and upwardly.

In one embodiment, the head fastener 212 is threaded and each mounting openings 210a, 210b include an opening sidewall 450, best shown in FIG. 4B, which is internally threaded to engage the head fastener 212. The corresponding bores 502 of the pile 102 could also be internally threaded to also engage the head fastener 212. Alternatively, the head fastener 212 may be unthreaded and may include a pin engaging similarly unthreaded mounting openings 210a, 210b and corresponding unthreaded bores of the pile 102. It will also be appreciated that the pile head 104 and the pile 102 could have a different number of mounting openings 210a, 210b and corresponding bores 502.

In an alternative embodiment, the first pair of radially opposed mounting openings 210a are adapted to receive corresponding head fasteners 212 and the second pair of radially opposed mounting openings 210b are adapted to receive set screws to further prevent movement of the pile head 104 relative to the pile 102. In yet another embodiment, the sleeve portion 204 may include more or less than two pairs of radially opposed mounting openings.

In the illustrated embodiment, the plate portion 206 is hexagonal and allows the entire mounting member 200 to be rotated relative to the pile 102 using a suitable tool such as a wrench. Alternatively, the plate portion 206 could be circular or have any other shape.

Still in the illustrated embodiment, the plate portion 206 of mounting member 200 further includes a threaded hole 220, best shown in FIGS. 5A and 5B, located generally at the center of the plate portion 206 and extending through the plate portion 206 along the longitudinal axis of the sleeve portion 204. The threaded hole 220 is sized and shaped for receiving the extendable member 202.

More specifically, and referring to FIGS. 2 to 8, the extendable member 202 includes a threaded shaft 230 and a support platform 232 secured to the threaded shaft 230. As best shown in FIGS. 5A and 5B, the threaded shaft 230 has a lower end 510, an upper end 512 and a threaded surface 514 extending between the lower and upper ends 510, 512. The threaded surface 514 is configured to engage the threading in the threaded hole 220 of the mounting member's plate portion 206.

In the illustrated embodiment, the support platform 232 is secured to the upper end 512 of the threaded shaft 230. Specifically, the support platform 232 is generally planar and defines a platform plane $P_1$ which extends generally orthogonally to a shaft axis $S_1$ defined by the threaded shaft 230.

Figure 6A:
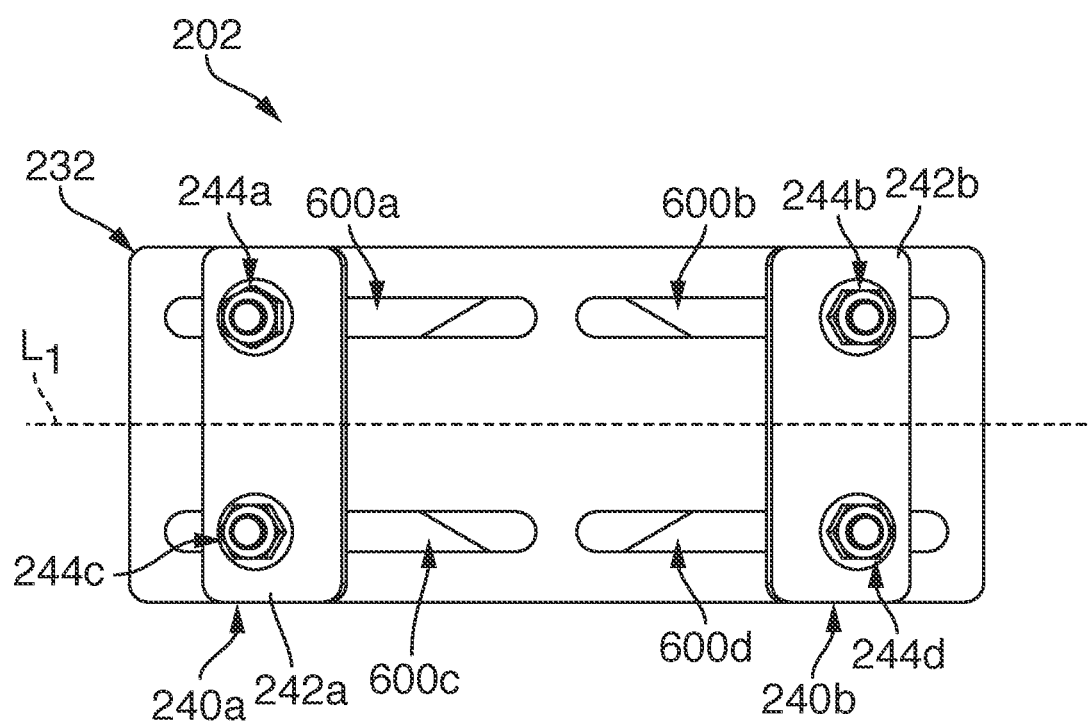
FIG. 6A is a top plan view of the support assembly illustrated in FIG. 2, with the support beam removed to show details of the support platform and holding members.
Figure 8:
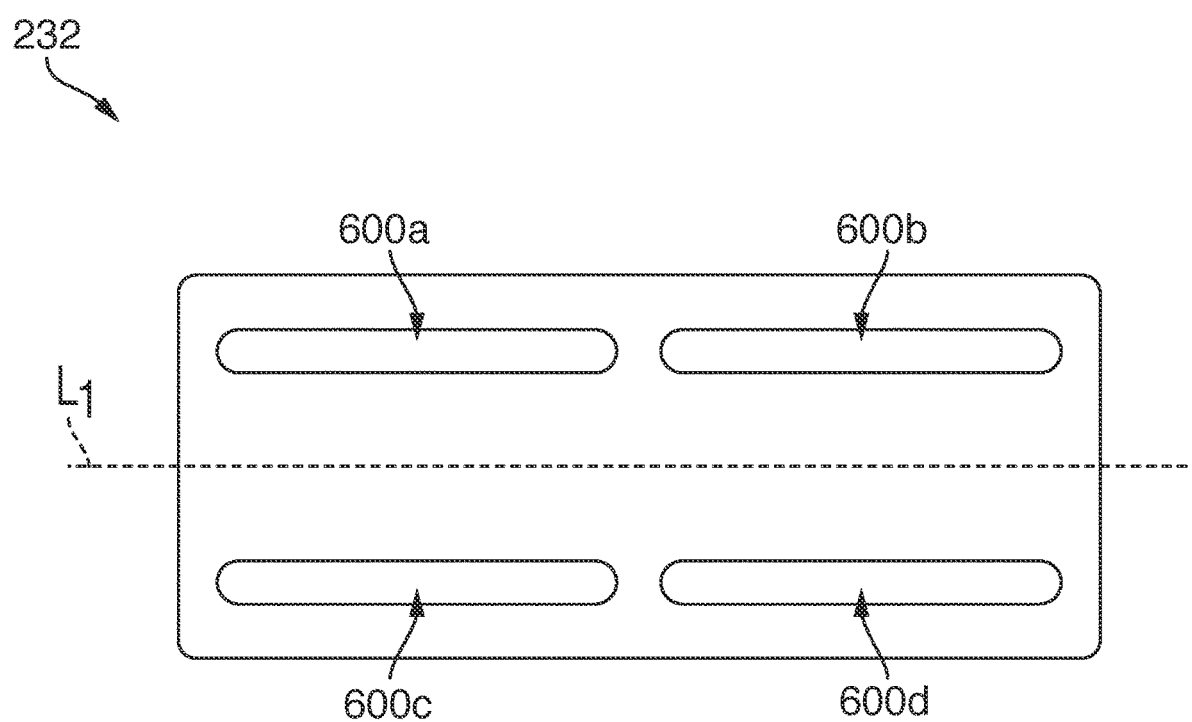
FIG. 8 is a top plan view of the extendable member illustrated in FIG. 7, for better showing longitudinal slots.

Still in the illustrated embodiment, the support platform 232 is further generally rectangular and elongated, and defines a platform longitudinal axis $L_1$, as shown in FIGS. 6A and 8. Alternatively, the support platform 232 could have any other shape which a skilled person would consider to be appropriate.

In the illustrated embodiment, the support platform 232 includes a plurality of fasteners openings 600a-600d defined in the support platform 232. Each fastener opening 600a-

600d is generally elongated and extends generally parallel to the platform longitudinal axis $L_1$. Still in the illustrated embodiment, the plurality of fasteners openings 600a-600d defines a first pair of fastener openings 600a, 600b disposed along a first common axis and spaced longitudinally from each other, and a second pair of fastener openings 600c, 600d also disposed along a second common axis and spaced longitudinally from each other, the first and second pairs of fasteners openings 600a, 600b and 600c, 600d being spaced from each other in a transversal direction relative to the platform longitudinal axis $L_1$.

Alternatively, instead of first and second pairs of fastening openings 600a, 600b and 600c, 600d the plurality of fasteners openings 600a-600d could include only two elongated openings which would be longer than the four fastener openings 600a-600d described above. Specifically, each elongated opening could have a first end located near a first end of the support platform 232 and a second end located near a second, opposed end of the support platform 232, and the two elongated openings could be spaced in a transversal direction from each other.

In yet another embodiment, the plurality of fasteners openings 600a-600d could include more or less than two pairs of fasteners openings 600a, 600b and 600c, 600d spaced from each other and distributed across a width of the support platform 232 in a transversal direction relative to the platform longitudinal axis $L_1$.

Referring now specifically to FIGS. 2 to 6, the extendable member 202 further includes a pair of holding members 240a, 240b adapted to engage the support beam 150a and to prevent movement of the support beam 150a relative to the support platform 232. In the illustrated embodiment, holding members 240a, 240b are each associated with two of the fastener openings 600a, 600b and 600c, 600d, respectively, of the support platform 232.

In the illustrated embodiment, the support beam 150a is an I-beam which includes a pair of opposed top and bottom horizontal beam flanges 158, 154 and a central web member 152 which extends generally vertically between the top and bottom beam flanges 158, 154 (best shown in FIGS. 2 to 4A). The bottom beam flange 154 defines a generally planar bottom surface which is adapted to be received on the support platform 232 and a pair of opposite top surfaces which extend generally horizontally away from the central web member 152. The bottom beam flange 154 further defines a pair of opposite horizontal outer flange edges 156 which extend between the top flange surface and the bottom flange surface, away from the central web member 152.

Still in the illustrated embodiment, the holding members 240a, 240b each includes a plate member 242a, 242b adapted to abut an upper surface of the horizontal beam flange 154 and a pair of holding fasteners 244a, 244b and 244c, 244d adapted to extend through a corresponding plate member 242a or 242b and the fastener openings 600a-600d of support platform 232, to hold the bottom beam flange 154 between the plate members 242a and 242b and the support platform 232.

Figure 6B:
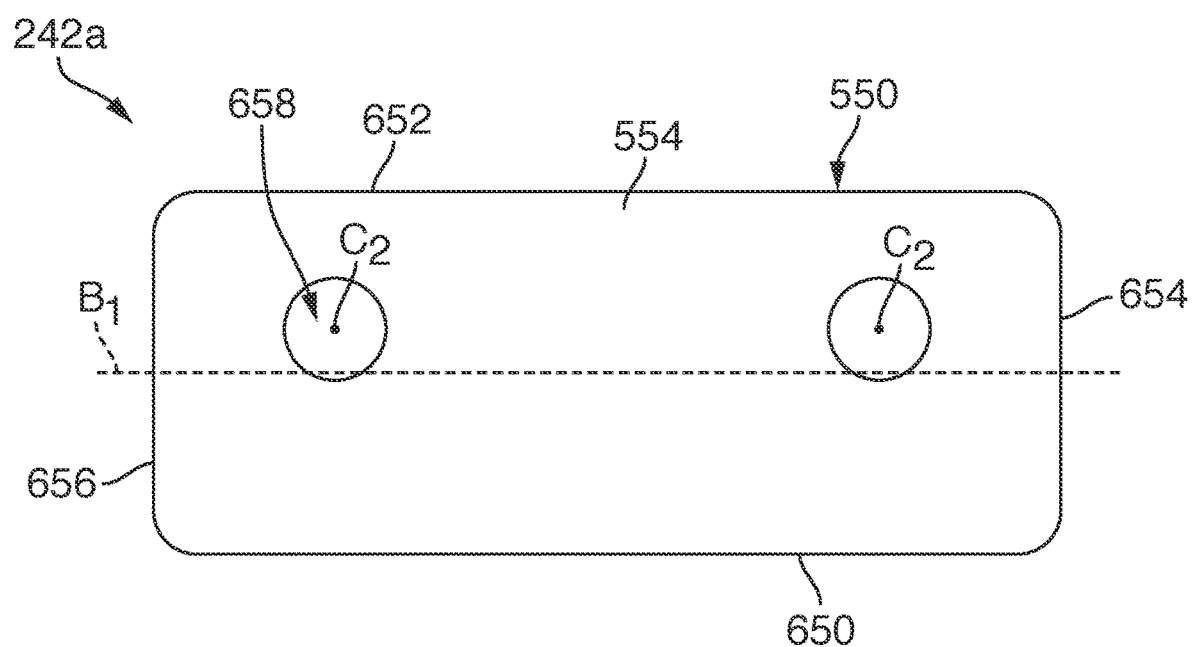
FIG. 6B is a top plan view of a plate member of one of the holding members of the support assembly illustrated in FIG. 6A.
Figure 7:
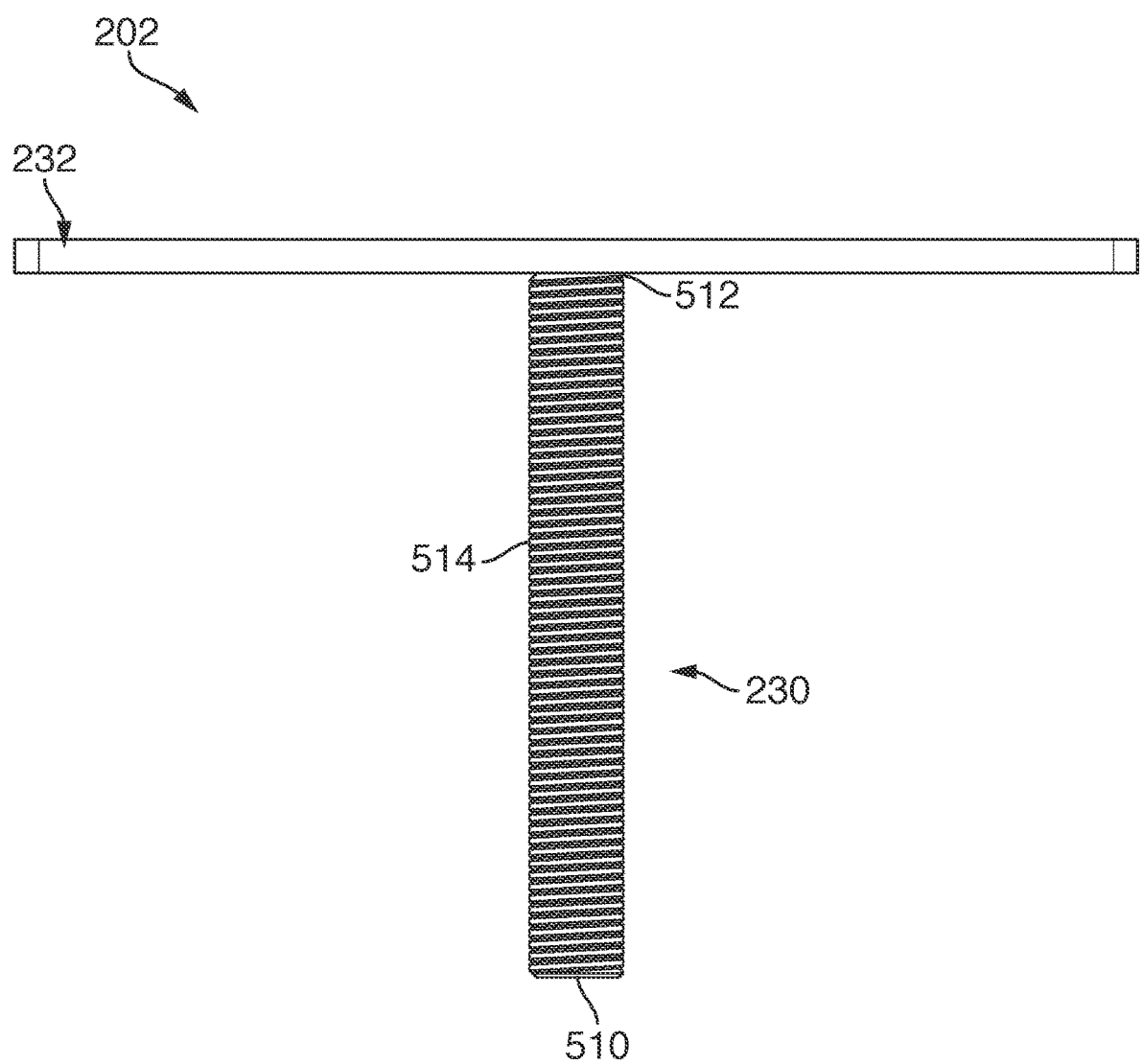
FIG. 7 is a front elevation view of an extendable member of the support assembly illustrated in FIG. 2.

Referring specifically to FIGS. 5A, 5B and 6B, each plate member 242a, 242b (only plate member 242a being illustrated in FIG. 6B) includes a generally flat and rectangular body 550 which has a planar bottom face 552 and a planar top face 554 opposite the bottom face 552. When the holding member 240a is properly installed on the support platform 232, the bottom face 552 is disposed towards the support platform 232 and the top face 554 is disposed away from the support platform 232, as shown in FIGS. 5A and 5B.

In the illustrated embodiment, the body 550 has rounded corners, but could instead have squared corners. Still in the illustrated embodiment, the body 550 has first and second side edges 650, 652 which are generally parallel to each other and third and fourth side edges 654, 656 which are generally parallel to each other and perpendicular to the first and second side edges 650, 652. The first and second side edges 650, 652 are longer than the third and fourth side edges 654, 656, and the plate member 242 is disposed such that the first and second side edges 650, 652 are generally perpendicular to the platform longitudinal axis $L_1$. When the support beam 150a is held by the holding members 240a, the first side edge 650 is disposed towards the beam flange and above the beam flange 154, and the second side edge 652 is located away from the beam flange 154.

In the illustrated embodiment, the plate member 242a further includes a pair of fastener openings 658a, 658b which extends through the body 550 to receive the holding fasteners 244a, 244b, respectively. Still in the illustrated embodiment, the fastener openings 658a, 658b are generally circular and are off-centered towards the second side edge 652 of the body 550. Specifically, the body 550 is elongated and defines a body longitudinal axis $B_1$, and each fastener opening 658a, 658b has a center $C_2$ which is located between the body longitudinal axis $B_1$ and the second side edge 652 of the body 550. In this configuration, the plate member 242a is generally angled relative to the support platform 232 when the beam flange 154 engages the holding member 240a, as best shown in FIGS. 4A, 5A and 5B.

Referring back to FIGS. 2 to 6B, each one of the holding fasteners 244a-244d includes a bolt 400 and a corresponding nut 402. Specifically, the bolt 400 includes a bolt body 404 having a first end 406 and a second end 408 and a bolt head 410 located at the first end 406 of the bolt body 404. As best shown in FIG. 4A, the bolt body 404 extends through a corresponding fastener opening 658a, 658b of the plate member 242a (best shown in FIG. 6B) and through a corresponding fastener opening 600a, 600c of the support platform 232 (best shown in FIG. 6A). In this configuration, the bolt head 410 is located under the support platform 232 and abuts the underside of the support platform 232. Still in the illustrated embodiment, the nut 402 further engages the second end 408 of bolt body 404. Specifically, the nut 402 is located above the plate member 242a and abuts the top face 554 of the plate member 242 to thereby sandwich the outer flange edge 158 of the horizontal beam flange 154 between the support platform 232 and the plate member 242a. In this configuration, the bolt body 404 also abuts the outer flange edge 158 of the horizontal beam flange 154, which further prevents lateral movement of the support beam 150 relative to the support platform 232.

Alternatively, the bolt 400 could be reversed such that the bolt head 410 could be located above the plate member 242a and the nut 402 could be located below the support platform 232. In yet another embodiment, other types of fasteners could be used instead of bolts and corresponding nuts.

It will be appreciated that the configuration described above prevents both lateral and vertical movement of the support beam 150a relative to the support platform 232. When the holding fasteners 244a-244d are tightened, the holding members 240a, 240b firmly hold the horizontal beam flange 154 in a vice-like arrangement, which eliminates the need to make holes into the support beam 150a or otherwise damage the support beam 150a.

It will also be appreciated that when the holding fasteners 244a-244d are tightened, the holding fasteners 244a-244d and the plate members 242a, 242b are angled inwardly relative to the support platform 232, as best shown in FIG. 4A. This allows the plate members 242a, 242b to hold the horizontal beam flange 154 and prevent movement of the support beam 150a relative to the support platform 232 both vertically and laterally.

It will also be appreciated that in the configuration illustrated and described above is mirrored on both sides of the support beam 150a. Specifically, each holding pair of fastener (e.g. fasteners 244a, 244b) and each plate member (e.g. plate member 242a) is angled towards opposite pair holding fastener (e.g. fasteners 244c, 244d) and corresponding plate member (e.g. plate member 242b). This configuration further prevents movement of the support beam 150 relative to the support platform 232 both vertically and laterally.

It will further be appreciated that the elongated fastener openings 600a-600d in the support platform 232 allow the holding fasteners 244a-244d to be moved laterally along the support platform 232. This allows the holding fasteners 244a-244d to be repositioned to accommodate support beams having different width for instance, or if the support beam 150a is not perfectly centered relative to the support platform 232.

Furthermore, the configuration described above allows the support platform 232 to be selectively raised and lowered simply by removing the head fasteners 212 from the mounting openings 210a, 210b and rotating the mounting member 200 of the pile head 104 relative to the pile 102, for example using a wrench or another similar tool. It will be appreciated that the support beam 150a held by the extendable member 202 will prevent the extendable member 202 from rotating when the mounting member 200 is rotated. Therefore, the mounting member 200 will rotate relative to the extendable member 202 as well, and the threaded shaft 230 engaging the threaded hole 220 of the mounting member 200 will cause vertical movement of the extendable member 202 relative to the mounting member 200. This allows the height of the support beam 150a to be adjusted and/or the support beam 150a to be leveled. Once the support beam 150a has been adjusted to a desired height or leveled, the head fasteners 212 can be re-inserted into the corresponding mounting openings 210a-210b and bores 502 to prevent further rotation of the mounting portion 200 relative to the pile 102.

Figure 9:
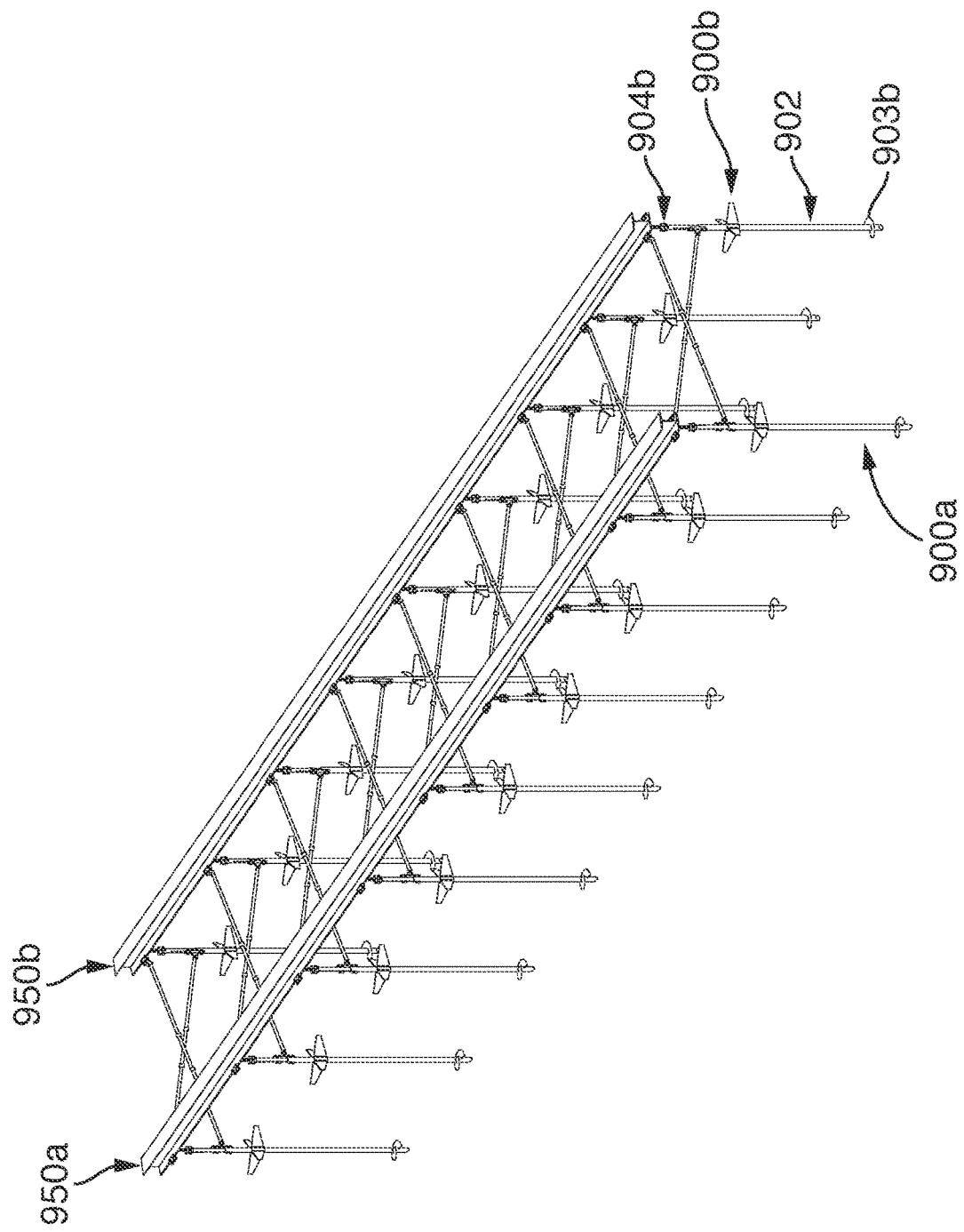
FIG. 9 is a top perspective view of a plurality of support assemblies for supporting a pair of support beams of a manufactured home, in accordance with an alternative embodiment.
Figure 10:
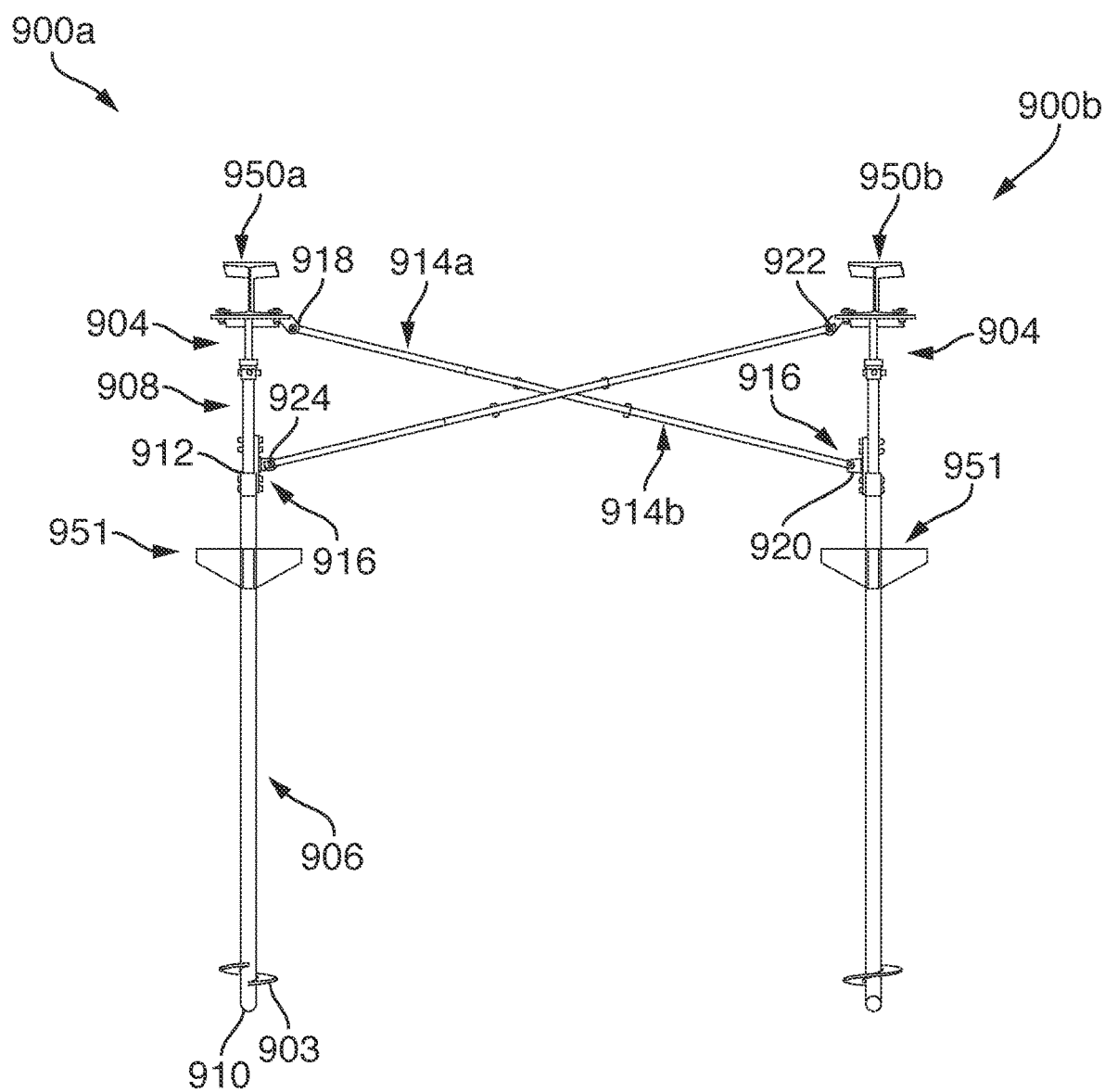
FIG. 10 is a front elevation view of one pair of the support assemblies illustrated in FIG. 9.

Now turning to FIGS. 9 and 10, there is shown a plurality of support assemblies for supporting a structure such as a manufactured home (not shown), in accordance with an alternative embodiment. More specifically, FIG. 9 shows a first support beam 950a and a second support beam 950b from a support frame of a manufactured home (not shown). The first support beam 950a is supported by a first row of support assemblies and the second support beam 950b is supported by a second row of support assemblies disposed parallel to the first row of support assemblies. Similarly to the support assemblies 100a-100l described above, the support assemblies 900a, 900b are buried in a ground surface (not shown) and the number of support assemblies 900a, 900b used may vary depending of various factors such as the size of the beams 950a, 950b, the weight of the manufactured home or any other factor that a skilled addressee may deem appropriate to consider.

The support assemblies 900a, 900b are generally similar to the support assemblies 100a-100l described above, and are essentially mirror images of one another. As such, only support assembly 900a will be described. It will be appreciated that a similar description also applies to support assembly 900b, and to other support assemblies represented in FIG. 9 (not numbered). In this embodiment, each support assembly 900a includes a pile 902 and a pile head 904 mounted to the pile 902. In the illustrated embodiment, the pile 902 includes a screw pile and therefore has a helical member 903 to allow insertion of the pile 902 into the ground surface. Alternatively, the pile 902 may include any other type of pile that a skilled addressee may consider to be appropriate.

Still referring to FIGS. 9 and 10, the pile 902 includes a plurality of pile segments 906, 908 attached together to form the pile 902. Specifically, the pile 902 includes a bottom pile segment 906 and a top pile segment 908 connecting the bottom pile segment 906 to the pile head 904. The bottom pile segment 906 includes a bottom end 910 to which the helical member 903 is secured and an opposed top end 912 which is hollow for receiving the top pile segment 908.

In the illustrated embodiment, the support assemblies 900a, 900b are further adapted to be connected together using a pair of crossed brace members 914a, 914b which extend between the first and second rows of support assemblies 900a, 900b, as will be explained further below. Alternatively, the support assemblies 900a, 900b could be provided without brace members.

Now referring to FIGS. 13 to 16, the pile head 904 is generally similar to the pile head 104 described above and illustrated in FIGS. 1 to 8, and includes a mounting member 1300 for mounting the pile head 904 to the pile 902 and an extendable member 1302 movably mounted to the mounting member 1300. The extendable member 1302 is also adapted for receiving a corresponding support beam 950a or 950b and to move vertically relative to the mounting member 1300 to thereby raise or lower the support beam 950a, 950b and/or to level the support beam 950a, 950b. In the embodiment illustrated in FIG. 13, the mounting member 1300 is generally similar to the mounting member 200 described above and therefore the description of mounting members 200 also applies to mounting members 1300, with proper adaptations.

Turning now to FIGS. 14 to 16, the extendable member 1302 is also generally similar to the extendable member 202 described above and includes a threaded shaft 1400 configured for threadably engaging the mounting member 1300 and a support platform 1402 secured to the threaded shaft 1400 and disposed generally orthogonally to the threaded shaft 1400.

In the embodiment illustrated in FIGS. 14 to 16, the support platform 1402 is thus generally rectangular and has a bottom face 1404 from which the threaded shaft 1400 extends, a top face 1406 opposite the bottom face 1404, spaced-apart and parallel first and second side edges 1408, 1410 and spaced-apart and parallel third and fourth side edges 1412, 1414 which extend generally perpendicularly to the first and second side edges 1408, 1410.

In the embodiment illustrated in FIGS. 14 to 16, the support platform 1402 is further elongated, such that the first and second side edges 1408, 1410 are shorter than the third and fourth side edges 1412, 1414. In this configuration, the support platform 1402 defines a platform longitudinal axis $L_2$. Alternatively, the support platform 1402 could have any other shape which a skilled person would consider to be appropriate.

In the embodiment illustrated in FIGS. 14 to 16, the support platform 1402 includes four fastener openings 1416a-1416d, which are generally elongated and which extend generally parallel to the platform longitudinal axis $L_2$. The fastener openings 1416a-1416d are adapted to receive corresponding holding members 1304a, 1304b (shown in FIG. 13) which are adapted to engage and hold the corresponding support beam 950a or 950b.

The fasteners openings 1416-1416d and the holding members 1304a, 1304b are similar to the fastener openings 600a-600d and to the holding members 240a, 240b described above with references to FIGS. 1 to 8. Accordingly, the description of holding members 240a, 240b and their engagement in openings 600a-600d also applies to the holding members 1304a, 1304b and openings 1416a-1416d, with proper adaptations.

In the embodiment illustrated in FIGS. 14 to 16, the extendable member 1302 further includes an upper brace bracket 1420 which extends away from the first side edge 1408 of the support platform 1402 and which extends generally downwardly, away from the bottom face 1404 of the support platform 1402. Specifically, the upper brace bracket 1420 is generally flat and elongated, and defines a longitudinal axis $U_1$ which is angled relative to the support platform 1402.

Still in the embodiment illustrated in FIGS. 14 to 16, the upper brace bracket 1420 has a first end 1422 secured to the bottom face 1404 of the support platform 1402 and a second end 1424 located away from the first end 1422. Specifically, the upper brace bracket 1420 includes a straight connecting edge portion 1426 located at the first end 1422 and secured to the bottom face 1404 of the support platform 1402 by welding or any other appropriate securing techniques, a pair of straight and parallel side edge portions 1428, 1430 which are angled relative to the connecting edge portion 1426 and a free edge portion 1432 located at the second end 1424. In the embodiment illustrated in FIGS. 14 to 16, the free edge portion 1432 is rounded. Alternatively, the free edge portion 1432 could be squared instead of rounded, or the entire upper brace bracket 1420 could have a different shape.

Still referring to FIGS. 14 to 16, the upper brace bracket 1420 further includes an upper brace opening 1434 for receiving a first one of the brace members. In the illustrated embodiment, the upper brace opening 1434 is generally circular and is located towards the second end 1424 of the upper brace bracket 1420. Specifically, when the extendable member 1302 is properly mounted to the mounting portion 1300, the support platform 1402 is disposed in a generally horizontal plane and the upper brace bracket 1420 is disposed in a generally vertical plane. Moreover, in this configuration, the extendable members 1302 of each one of the first and second rows of support assemblies (i.e. support assembly rows in alignment with support assemblies 900a and 900b in FIG. 9) are disposed such that their upper brace brackets 1420 are disposed towards the other one of the first and second rows of support assemblies (e.g. support assemblies 900a, 900b).

Now referring back to FIGS. 9 to 12, support assembly 900a further includes a lower brace bracket 916 secured to the pile 902. In the illustrated embodiment, the lower brace bracket 916 includes an elongated mounting plate 1100 adapted to be placed against the pile 902, a vertical tab 1102 extending away from the mounting plate 1100 and a lower brace opening 1104 defined in the tab 1102.

Still in the illustrated embodiment, the top pile segment 908 of the pile 902 includes a plurality of spaced-apart mounting holes 1106 distributed vertically along the top pile segment 908. In the illustrated embodiment, the bottom pile segment 906 includes a pair of corresponding mounting holes 1108 which extend through the top end 912 of the bottom pile segment 906 and which is adapted to be aligned with two adjacent mounting holes 1106 of the top pile segment 908 to allow the top pile segment 908 to be secured to the bottom pile segment 906. Depending on the mounting hole selected, the pile 902 can therefore be set to a desired length or height. Alternatively, the bottom pile segment 906 could include more or less than two mounting holes adapted to be aligned with a corresponding number of mounting holes 1106 of the top pile segment 908.

Still referring to FIGS. 9 to 12, the mounting plate 1100 includes upper and lower pairs of mounting holes 1110a, 1110b which are adapted to receive corresponding pairs of bracket mounting fasteners 1112a, 1112b. Moreover, the mounting holes 1108 of the bottom pile segment 906 are further adapted to receive at least one of the bracket mounting fasteners 1112a, 1112b. Specifically, the bracket mounting fasteners 1112 extend through the lower mounting hole 1110b of the mounting plate 1100, through the mounting holes 1108 of the bottom pile segment 906 and through the selected mounting holes 1106 of the top pile segment 908. The mounting plate 1100 is configured such that in this position, the upper mounting holes 1110a of the mounting plate 1100 are aligned with other mounting holes 1106 of the top pile segment 908 and the mounting plate 1100 can be further fastened to the top pile segment 908 by inserting one of the bracket mounting fasteners 1112a through the upper mounting holes 1110a of the mounting plate 1100 and through the corresponding mounting holes 1106 of the top pile segment 908. Moreover, the lower brace bracket 916 of each one of the first and second rows of support assemblies (e.g. support assemblies 900a, 900b) are disposed such that their tabs 1102 are disposed towards the other one of the first and second rows of support assemblies 900a, 900b (as best shown in FIG. 10).

As stated above, this configuration allows the support assemblies in one of the rows of support assemblies (e.g. support assembly 900a) to be connected to corresponding support assemblies in the other row (e.g. support assembly 900b) by the first and second crossed brace members 914a, 914b. As it will become apparent below, both brace members 914a, 914b are telescopic to allow for the adjustment of the length of the connection between the support assemblies (e.g. connection between support assemblies 900a and 900b). In the illustrated embodiment, the first brace member 914a includes a first end 918 connected to the upper brace bracket 1420 of assembly 900a and a second end 920 connected to the lower brace bracket 916 of the support assembly 900b. Similarly, the second brace member 914b has a first end 922 secured to the upper brace bracket 1420 of the support assembly 900b (in the second row of support assemblies) and a second end 924 secured to the lower brace bracket 916 of the support assembly 900a (in the first row of support assemblies).

In this configuration, the brace members 914a, 914b are therefore crossed. It will be appreciated that this configuration can help maintain the support assemblies in the opposite rows (e.g. support assemblies 900a, 900b) generally parallel to each other and spaced generally at the same distance from each other. Alternatively, the brace members 914a, 914b could extend generally horizontally between the support assemblies 900a, 900b instead of being crossed. In another embodiment, the brace members 914a, 914b could extend between adjacent support assemblies in the same row, or between a first support assembly in a first one of the first and second rows of support assemblies (e.g. support assemblies aligned with support assemblies 900a or 900b) and another support assembly in the other one of the first and second rows of support assemblies other than the one just opposite the first support assembly. In yet another embodiment, the support assemblies (e.g. 900a, 900b) could be adapted to be connected with more or less than two brace members which could also be arranged or configured differently. In still another embodiment, the support assemblies (e.g. 900a, 900b) could be generally similar to the support assemblies 100 illustrated in FIGS. 1 to 8 and simply not be adapted to be connected using any brace members.

Figure 12:
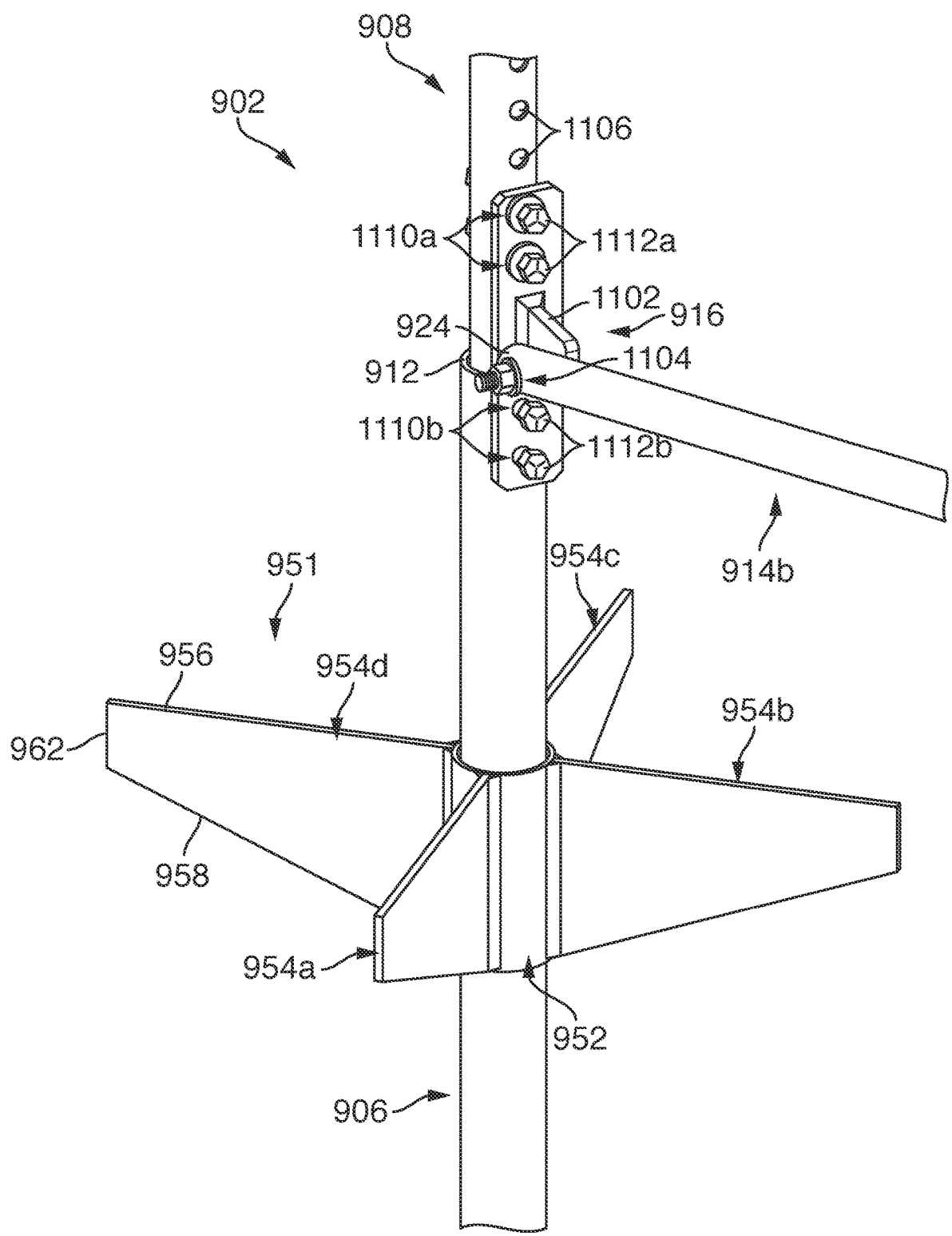
FIG. 12 is an enlarged top right perspective view of the portion of the support assemblies illustrated in FIG. 11, also for better showing the lower brace bracket and the lateral reinforcement assembly.
Figure 13:
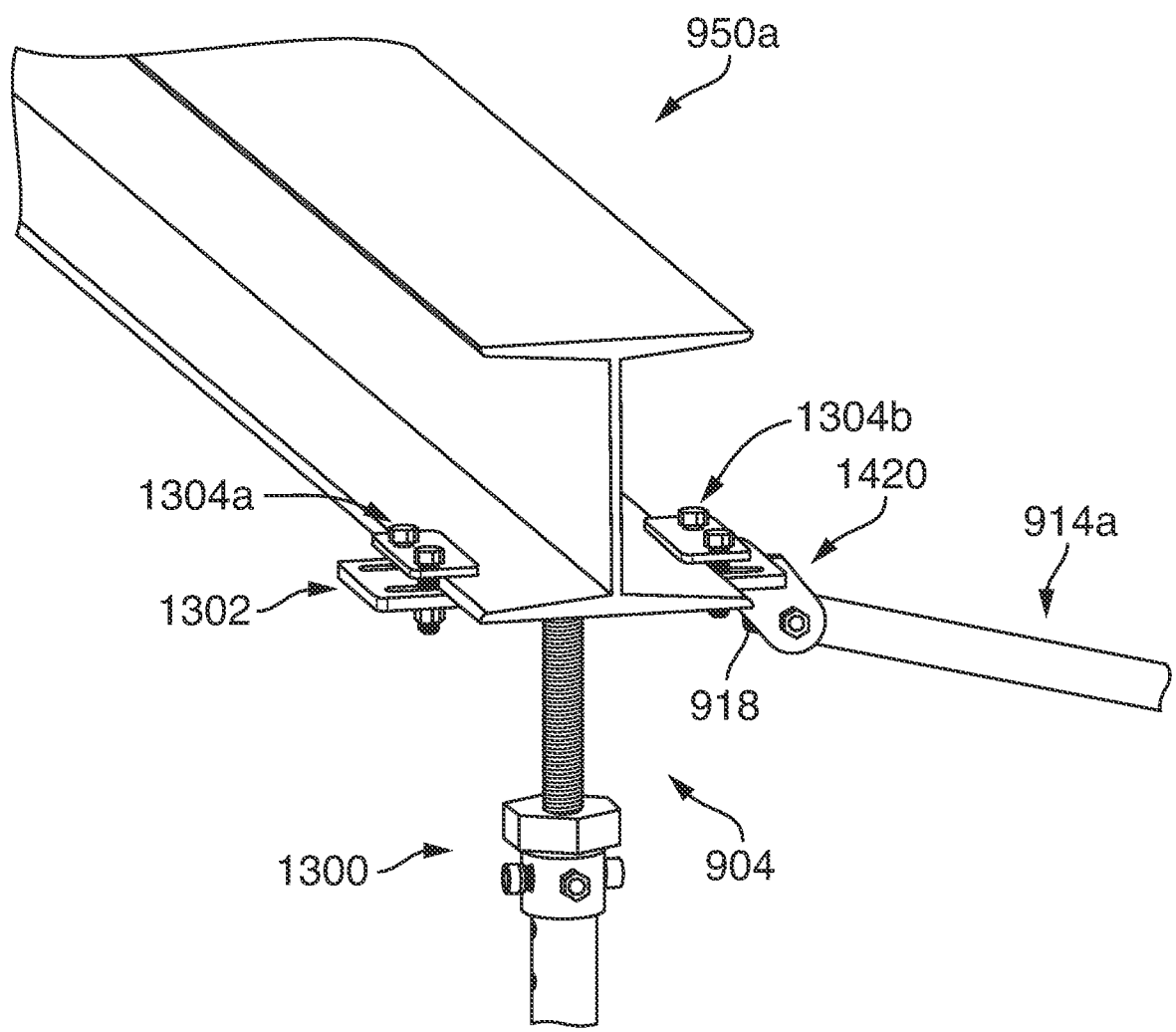
FIG. 13 is an enlarged top left perspective view of another portion of one of the support assemblies illustrated in FIG.

In the illustrated embodiment, support assembly 900a further includes a lateral reinforcement assembly 951 attached to the pile 902 to increase the pile's capacity to resist loads applied laterally. Specifically, and as best shown in FIGS. 11 and 12, the lateral reinforcement assembly 951 includes a central tubular member 952 disposed around the bottom pile segment 906 near its top end 912, and four vertical fins 954a-954d extending radially outwardly from the tubular member 952. Each fin 954a-954d has a generally trapezoidal shape and includes a top edge 956 which is generally horizontal and a bottom edge 958 which is angled relative to the top edge 956. In this configuration, each fin 954a-954d defines a vertical inner edge 960 adjacent the tubular member 952 and a vertical outer edge 962 located opposite the inner edge 960 and which is shorter than the inner edge 960. Alternatively, fins 954a-954d could be rectangular or have any other shape which a skilled person may consider to be appropriate.

In the illustrated embodiment, fins 954a-954d are distributed evenly around the tubular member 952, such that the fins 954 extend generally perpendicularly to each other. Furthermore, when the support assemblies 900 are buried under the ground surface, the fins 954a-954d may be oriented at about a 45 degree angle relative to a longitudinal axis of the structure being supported, such as a manufactured home, to provide a constant lateral load-resisting capacity regardless of the direction in which the lateral load is applied.

Alternatively, the lateral reinforcement assembly 951 could include more or less than four fins, and the fins could be angled relative to each other at angles different than 90 degrees.

Now referring to FIGS. 17 to 21, there is shown two support assemblies 800a, 800b in accordance with an alternative embodiment to the support assemblies 900a and 900b shown previously (e.g. in FIGS. 9 and 10). The two support assemblies 800a, 800b may be braced together as in the configuration shown in FIG. 9 (i.e. two rows of support assemblies for supporting a structure such as a manufactured home) or they may simply not be braced together. In the illustrated embodiment, there is shown a first support assembly 800a connected to a second support assembly 800b using a brace member 814. The brace member 814 is coupled to a brace adjusting assembly 830 for adjusting the length of brace member 814.

The second support assembly 800b being substantially identical to the first support assembly 800a, only support assembly 800a will be described. It will be understood that a similar description also applies to support assembly 800b.

With reference to FIGS. 19 to 21, the first support assembly 800a comprises a lower pile segment 906, a mounting member 350 receivable in the lower pile segment 906, an extendable member 1500 mounted to the mounting member 350 and holding members 1550a-1550d fastened to a support platform 1502 of the extendable member 1500, for holding a beam 150a thereto.

The mounting member 350 is an alternative embodiment of the pile head 104, the mounting member 350 including a head portion 352 (comprising the hexagonal head) formed integral with a beam portion 354. The beam portion 354 of mounting member 350 is mounted inside the bottom pile segment 906 and fastened thereto using a plurality of fasteners 380a-380d through mounting holes 370. In one embodiment, the head portion 352 and the beam portion 354 are welded together. In one embodiment, the fasteners 380a-380b each comprise a bolt received through one mounting hole 370 and a nut. The mounting holes 370 in the mounting member 350 and the mounting holes 374 in the bottom pile segment 906 may both be threaded or unthreaded. They may, however, be secured by other means as evident to the skilled addressee including riveting or removable locking such as threads. The head portion 352 and beam portion 354 are secured together in this embodiment, in part, to reduce the number of parts during installation (i.e. reducing inventory and installation time), therefore reducing overall cost. The beam portion 354 comprises mounting holes 370 which are arranged in a column from a bottom end 360 of the beam portion 354 to a top end 362 of the beam portion 354. In one embodiment, there are two columns of mounting holes 370a, 370b placed on radially opposed sides of the beam portion 354 so that the centers of a pair of mounting holes at the same height overlap and an axis $H_3$ going from the center of a first mounting hole 370a to the center of a second mounting hole 370b passes through a center of the beam portion 354 (see FIG. 21). The mounting holes 370 may alternatively be offset so that the axis $H_3$ does not pass through the center of the beam portion 354.

The mounting member 350 is substantially similar to the top pile segment 908 previously described, with similar features. The height of the support platform 1502 mounted thereon can be adjusted through action of the threaded shaft 1504 of the extendable member 1500 with the threaded hole 372 of the hexagonal head 352, similar to pile 102. Further, a greater range of height adjustment is made possible by positioning of the beam portion 354 of the mounting member 350 in the bottom pile segment 906 and fastening the mounting member 350 and bottom pile segment 906 together using an appropriate fastener 380 and mounting hole 370 corresponding to the desired height of the mounting member 350. In one embodiment, the extendable member 1500 may extend up to 10 inches above the top of the bottom pile segment 906, while in another embodiment the extendable member may extend up to 20 inches above the top of the pile. Other values may be evident to the skilled addressee.

With reference to FIG. 22, the extendable member 1500 will now be described. The extendable member 1500 is substantially similar to the extendable member 202 described previously, having a threaded shaft 1504 and a support platform 1502 secured to the threaded shaft 1504. The threaded shaft 1504 is configured to engage the threading in the threaded hole 372 of the head portion 352 of the mounting member 350. The support platform 1502 has a top face 1506 opposite a bottom face 1507, spaced-apart and parallel first and second side edges 1506, 1508 and spaced-apart and parallel third and fourth side edges 1510, 1512 which extend generally perpendicularly to the first and second side edges 1506, 1508.

The support platform 1502 is further elongated, such that the first and second side edges 1506, 1508 are longer than the third and fourth side edges 1510, 1512. In this configuration, the support platform 1502 defines a platform longitudinal axis $L_3$. Alternatively, the support platform 1502 could have any other shape which a skilled person would consider to be appropriate.

The support platform 1502 includes four fastener openings 1530a-1530d, which are generally elongated and which extend generally parallel to the platform longitudinal axis $L_3$. The fastener openings 1530a-1530d are adapted to receive fasteners (shown in FIGS. 19 and 23A, but not numbered) configured to fasten corresponding holding members such as holding members 240 onto the support platform 1502, the holding members being adapted to engage and hold the corresponding support beam 150 in a vice-like arrangement.

The support platform 1502 additionally includes brace member fastener openings 1520a, 1520b. The brace member fastener openings 1520a, 1520b are elongated along the longitudinal axis $L_3$ and used to fasten the support platform 1502 to the first rod 816 of the brace member 814 using rod aperture 817a or rod aperture 817b.

Adjustment of the height of the support platform 1502 by action of the threaded shaft 1504 of the extendable member 1500 with the threaded hole 372 of the head portion 352 will now be described. The threaded shaft 1504 of the extendable member 1500 is placed in the threaded hole 372 of the head portion 352. When either the support platform 1502 or the mounting member 350 are kept from rotating, rotation of the head portion 352 relative to the extendable member 1500 causes the extendable member 1500 to extend or retract in height. This is due to action of the threaded hole 372 on the threaded shaft 1504. In one embodiment, the height of the extendable member 1500 can be adjusted by up to 2 inches, in one embodiment up to 4 inches, or in another embodiment up to 10 inches. Other values may be evident to the skilled addressee.

With reference to FIGS. 17, 18, 24 and 25, the support assemblies 800a and 800b are connected together using the brace member 814. The brace member 814 is telescopic, and comprises a first rod 816 with a first, smaller outer diameter which is received in a second rod 818 with a second larger outer diameter. The first and second rods 816, 818 each also comprise a first and second plate 820, 822 orthogonal to the longitudinal axis of each rod 816, 818. The first plate 820 is welded or otherwise fastened to the first rod 816 while second plate 822 is welded or otherwise fastened to the second rod 818. The first plate 820 has an aperture 821 and the second plate 822 has an aperture 823, each aperture 821, 823 being configured to slidably receive the brace adjusting assembly 830 therein. While in this embodiment first and second plates 820, 822 are described as an exemplary embodiment, it will be understood that projections shaped differently could also be suitable. The brace adjusting assembly 830 comprises a threaded shaft 832 and four nuts 834a-834d. The four nuts 834a-834d are fastened on the threaded shaft 832 against the plates 820, 822 and maintain the first plate 820 at a set distance from the second plate 822, therefore maintaining a length of the brace member 814. The brace member 814 is fastened to the support platform 1502 of the support assembly 800a at a first end 815 of the first rod 818, and fastened to a lower brace bracket 916b of the second support assembly 800b at the second end 819 of the second rod 818. By adjusting the position of the nuts 834a-834d on the threaded shaft 832, they engage the first and second plates 820, 822 to move the first and second rods 816, 818 relative to one another, thus allowing adjustment of the length of brace member 814, as best described below.

The brace member 814 connects the pile assemblies 800a and 800b by fastening to the support platform 1502 of the first support assembly 800a at a first end 815 of the first rod 816 and fastening to the second end 819 of the second rod 818 to the brace bracket 916b of the second support assembly 800b. The extendable member fastener 850 is received in one of two first rod apertures 817a, 817b proximal to the first end 815 of the first rod 816 and secures the first rod 816 to the extendable member 1500 through fastener opening 1520a or 1520b of the extendable member 1500. Alternative arrangements may be evident to the skilled addressee however, such as a bracket welded to the extendable member 1500 (as in FIG. 14) and configured to be secured to the first end 815 of the rod 818. Additionally, the lower bracket 916 may be fastened to the brace member 814 with a tab whereby the fastener is fastened in the vertical plane (as shown in FIGS. 11 and 12) or a tab whereby the fastener is fastened in the horizontal plane (as in FIGS. 17 and 18).

With reference to FIGS. 24 and 25, to adjust the brace member 814, the first rod 816 is proportionally received in the second rod 818 corresponding to a desired length of the brace member 814. A nut 834a is then placed on the threaded shaft 832 before said shaft 832 is received in the aperture 823 of the second plate 822. Two nuts 834b, 834c are then received on the threaded shaft 832 and positioned between the two plates 820, 822. The brace threaded shaft 832 is then received in the aperture 821 of the first plate 820. Nut 834d is then received on a first end 836 of the threaded shaft 832 and is tightened against the first plate 820. The remainder of the nuts, 834b, 834c and 834a are then tightened to maintain the two plates 820, 822 at a set distance and thus maintain a desired length of the brace member 814.

Referring now to FIGS. 26 and 27, there is shown an alternative embodiment of an extendable member 330, which can be used for instance to replace extendable members 202, 330, 1302 and 1500 described previously. FIG. 26 shows a perspective view of the extendable member 330 with a support beam 150 of a structure (such as a manufactured home or a building module) fastened thereunto, while FIG. 27 shows a top-down view of the support platform 332 of the extendable member 330 only. The extendable member 330 is similar to the extendable member 1500 but with a modified support platform 332. The support platform 332 has a generally 'I-shaped' profile containing a distal end 336 extending along a first longitudinal axis and a proximal end 338 extending along a second longitudinal axis parallel to the first longitudinal axis, the distal end 336 and proximal end 338 being connected by a connecting portion 337 extending along a third longitudinal axis orthogonal to the longitudinal axes of the distal 336 and proximal ends 338, each of the distal 336 and proximal ends 338 containing slots 342a-342d therein, the slots 342 allowing fastening of the support platform 332 to the support beam of the support frame. Mounted in the slots 342a-342d are plate members 340a-340d and holding fasteners 344a-344d. A threaded shaft 346 is secured to the connecting portion 337 of the support platform 332, the threaded shaft 346 being configured to be mounted in the threaded hole 372 of the mounting member 350. There is shown a single plate member (e.g. plate member 340a) for each holding fastener (e.g. holding fastener 344a), alternatively there may be a single plate member for a plurality of fasteners (as shown in FIG. 6A), or any other arrangement that the skilled addressee deems fit. Although holding fasteners 344a-344d are bolt and nut assemblies in one embodiment, any fastening means evident to the skilled addressee may be appropriate. As it will be appreciated, the extendable member 330 can be used in cases where the support beam 150 of the manufactured home may comprise a blocking component such as a downwardly extending, inverted U-shaped bracket 348 as seen in FIG. 26. The inverted U-shaped bracket 348, also known as a 'spring hanger' or 'leaf spring hanger', may be on the support beam 150 of the manufactured home due to the support beam 150 generally being provided with wheels for transporting the manufactured home (not shown). The inverted U-shaped bracket 348 may be present to house springs which secure the wheel to the support beam 150. The washers 334 provide a buffer between the support platform 332 and the blocking component (i.e. U bracket 348), reducing wear between the two parts.

Turning now to FIGS. 28 and 29, there is shown yet another embodiment of a support assembly 2000. The support assembly 2000 is a structurally simpler configuration of the support assemblies 100, 800 and 900 previously described. In one configuration, the support assembly 2000 may be used for supporting a deck, patio or gazebo. Other configurations may be evident to the skilled addressee. The support assembly comprises a pile 2020 and an extendable member 2100 configured to engage a support structure such as a 4×4 profile wooden log. The pile 2020 includes a beam portion 2022 having a top end 2024 and a bottom end 2026. Similar to the bottom pile segment 906 of the support assembly 900 previously described, bottom end 2026 of the pile 2020 is cut at a 45-degree angle and comprises a helical member 2023 to facilitate installation of the pile 2020 into the ground. The helical member 2023 provides a greater contact area against the ground into which the pile 2020 is driven, with the result that the pile 2020 provides improved foundational support (particularly important in sandy or otherwise loose grounds). To the top end 2024 of the pile 2020, there is a hexagonal head 2030 formed integral with the beam portion 2022. The hexagonal head 2030 may be welded to the beam portion 2022, or fastened by any other permanent fastening means. Alternatively, the hexagonal head 2030 may be removably fastened to the beam portion 2022 (e.g. by threads or a bolt and nut configuration). The beam portion 2022 comprises a single segment. Since the length of the beam portion 2022 of the support assembly 2000 is fixed, the beam portion 2022 may be cut to a desired length by cutting proximal to its top end 2024. The hexagonal head 2030 would then be removed and a mounting member such as the mounting member 200 could be bolted (or otherwise fastened by any means) to the pile 2020 to allow receiving any extendable member therein.

The hexagonal head 2030 has a threaded hole 2032 configured to receive a threaded shaft 2104 of the extendable member 2100. Similar to the hexagonal head 352, the hexagonal head 2030 allows for adjustment of the height of the extendable member 2100 through action of the threaded shaft 2104 of the extendable member against the threaded hole 2032 of the hexagonal head 2030. The extendable member 2100 has a support member receiving portion 2150 mounted to the threaded shaft 2104 configured to support a building structure. The support member receiving portion 2150 is shaped like a U-bracket, having a supporting base 2152 and first and second lateral walls 2160a, 2160b extending orthogonally and away from the supporting base 2152. The first lateral wall 2160a has two large apertures 2162a, 2162b and two small apertures 2164a, 2164b. Likewise, the second lateral wall also has two large apertures 2162c, 2162d and two small apertures 2164c, 2164d. The support member receiving portion 2150 is sized such that it may receive, for example, a wooden beam having a 4 in×4 in profile forming part of the under-structure of a deck or patio. In one installation method, the 4×4 wooden beam (not shown) would be received on the base 2152 of the extendable member 2100. The large apertures 2162a-2162d could then be used to drill all the way through the wooden beam, then securing it to the support member receiving portion 2150 by use of a nut and bolt (not shown). Alternatively, the small apertures 2164a-2164d could be used to fasten the wood beam to the support member receiving portion 2150 by screwing in any kind of wood screw (e.g. #10 wood screw).

With reference to FIGS. 30 to 37, there is shown yet another embodiment of support assemblies 2200a, 2200b, connected together via brace members 2400a, 2400b. While in the illustrated embodiment the support assemblies 2200a, 2200b are connected; alternatively, the support assemblies 2200a, 2200b may not be braced. The second support assembly 2200b being substantially identical to the first support assembly 2200a, only support assembly 2200a will be described. It will be appreciated that any description to support assembly 2200a thus also applies to support assembly 2200b.

Much like support assembly 900a or support assembly 800a, first support assembly 2200a comprises a lower pile segment 906 for installation in the ground, a mounting member 350 received in the lower pile segment 906, an extendable member 2300 mounted to the mounting member 350 and holding members 2350a-2350d fastened to a support platform 2302 of the extendable member 2300, for holding a beam 150a thereto.

The support assembly 2200a is similar to previously disclosed support assembly 800a but with some variations. More specifically, the extendable member 2300 has a support platform 2302 including four fastener openings 2330a-2330d, a threaded shaft 2304 configured to threadably engage the threaded hole 372 of the hexagonal head 352 of mounting member 350.

Referring more particularly to FIGS. 33 and 34, the extendable member 2300 further includes two brace brackets 2320a, 2320b attached to each side of the support platform 2302 of the extendable member 2300. Each of the brace brackets 2320a, 2320b has an opening 2322a, 2322b defined therein, respectively. The openings 2322a, 2322b are each configured to receive a fastener 2440 of one of the brace members 2400a, 2400b which brace the two support assemblies 2200a, 2200b together, as it will become apparent below.

Figure 2:
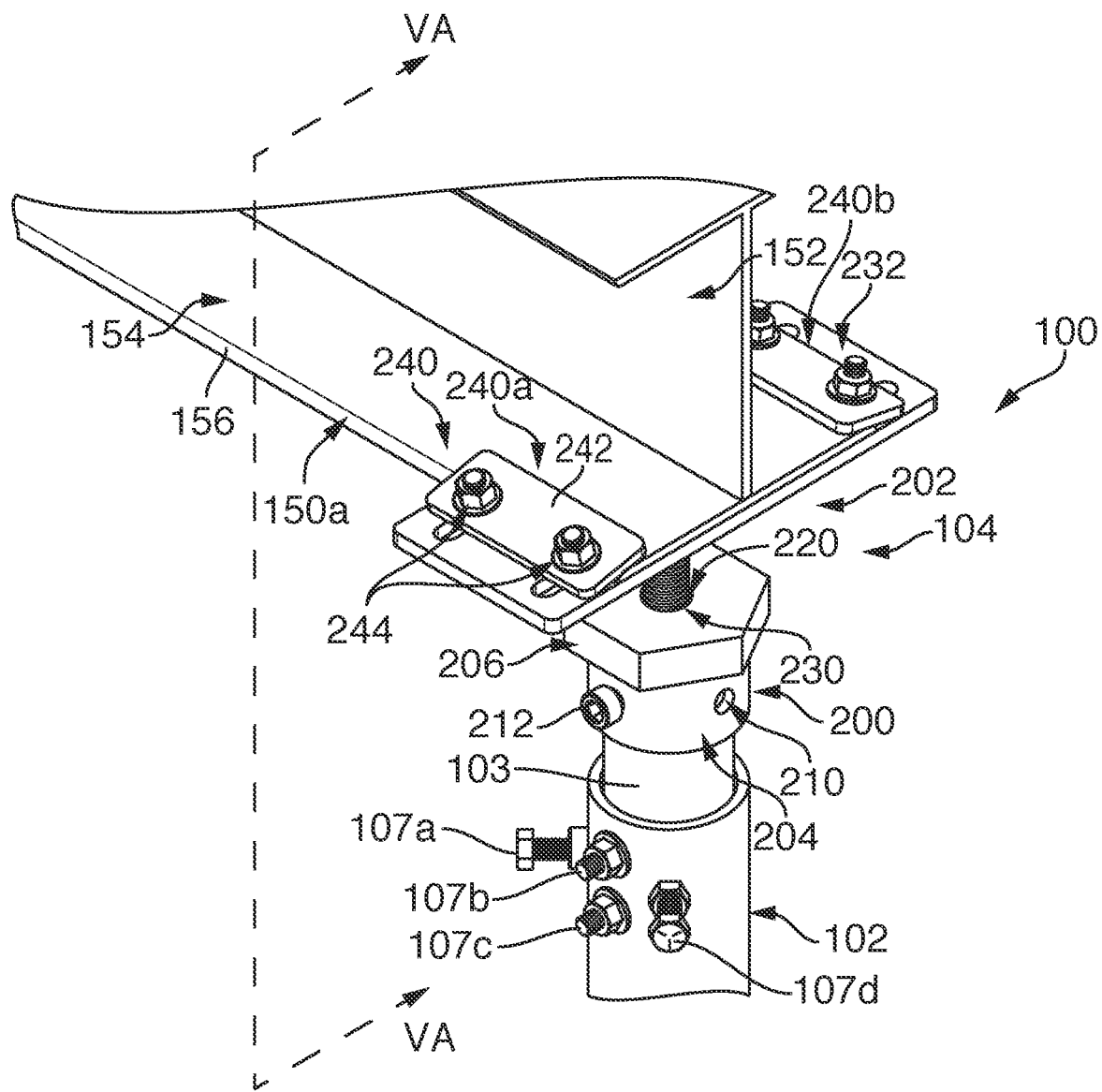
FIG. 2 is an enlarged top left perspective view of one of the support assemblies illustrated in FIG. 1.
Figure 3:
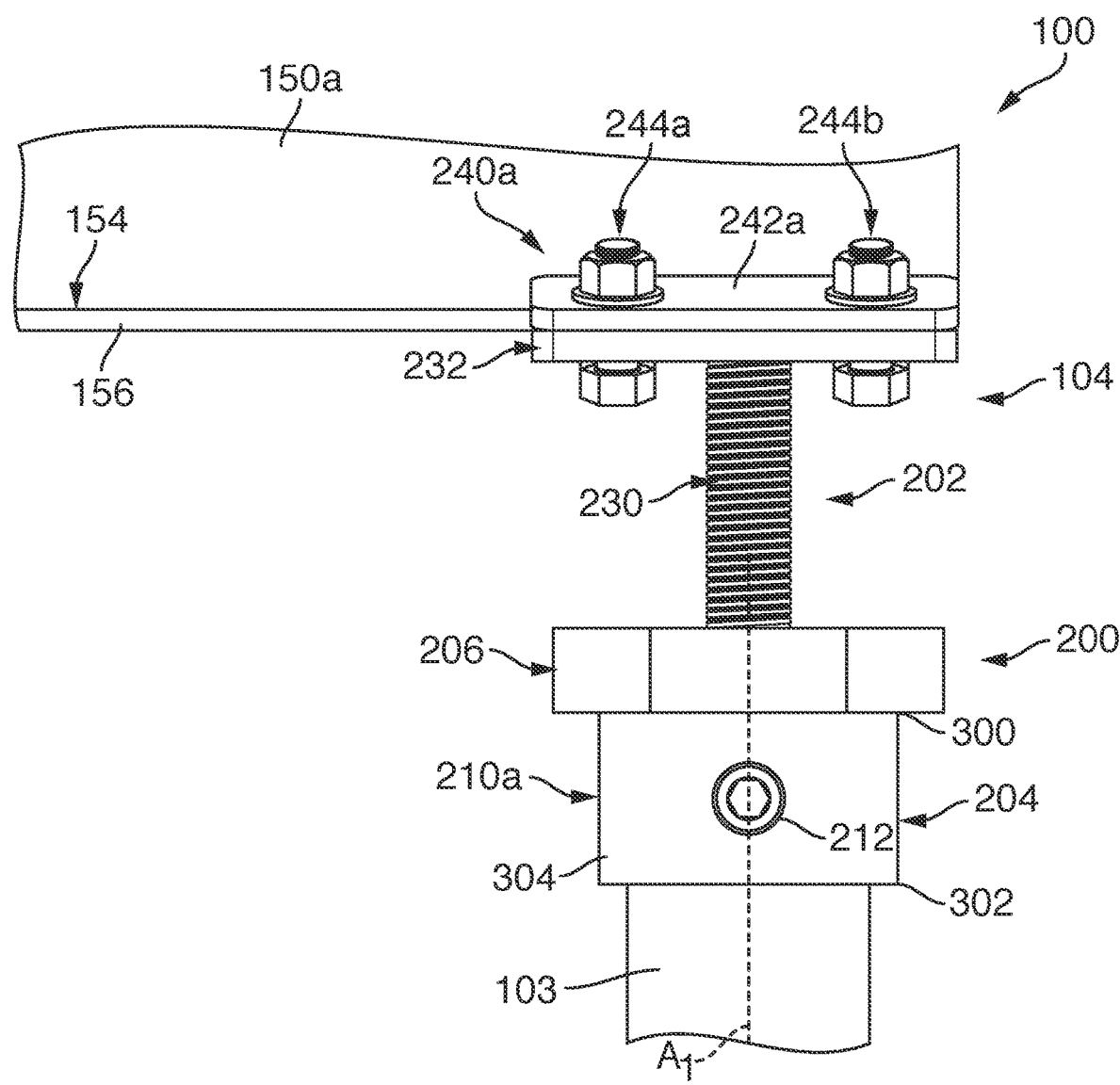
FIG. 3 is a left side view of the support assembly illustrated in FIG. 2.

The extendable member 2300 is additionally fastened to the beam 150a of a support frame of a manufactured home (not shown) using holding members 2350a-2350d. As best seen in FIG. 34, the holding members 2350a-2350d have a top portion 2352a-2352d and a bottom portion 2354a-2354d. The top portion 2352a-2352d sits partly on the bottom flange of the beam 150a, and partly receives a fastener 2353a-2353d used for fastening the holding member to the support platform 2302. The bottom portion is configured to be approximately the same thickness as the flange of the beam 150a so as to maintain each holding member 2350a-2350d roughly parallel with respect to the support platform 2302, unlike holding members 242 for example, which may tilt relative to the respective support platform 232 (as shown in FIG. 2). The holding members 2350a-2350d may therefore exert even greater force on the bottom flange of the beam 150a when fastened to the support platform 2302, helping to more securely fasten the beam to the support platform 2302. Although holding members 2350a-2350d have been used with support assembly 2200a, it will be understood that the holding members 2350a-2350d may also be used in any other configuration, such as in support assembly 100. It will also be understood that although four holding members 2350a-2350d are used in this instance, other configurations will be readily evident to the skilled addressee.

With reference to FIGS. 30 to 32 and 35 to 37, the support assemblies 2200a, 2200b may be braced together, in accordance with one embodiment. In the configuration, where the support assemblies 2200a-2200b are braced together, braces 2400a, 2400b may be used. The second brace 2400b being substantially identical to the first brace 2400a, only first brace 2400a will be described. It will however be appreciated that any description of first brace 2200a also applies to second brace 2400b. As best shown in FIGS. 35 to 37, the brace member 2400a is telescopic, and comprises a first section 2418, and a thread rod 2416 threadably engaging the first section 2418. The first section 2418 consists of an L-beam having on one first end 2419 the fastener 2440 for fastening onto a lower brace bracket 1916. The first section 2418 also has a nut 2410 welded or otherwise secured to the first section 2418 at its second end 2421, the threaded rod 2416 being threadably received at its first end 2423 in the nut 2410, thereby allowing for adjustment of the total length of the brace member 2400a. At the second end 2425 of the threaded rod 2416 is received a pair of nuts 2435a, 2435b. The pair of nuts 2435a, 2435b receive a first plate 2432 of an end bracket 2436 therebetween. The nut 2435a may be a self-locking nut to maintain the end bracket 2436 in place on the threaded rod 2416. The end bracket 2436 is comprised of the first L-shaped portions 2432 and a second L-shaped portion 2434, the first and second L-shaped portions 2432, 2434 being fastened together using a fastener 2437. As it will be appreciated, the end bracket 2436 consisting of two portions 2432, 2434 that can be separated tend to facilitate installation of the brace 2400a. For example, the second L-shaped portion 2434 may first be fastened to the lower brace bracket 1916 of support assembly 2200a using the pair of fastening holes 2433a, 2433b, and rest of the bracket 2400a may then be assembled followed by the first L-shaped portion 2432 being fastened to the second plate 2434.

More specifically, the lower brace bracket 1916 is similar to the lower brace bracket 916, also securably fastening the lower pile segment 906 and the extendable member 350 together and maintain the height of the mounting member 350 relative to the lower pile segment 906. However, unlike the lower brace bracket 916, the lower brace 1916 does not have a vertical or horizontal tab (e.g. tab 1102 of lower brace bracket 916) for attachment to the brace member 2400a. Instead, the lower brace bracket 1916 receives the second plate 2434 of the end bracket 2436 and fastens said end bracket 2436 to the lower pile segment 906 using fasteners 380a-380d.

With reference to FIG. 38, there is shown yet another embodiment of an extendable member 2500. The extendable member 2500 is comprised of a threaded shaft 2504 and a support platform 2502. The threaded shaft 2504 is for being threadably received in a threaded hole (e.g. threaded hole 372) of a mounting member (e.g. mounting member 350). The support platform 2502 is configured to receive thereon a beam, such as the beam 150a of a support frame of a manufactured home (not shown). Holding members (e.g. holding members 2350a, 2350b shown in FIG. 34) may be fastened to the support platform 2502 through the holes 2530a, 2530b in order to securably fasten a beam of a support frame of a manufactured home. Although there is no bracing shown in this embodiment, bracing means may be added, for example through addition of brace brackets 2320a, 2320b (best shown in FIGS. 33-34) fixedly attached to each side of the support platform 2502 of the extendable member 2500.

While the various extendable members 202, 1302, 1500, 330, 2100, 2300, 2500 have been described in connection with specific embodiment, it is envisioned that any of the extendable members 202, 1302, 1500, 330, 2100, 2300, 2500 could be used on any of the support assemblies 100a-1001, 800a-800b, 900a-900b, 2000, and 2200a-2200b described previously and/or can be interchanged, for example in support assemblies 100a-1001, 800a-800b, 900a-900b, 2000 and 2200a-2200b. Further any one of the extendable members 202, 1302, 1500, 330, 2100, 2300, 2500 could be used whether two support assemblies are in a configuration without bracing or are braced together, so long as a suitable bracing fastening means (such as a brace bracket 1420 or brace member fastening openings 1520) is provided. Any of the brace members described herein may also be interchangeably used with any support assembly.

Having described various configurations of support assemblies 100a-1001, 800a-800b, 900a900b, 2000 and 2200a-2200b, a method of installation of support assemblies 100a-1001, 800a-800b, 900a-900b, 2000 and 2200a-2200b will now be described using installation of support assemblies 2200a-2200b as an example. As the installation of support assemblies 100a-1001, 800a-800b, 900a-900b and 2000 is similar to installation of support assemblies 2200a-2200b, it will be appreciated that a similar description would also apply to support assemblies 100a-1001, 800a-800b, 900a-900b and 2000, with proper adaptations.

According to one embodiment, a number of pile assemblies to be installed is first determined, based on the load, size and number of support beams of the manufactured home to be supported (in this example, two support assemblies 2200a, 2200b). A corresponding number of bottom pile segments 906 are then installed in the ground with the top end of the bottom pile segment 906 reaching a given height relative to ground level. When appropriate, a lateral reinforcement assembly 951 can attached to bottom pile segment 906 prior to being installed in the ground.

A mounting member 350 is then positioned in each of the bottom pile segments 906 and is fastened thereto, using a fastener 380, which fastener is positioned in the mounting holes 370 of the mounting member 350 and the mounting holes 374 of the bottom pile segment 906. In one embodiment, the bottom pile segment 906 comprises two mounting holes 374 for securing the mounting member 350 to the bottom pile segment 906. In this embodiment, the fasteners 380 also further fasten the lower brace bracket 916 to the bottom pile segment 906 and the mounting member 350.

For each of the two support assemblies 2200a, 2200b, an extendable member 1500 is then mounted to the mounting member 350 by engaging the threaded shaft 1504 of the extendable member 2300 in the threaded hole 372 of the head portion 352. The height of the support platform 2302 of each extendable member 2300 can then be adjusted by rotating the extendable member 2300 in the threaded hole 372 of the mounting member 350 until a desired height has been reached. At that point, the support platform 2302 of each support assembly 2200a or 2200b is positioned to receive thereon a corresponding beam (e.g. beams 150a or 150b) of a manufactured home structure.

Where brace members (e.g. 2400a, 2400b) are being used to brace support assemblies together (as shown in FIGS. 30 and 31 for instance), the length of each brace members (e.g. 2400a, 2400b) is adjusted to the required distance between the two support assemblies to be braced (e.g. 2200a, 2200b). Then a first brace member (e.g. 2400a) is installed starting with fastening the second end 2425 of its corresponding threaded rod 2416 to the lower brace bracket 1916 of a first support assembly (e.g. 2200a) via the end bracket 2436. As it will be appreciated, and as best shown in FIGS. 35 to 37, the end bracket 2436 consisting of two portions 2432, 2434 that can be separated tend to facilitate installation of the brace member 2400a. Then, the first end 2419 of the first section 2418 of the same first brace member (e.g. 2400a) is fastened to the brace bracket (e.g. 2320a) of the extendable member 2300 of a second support assembly (e.g. 2200b), using a fastener 2440. As it will be best seen in FIG. 31, the first brace member (e.g. 2400a) thus extends angularly and upwardly, from the lower brace bracket 1916 of the first support assembly (e.g. 2200a) to the brace bracket 2320a of the second support assembly (e.g. 2200b). At that point, the second brace member (e.g. 2400b) can be installed, starting with fastening the second end 2425 of its threaded rod 2416 to the lower brace bracket 1916 of the second support assembly (e.g. 2200b) via the end bracket 2436. Then the first end 2419 of the first section 2418 of the same second brace member (e.g. 2400b) is fastened, to the brace bracket (e.g. 2320a) of the extendable member 2300 of the first support assembly (e.g. 2200a) via a fastener 2440. Much like the first brace member (e.g. 2400a), the second brace member (e.g. 2400b) thus extends angularly and upwardly, from the lower brace bracket 1916 of the second support assembly (e.g. 2200b) to the brace bracket 2320a of the first support assembly (e.g. 2200a), the two support assemblies 2200a, 2200b crossing each other generally halfway between the second end 2425 of their respective threaded rods 1916 and the first end 2419 of their respective first section, to therefore triangulate or brace the two support assemblies 2200a, 2200b.

In other instances where further bracing is required, or where obstacles can be found on the ground surface (e.g. rocks, stumps), it may be desirable to configure the brace members 2400a, 2400b differently and/or to add further brace members. For instance, in addition to the brace members 2400a, 2400b illustrated in FIGS. 30 and 31, or in substitution thereof, it may be desirable to add a further brace member extending between the brace bracket (e.g. 2320a) of the extendable member 2300 of a first support assembly (e.g. 2200a) and the brace bracket (e.g. 2320a) of the extendable member 2300 of the second support assembly (e.g. 2200b), and/or another brace member extending between the lower brace bracket 1916 of the first support assembly (e.g. 2200a) and the lower brace bracket 1916 of the second support assembly (e.g. 2200b). Further, as the installation of brace members 914a, 914b or 814a, 814b is similar to the installation of brace members 2400a, 2400b, it will be appreciated that a similar description would also apply to the installation brace members 914a, 914b and 814a, 814b, with proper adaptations. It will also be appreciated that is some instances, in may be advantageous to use a combination of the various embodiments of brace members 814a, 814b, 914a, 914b, 2200a, 2200 instead of a single type of brace members.

At that point, the support assemblies 2200a, 2200b are ready to receive thereon a corresponding beam (e.g. beams 150a or 150b) of a manufactured home structure. To do so, a manufactured home (or another type of building module) is brought onsite and positioned over the support assemblies 2200a, 2200b. The manufactured home is then lowered, until the support beams (e.g. beams 150a or 150b) are supported by a support platform 2302 of a corresponding support assembly 2200a or 2200b. At that point, the holding members (e.g. holding members 2350a, 2350b shown in FIG. 34) are positioned relative to the support platform 2302 to engage the corresponding beams (e.g. beams 150a or 150b), and the fasteners 2353a-2353d are secured in order to securably fasten a beam beams (e.g. beams 150a or 150b) to the corresponding support assembly (support assemblies 2200a, 2200b).

At it will be appreciated, structures such as support assemblies 2200a, 2200b, and the manufactured home supported thereon, may move slightly over time due to degradation of physical and mechanical properties of the soil resulting from environmental factors such as freezing and thawing cycles, floods, earthquakes and the like. As such, in some application, it may be desirable to be provided with the capability to simply adjust the overall height of the support assemblies (e.g. support assemblies 2200a, 2200b) once the manufactured home has been positioned thereon. Still referring to support assemblies 2200a, 2200b as an example (also applicable to support assemblies 100a-100l, 800a, 800b, 900a, 900b, and the like), when the overall height of support assembly (e.g. 2200a) needs to be adjusted, the bolts 380c and 380d securing the lower brace bracket 916 to the bottom pile segment 906 are removed, thus allowing detachment of the second end 2425 of the threaded rod 2416 of brace member 2400a. At that point, fasteners 380a and 380b remain in position, along with lower brace bracket 916 still attached to mounting member 350, but not to bottom pile segment 906. As such, mounting member 350 is supported on bottom pile segment by fastener 380b and partially by lower brace bracket 916, but is become capable of rotation in one direction or the other relative to bottom pile segment 906. Therefore, and since bottom pile segment 906 (installed in the ground) and support platform 2200a (holding the beam 150a) cannot move, the rotation of the mounting member 350 will cause the threaded shaft 2304 to move upwardly and downwardly (depending on the direction of rotation), thus allowing adjustment of the height of the platform 2200a. Once a proper height of the platform 2200a has been reached, the second end 2425 of the threaded rod 2416 of brace member 2400a is once again attached to the lower brace bracket 916 using fasteners 380c, 380d, which fasteners 380c, 380c incidentally secured the mounting member 350 to the bottom pile segment 906 and prevent any further rotation thereof.

As it will be appreciated, the method of adjusting the height of a support assembly will be slightly different when using a mounting member as illustrated in FIG. 23B. Indeed, in this alternative embodiment, the bottom pile segment 906 may comprise multiple mounting holes 375 spanning along a longitudinal axis of the bottom pile segment 906. In this embodiment, the installation method may also allow for the mounting member 350 to rotate while the support beam 150 of a structure (such as a manufactured home) is mounted onto an extendable member (such as extendable member 1500) mounted in the mounting member 350, and therefore allow for adjustment of the height of the support assembly 800a. In this configuration, the mounting member 350 is received in the bottom pile segment 906 until it reaches a desired height. A supporting fastener 380c is then inserted into one of the lower mounting holes 375 and the mounting member 350 is supported thereon at the desired height. The structure is then mounted onto the extendable member 1500 having a support platform 1502, the support platform 1502 being connected to a threaded shaft 1504 mounted in the threaded hole 372 of the mounting member 350. The mounting member 350 can then be rotated, for example by use of a wrench with the hexagonal head 352, to adjust the height of the support platform 1502 and therefore the height of the structure (e.g. of a manufactured home) with respect to the ground. Once a desired height is reached, two fasteners 380a, 380b may be inserted into two corresponding mounting holes 375 to fasten the mounting member 350 to the lower pile segment 906 and fix the height of the support assembly 800a. The supporting fastener 380c may then be removed.

The embodiments described above are intended to be exemplary only. The scope of the invention is therefore intended to be limited solely by the appended claims

The invention claimed is:

1. A support assembly for supporting a building structure, the support assembly extending along a longitudinal axis and comprising:
a pile adapted to be buried into a ground surface, the pile comprising a top end comprising a transversal hole;
a mounting member movably mounted to the top end of the pile, the mounting member extending generally along the longitudinal axis and comprising a bottom portion engaging the top end of the pile and a head portion, the bottom portion comprising a transversal hole alignable with the transversal hole of the pile receiving a fastener for fastening the mounting member to the pile;
an extendable member movably mounted to the mounting member, the extendable member comprising a shaft extending generally along the longitudinal axis, the shaft comprising a top end, a bottom end and an elongated portion extending therebetween, the elongated portion of the shaft movably engaging the head portion of the mounting member mounting the extendable member to the mounting member;
a support platform configured to receive a bottom portion of the building structure, the support platform being mounted to the top end of the shaft and extending transversely relative to the longitudinal axis from a first side end to a second side end; and
first and second holding members configured to engage first and second top portions of the building structure, the first and second holding members comprising first and second longitudinal holes;
wherein the support platform comprises a first elongated transversal opening extending from the first side end and a second elongated transversal opening extending from the second side end; and
wherein, in use, a first fastener is mounted in the first longitudinal hole of the first holding member and in the first elongated transversal opening, a second fastener is mounted in the second longitudinal hole of the second holding member and in the second elongated transversal opening, wherein the first and second fasteners and the first and second elongated transversal openings allow transversal adjustment of the first and second holding members relative to the building structure and relative to the support platform, and wherein the first and second fasteners and the first and second holding members prevent movement of the building structure relative to the support platform.

2. The support assembly of claim 1, wherein the building structure comprises a support frame comprising a beam and wherein the first and second holding members are adapted to engage first and second top portions of the beam.

3. The support assembly of claim 1, wherein the head portion of the mounting member comprises a longitudinal threaded hole and the elongated portion of the shaft of the extendable member comprises threads, the threads of the shaft being configured to threadably engage the threaded hole of the head portion of the mounting member.

4. The support assembly of claim 1, wherein the support platform comprises a third elongated transversal opening extending from the first side end and a fourth elongated transversal opening extending from the second side end, the third and fourth elongated transversal openings being spaced from and generally parallel to the first and second elongated transversal openings, wherein the first holding member comprises a third longitudinal hole, wherein the second holding member comprises a fourth longitudinal hole wherein, in use, a third fastener is mounted in the third longitudinal hole of the first holding member and in the third elongated transversal opening, a fourth fastener is mounted in the fourth longitudinal hole of the second holding member and in the fourth elongated transversal opening, wherein the third and fourth fasteners and the third and fourth elongated transversal openings allow transversal adjustment of the first and second holding members relative to the building structure and relative to the support platform, and wherein the third and fourth fasteners and the first and second holding members prevent movement of the building structure relative to the support platform.

5. The support assembly of claim 4, wherein the first and third elongated transversal openings are first and third elongated transversal slots at least partially located on one side relative to the longitudinal axis and wherein the second and fourth elongated transversal openings are second and fourth elongated transversal slots at least partially located on another side relative to the longitudinal axis.

6. The support assembly of claim 1, wherein the support platform comprises a third elongated transversal opening extending from the first side end and a fourth elongated transversal opening extending from the second side end, the third and fourth elongated transversal openings being spaced from and generally parallel to the first and second elongated transversal openings, wherein the support assembly comprises third and fourth holding members for engaging third and fourth top portions of the building structure, the third and fourth holding members comprising third and fourth longitudinal holes, wherein, in use, a third fastener is mounted in the third longitudinal hole of the third holding member and in the third elongated transversal opening, a fourth fastener is mounted in the fourth longitudinal hole of the fourth holding member and in the fourth elongated transversal opening, wherein the third and fourth fasteners and the third and fourth elongated transversal openings allow transversal adjustment of the third and fourth holding members relative to the building structure and relative to the support platform, and wherein the third and fourth fasteners and the third and fourth holding members prevent movement of the building structure relative to the support platform.

7. The support assembly of claim 1, wherein the transversal hole of the bottom portion of the mounting member is a first transversal hole, wherein the bottom portion comprises a second transversal hole, the first and second transversal holes being selectively alignable with the transversal hole of the pile for receiving a fastener for fastening the mounting member to the pile, the first and second transversal holes allowing longitudinal adjustment of a position of the mounting member relative to the pile.

8. A support system for supporting a building structure, the support system comprising:
first and second support assemblies, each of the first and second support assemblies extending along a longitudinal axis and comprising: (i) a pile adapted to be buried into a ground surface, the pile comprising a top end comprising a transversal hole, (ii) a mounting member movably mounted to the top end of the pile, the mounting member extending generally along the longitudinal axis and comprising a bottom portion for engaging the top end of the pile and a head portion, the bottom portion comprising first and second transversal holes, the first and second transversal holes of the bottom portion being selectively alignable with the transversal hole of the pile configured to receive a fastener fastening the mounting member to the pile, the first and second transversal holes allowing longitudinal adjustment of a position of the mounting member relative to the pile, (iii) an extendable member movably mounted to the mounting member, the extendable member comprising a shaft extending generally along the longitudinal axis, the shaft comprising a top end, a bottom end and an elongated portion extending therebetween, the elongated portion of the shaft movably engaging the head portion of the mounting member configured to mount the extendable member to the mounting member, (iv) a support platform configured to receive a bottom portion of the building structure, the support platform being mounted to the top end of the shaft and extending transversely relative to the longitudinal axis from a first side end to a second side end, and (v) first and second holding members configured to engage first and second top portions of the building structure, the first and second holding members comprising first and second longitudinal holes, (vi) a brace bracket mounted to the support platform or to the bottom portion of the mounting member and/or to the end of the pile, wherein the support platform comprises a first elongated transversal opening extending from the first side end and a second elongated transversal opening extending from the second side end, and wherein, in use, a first fastener is mounted in the first longitudinal hole of the first holding member and in the first elongated transversal opening, a second fastener is mounted in the second longitudinal hole of the second holding member and in the second elongated transversal opening, wherein the first and second fasteners and the first and second elongated transversal openings allow transversal adjustment of the first and second holding member relative to the building structure and relative to the support platform, and wherein the first and second fasteners and the first and second holding members prevent movement of the building structure relative to the support platform; and a brace member extending between first and second end portions, wherein the first end portion is attached to one of the brackets of the first and second support assemblies and the second end portion is attached to the other one of the brackets of the first and second support assemblies.

9. The support system of claim 8, wherein the building structure comprises a support frame comprising a beam and wherein the first and second holding members are adapted to engage first and second top portions of the beam.

10. The support system of claim 8, wherein the head portion of the mounting member comprises a longitudinal threaded hole and the elongated portion of the shaft of the extendable member comprises threads, the threads of the shaft being configured to threadably engage the threaded hole of the head portion of the mounting member.

11. The support system of claim 8, wherein the support platform comprises a third elongated transversal opening extending from the first side end and a fourth elongated transversal opening extending from the second side end, the third and fourth elongated transversal openings being spaced from and generally parallel to the first and second elongated transversal openings, wherein the first holding member comprises a third longitudinal hole, wherein the second holding member comprises a fourth longitudinal hole wherein, in use, a third fastener is mounted in the third longitudinal hole of the first holding member and in the third elongated transversal opening, a fourth fastener is mounted in the fourth longitudinal hole of the second holding member and in the fourth elongated transversal opening, wherein the third and fourth fasteners and the third and fourth elongated transversal openings allow transversal adjustment of the first and second holding members relative to the building structure and relative to the support platform, and wherein the third and fourth fasteners and the first and second holding members prevent movement of the building structure relative to the support platform.

12. The support system of claim 11, wherein the first and third elongated transversal openings are first and third elongated transversal slots at least partially located on one side relative to the longitudinal axis and wherein the second and fourth elongated transversal openings are second and fourth elongated transversal slots at least partially located on another side relative to the longitudinal axis.

13. The support system of claim 8, wherein the support platform comprises a third elongated transversal opening extending from the first side end and a fourth elongated transversal opening extending from the second side end, the third and fourth elongated transversal openings being spaced from and generally parallel to the first and second elongated transversal openings, wherein the support assembly comprises third and fourth holding members for engaging third and fourth top portions of the building structure, the third and fourth holding members comprising third and fourth longitudinal holes, wherein, in use, a third fastener is mounted in the third longitudinal hole of the third holding member and in the third elongated transversal opening, a fourth fastener is mounted in the fourth longitudinal hole of the fourth holding member and in the fourth elongated transversal opening, wherein the third and fourth fasteners and the third and fourth elongated transversal openings allow transversal adjustment of the third and fourth holding members relative to the building structure and relative to the support platform, and wherein the third and fourth fasteners and the third and fourth holding members prevent movement of the building structure relative to the support platform.

14. A support system for supporting a building structure, the support system comprising:

first and second support assemblies, each of the first and second support assemblies extending along a longitudinal axis and comprising: (i) a pile adapted to be buried into a ground surface, the pile comprising a top end comprising a transversal hole, (ii) a mounting member movably mounted to the top end of the pile, the mounting member extending generally along the longitudinal axis and comprising a bottom portion for engaging the top end of the pile and a head portion, the bottom portion comprising first and second transversal holes, the first and second transversal holes of the bottom portion being selectively alignable with the transversal hole of the pile for receiving a fastener for fastening the mounting member to the pile, the first and second holes allowing longitudinal adjustment of a position of the mounting member relative to the pile, (iii) an extendable member movably mounted to the mounting member, the extendable member comprising a shaft extending generally along the longitudinal axis, the shaft comprising a top end, a bottom end and an elongated portion extending therebetween, the elongated portion of the shaft movably engaging the head portion of the mounting member for mounting the extendable member to the mounting member, (iv) a support platform for receiving a portion of the building structure, the support platform being mounted to the top end of the shaft and extending transversely relative to the longitudinal axis, (v) a holding member attached to the support platform and adapted to engage the building structure for preventing movement of the building structure relative to the support platform, (vi) a brace bracket mounted to the support platform or to the bottom portion of the mounting member and/or to the end of the pile;

a brace member comprising a first member telescopically mounted in a second member, wherein the first member comprises a first portion outside the second member and secured to the brace bracket of one the first and second support assemblies, and wherein the second member comprises a first portion for receiving the first member and a second portion secured to the brace bracket of the other one of the first and second support assemblies; and an extension mechanism for coupling the first portion of the first member and the first portion of the second member, the extension mechanism allowing adjustment of the first portion of the first member relative to the first portion of the second member to adjust a length of the brace member, wherein the first portion of the first member and the first and second portions of the second member extend along a brace longitudinal axis, wherein the extension mechanism comprises a first projection attached to the first portion of the first member and extending transversely relative to the brace longitudinal axis and a second projection attached to the first portion of the second member and extending transversely relative to the brace longitudinal axis, wherein a brace shaft operatively connects the first and second projections, and wherein an engaging element cooperates with the shaft and at least one of the first and second projections to allow adjustment of a distance between the first and second projections.

15. The support system of claim 14, wherein the brace shaft comprises a threaded portion and wherein the engaging element comprises a nut threadably engaging the brace shaft.

16. The support system of claim 14, wherein the brace shaft comprises a threaded portion and wherein the first and second projections comprise first and second threaded holes, the threaded portion threadably engaging the first and second threaded holes.

17. A support system for supporting a building structure, the support system comprising:

first and second support assemblies, each of the first and second support assemblies comprising: (i) a pile adapted to be buried into a ground surface, the pile extending along a longitudinal axis and comprising a top end comprising a transversal hole, (ii) a mounting member movably mounted to the top end of the pile, the mounting member extending generally along the longitudinal axis and comprising a bottom portion for engaging the top end of the pile and a head portion, the bottom portion comprising first and second transversal holes, the first and second transversal holes of the bottom portion being selectively alignable with the transversal hole of the pile for receiving a fastener for fastening the mounting member to the pile, the first and second holes allowing longitudinal adjustment of a position of the mounting member relative to the pile, (iii) an extendable member movably mounted to the mounting member, the extendable member comprising a shaft extending generally along the longitudinal axis, the shaft comprising a top end, a bottom end and an elongated portion extending therebetween, the elongated portion of the shaft movably engaging the head portion of the mounting member for mounting the extendable member to the mounting member, (iv) a support platform for receiving a portion of the building structure, the support platform being mounted to the top end of the shaft and extending transversely relative to the longitudinal axis, (v) a holding member attached to the support platform and adapted to engage the building structure for preventing movement of the building structure relative to the support platform, (vi) a brace bracket mounted to the support platform or to the bottom portion of the mounting member and/or to the end of the pile; and a brace member comprising (a) a section extending from a first end portion to a second end portion and (b) a rod extending from a first end portion to a second end portion, wherein the first end portion of the section is secured to the brace bracket of one of the first and second support assemblies, wherein the second end portion of the rod is secured to the brace bracket of the other one of the first and second support assemblies, and wherein the first end portion of the rod is adjustably mounted to the second end portion of the section for allowing adjustment of a length of the brace member.

18. The support system of claim 17, wherein the second end portion of the section comprises a nut with a threaded hole, wherein the rod comprises a threaded portion at least partially extending through the threaded hole and towards the first end portion of the section, and wherein rotation of the rod relative to the nut allows adjustment of the length of the brace member.

19. The support system of claim 18, wherein the brace member comprises first and second nuts an end bracket mounted at the second end portion of the rod for securing the end bracket to the brace bracket of the one of the first and second support assemblies, the end bracket comprising a plate with a threaded hole wherein the threaded portion of the rod at least partially extends through the threaded hole of the plate, wherein the first nut is threadedly mounted to the threaded portion of the rod on a first side of the plate, wherein the second nut is threadedly mounted to the threaded portion of the rod on a second side of the plate, and wherein rotation of the rod is prevented when each of the first and second nuts abuts against the plate.

* * * * *